US010433668B2

(12) United States Patent
Merali et al.

(10) Patent No.: US 10,433,668 B2
(45) Date of Patent: Oct. 8, 2019

(54) SYSTEMS AND METHODS FOR AUTOMATED DISPENSING

(71) Applicant: TBOT INC., Toronto (CA)

(72) Inventors: Rehman Merali, Toronto (CA); Brian Lee, Toronto (CA); Paul Giampuzzi, Mississauga (CA); Colin Ho, Toronto (CA); Mina Mitry, Mississauga (CA)

(73) Assignee: TBOT INC., Toronto (CA)

( * ) Notice: Subject to any disclaimer, the term of this patent is extended or adjusted under 35 U.S.C. 154(b) by 0 days.

(21) Appl. No.: 15/507,090

(22) PCT Filed: Aug. 28, 2015

(86) PCT No.: PCT/CA2015/000478
§ 371 (c)(1),
(2) Date: Feb. 27, 2017

(87) PCT Pub. No.: WO2016/029294
PCT Pub. Date: Mar. 3, 2016

(65) Prior Publication Data
US 2017/0238753 A1 Aug. 24, 2017

Related U.S. Application Data

(60) Provisional application No. 62/042,969, filed on Aug. 28, 2014.

(51) Int. Cl.
*A47J 31/44* (2006.01)
*A47J 31/52* (2006.01)
(Continued)

(52) U.S. Cl.
CPC ......... *A47J 31/404* (2013.01); *A47J 31/4403* (2013.01); *A47J 31/52* (2013.01); *G08C 17/02* (2013.01); *H04W 4/80* (2018.02)

(58) Field of Classification Search
CPC .... A47J 31/404; A47J 31/4403; H04W 4/008; G08C 17/02
(Continued)

(56) References Cited

U.S. PATENT DOCUMENTS 4,148,415 A * 4/1979 Florida ............... G01F 11/24
222/284
5,094,153 A 3/1992 Helbling
(Continued)

FOREIGN PATENT DOCUMENTS

CN 1370051 A 9/2002
CN 1379632 A 11/2002
(Continued)

OTHER PUBLICATIONS

Extended European Search Report dated Mar. 14, 2018, issued in European Application No. 15835263.3.
(Continued)

*Primary Examiner* — Jason K Niesz
(74) *Attorney, Agent, or Firm* — Norton Rose Fulbright Canada LLP

(57) ABSTRACT

An apparatus, system and device are provided for dispensing a granular food product into a receptacle for consumption. The apparatus includes: a hopper containing said granular food product, said hopper having an outlet proximate a bottom end thereof; a dispensing rotor mounted in said hopper, said rotor rotatable to push said granular food product through said outlet; a control subsystem operable to receive a signal indicative of a desired quantity of said granular food product and to dispense the desired quantity of said food product through said outlet by rotating said rotor by a specific amount; and a chute positioned below said outlet to direct dispensed food product into said receptacle.

20 Claims, 43 Drawing Sheets

(51) Int. Cl.
  *A47J 31/40* (2006.01)
  *H04W 4/80* (2018.01)
  *G08C 17/02* (2006.01)

(58) Field of Classification Search
  USPC .......................................................... 222/284
  See application file for complete search history.

(56) References Cited

U.S. PATENT DOCUMENTS

| | | | |
|---|---|---|---|
| 9,499,385 B1* | 11/2016 | Studor | ................ B67D 3/0003 |
| 2013/0125768 A1 | 5/2013 | Shi et al. | |
| 2016/0095464 A1* | 4/2016 | Jones | ................ A47J 31/4403 |
| | | | 62/177 |

FOREIGN PATENT DOCUMENTS

| | | |
|---|---|---|
| CN | 101855657 A | 10/2010 |
| CN | 102123938 A | 7/2011 |
| CN | 201977570 U | 9/2011 |
| EP | 0536714 A1 | 4/1993 |
| EP | 1832210 A1 | 9/2007 |
| EP | 1832210 A1 | 9/2017 |
| WO | 2009032874 A2 | 3/2009 |
| WO | 2014075833 A2 | 5/2014 |

OTHER PUBLICATIONS

European Patent Office (EPO), Communication Pursuant to Article 94(3) EPC dated Mar. 29, 2019 for Application No. 15835263.3.

* cited by examiner

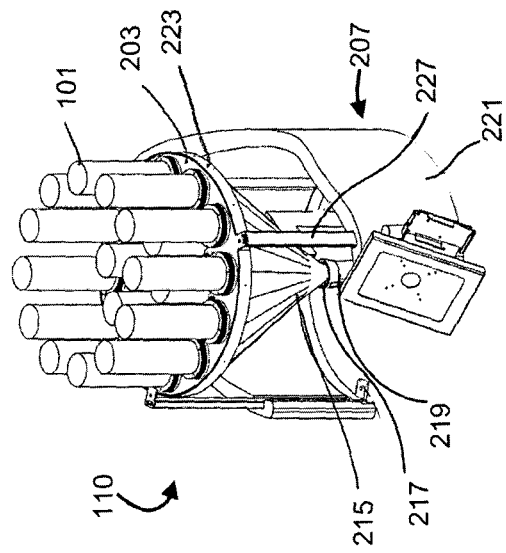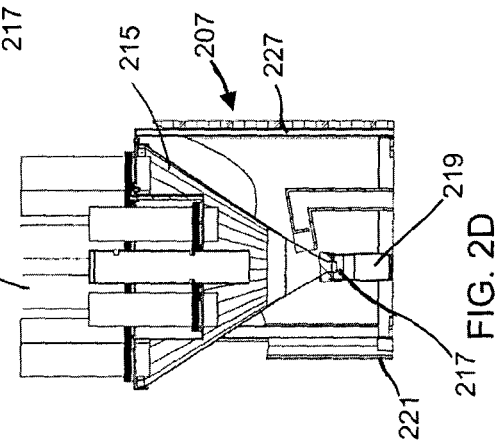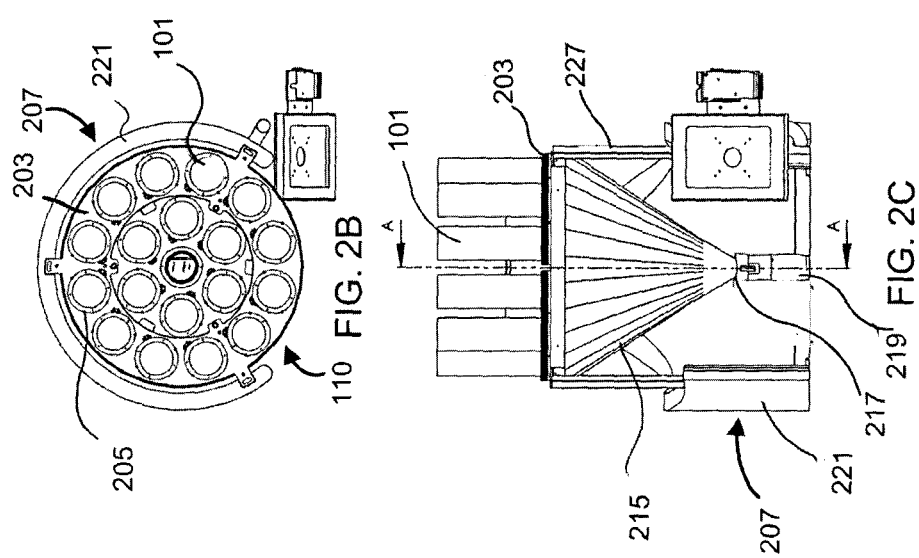

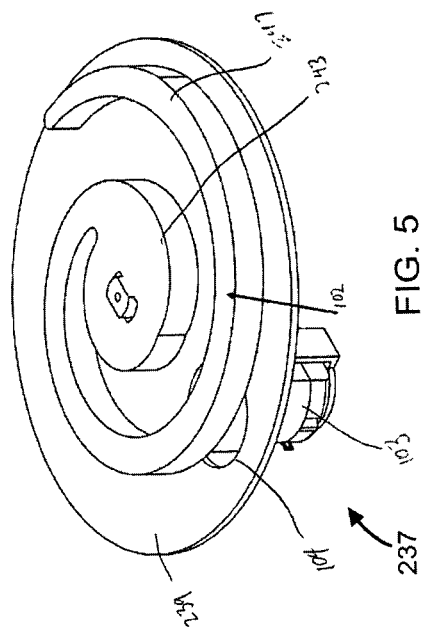
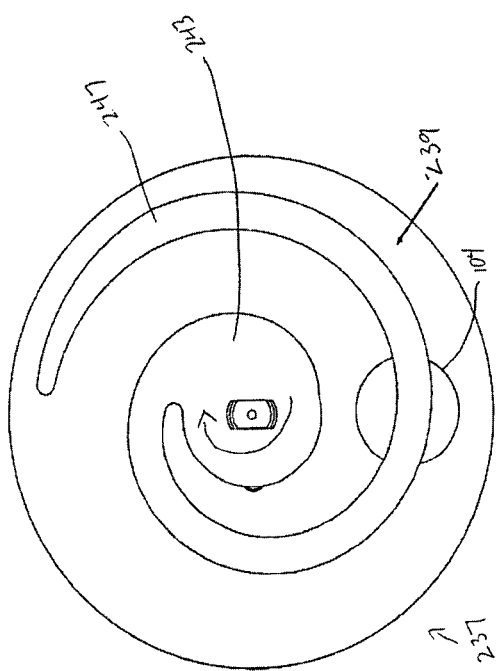
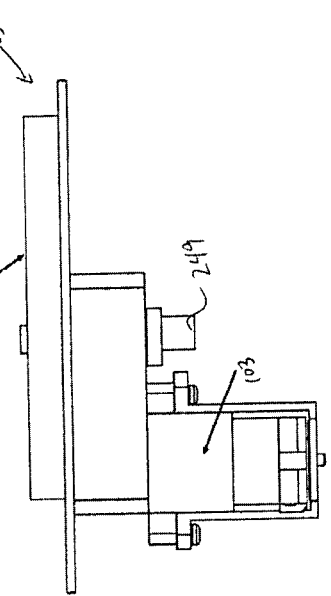
FIG. 5
FIG. 6
FIG. 7

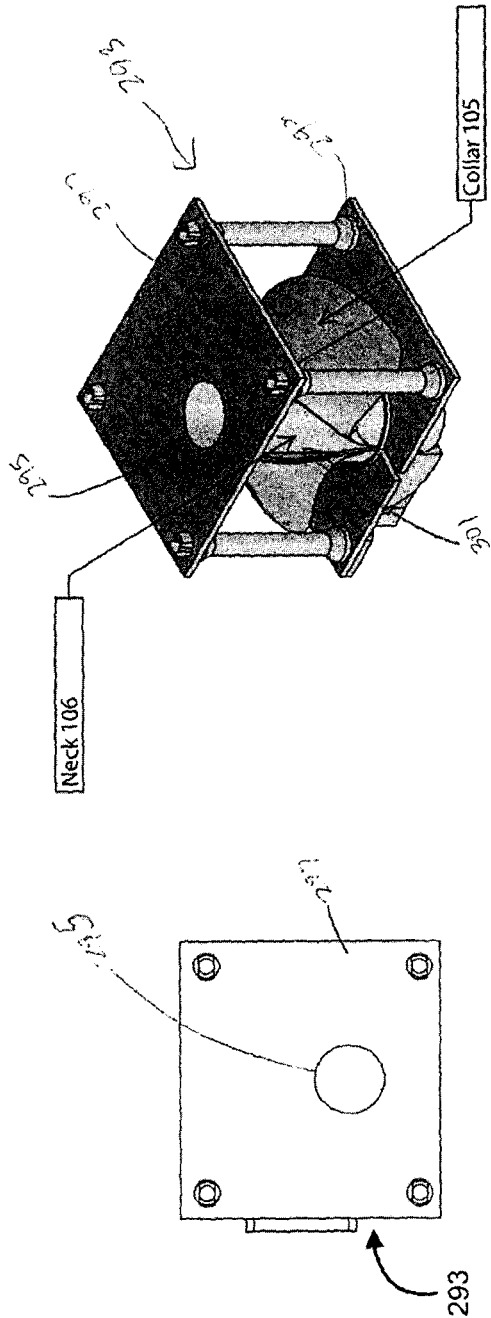
FIG. 17
FIG. 18
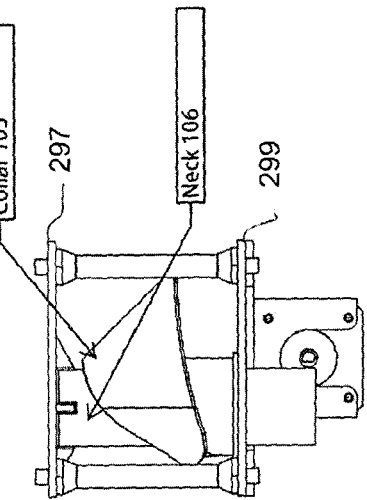
FIG. 20
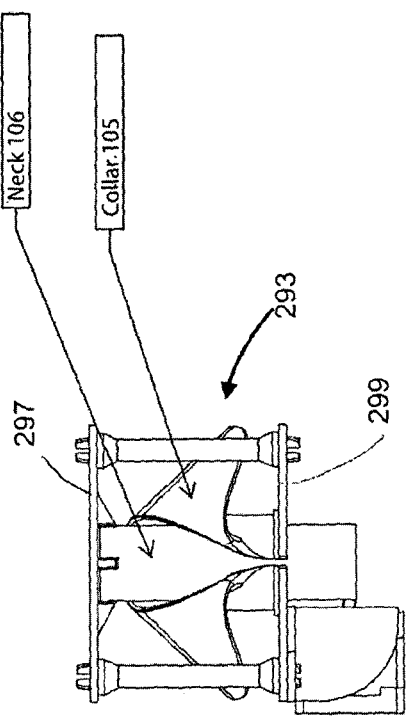
FIG. 19

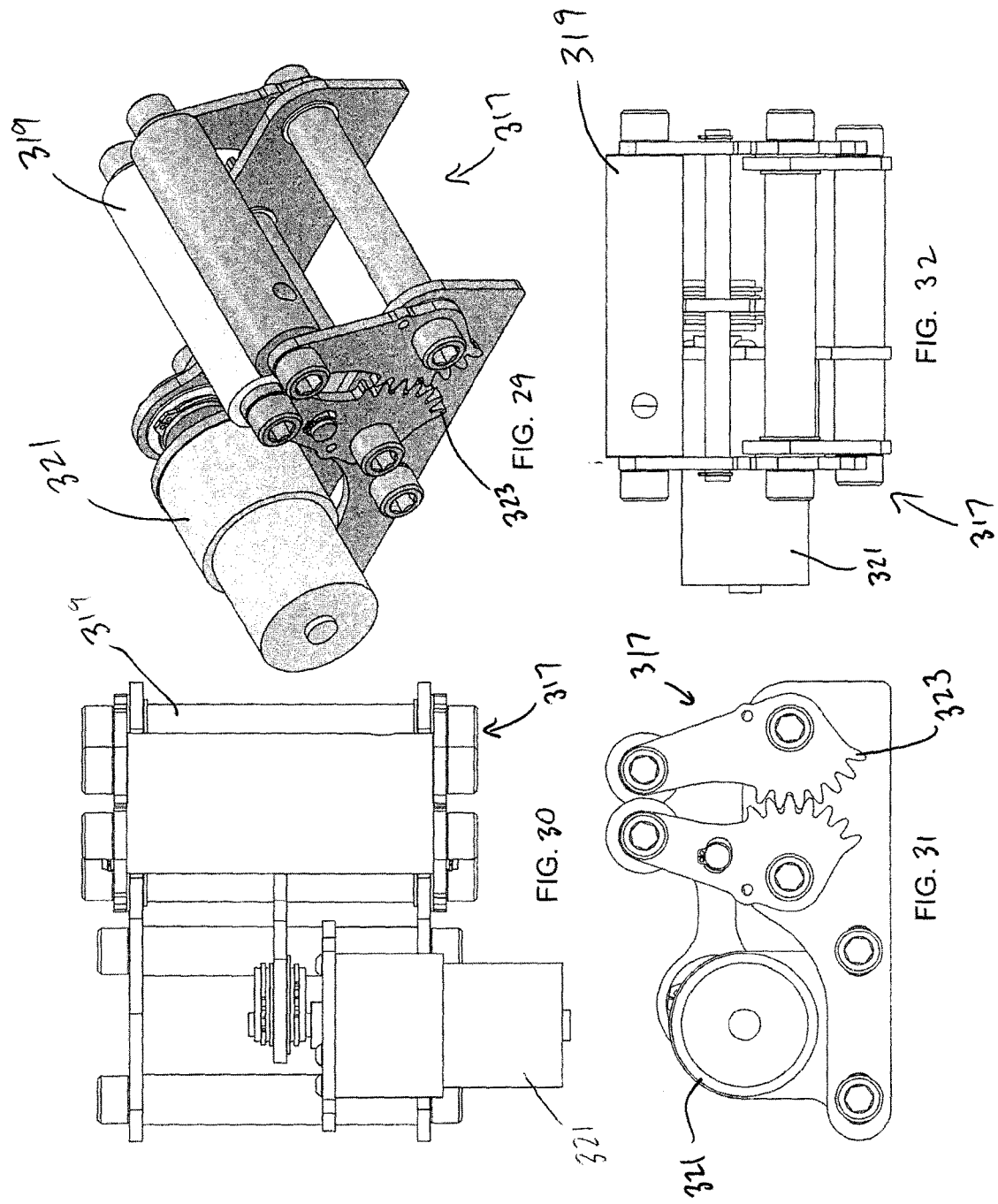

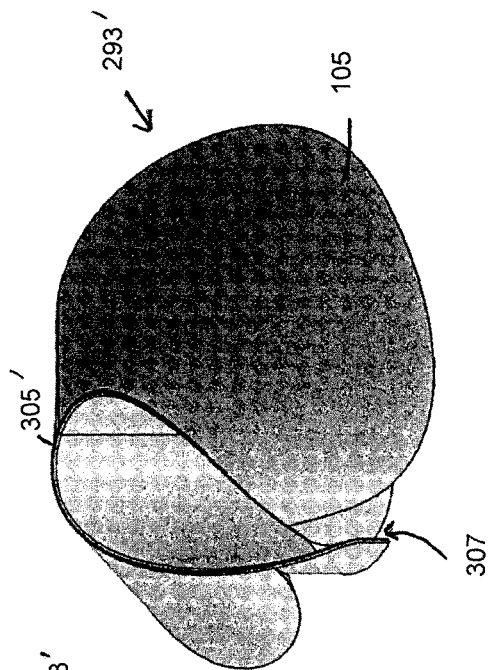
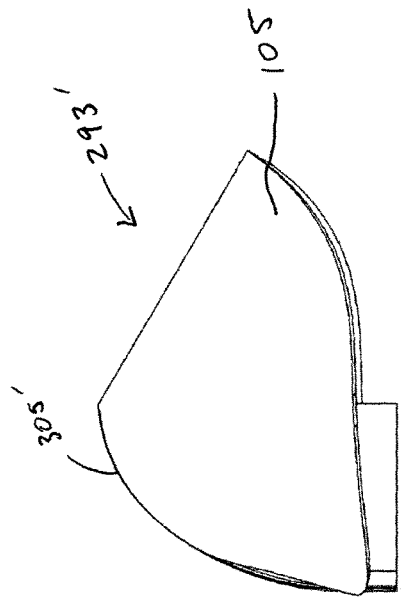
FIG. 35
FIG. 38
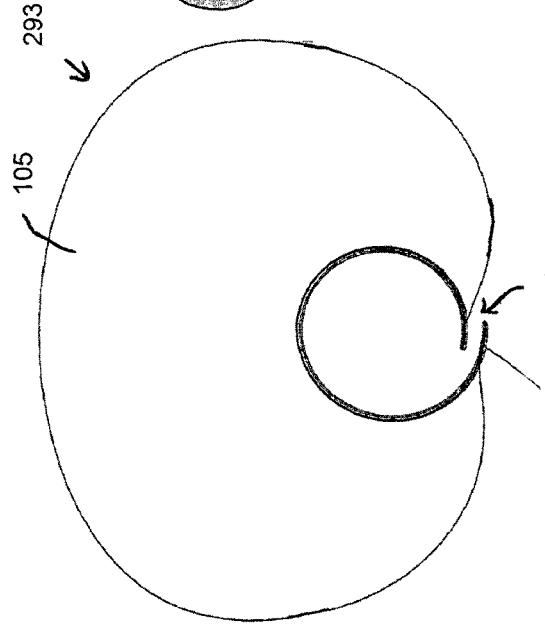
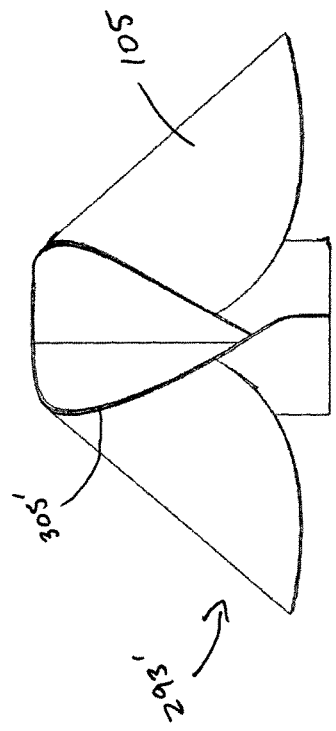
FIG. 36
FIG. 37

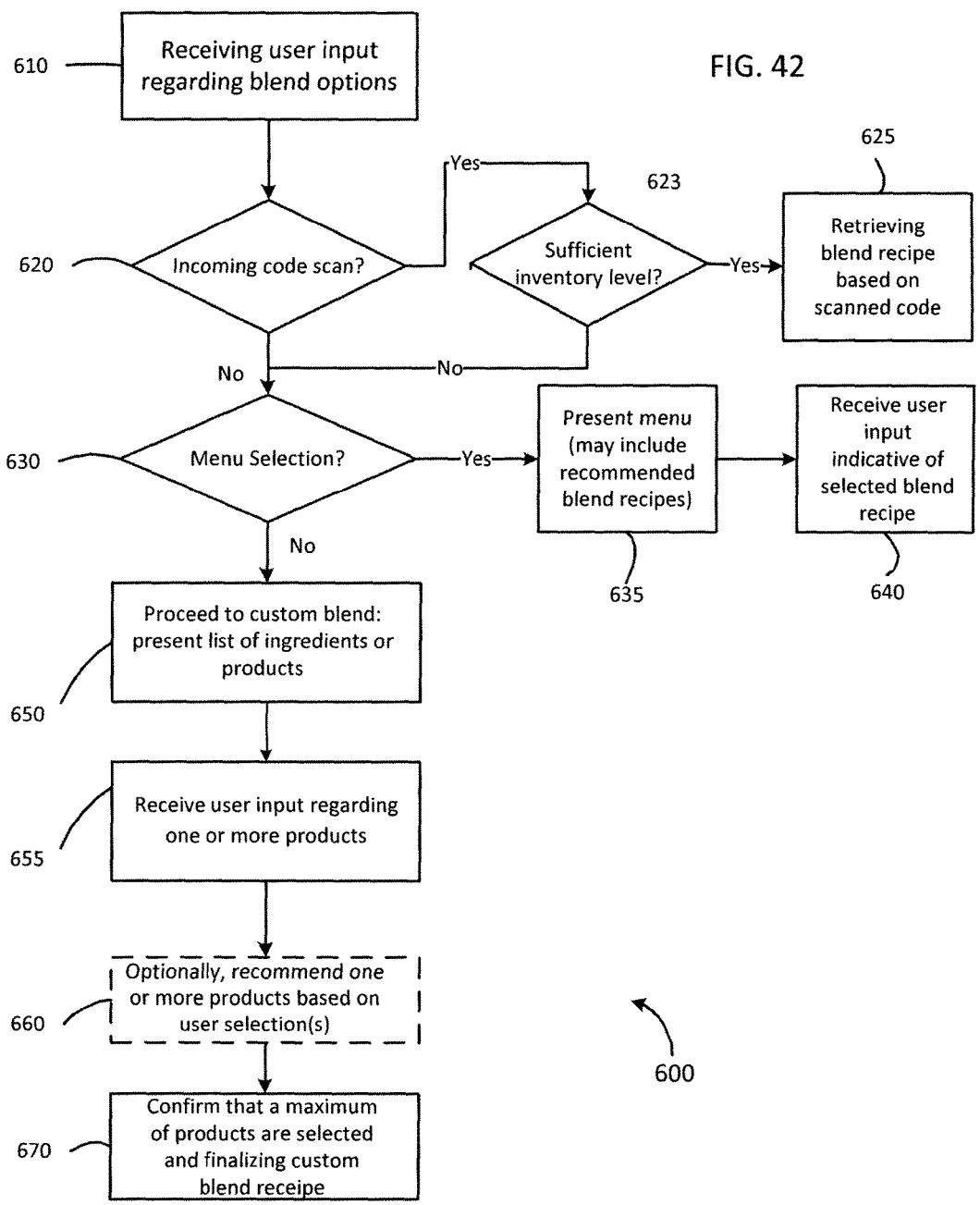

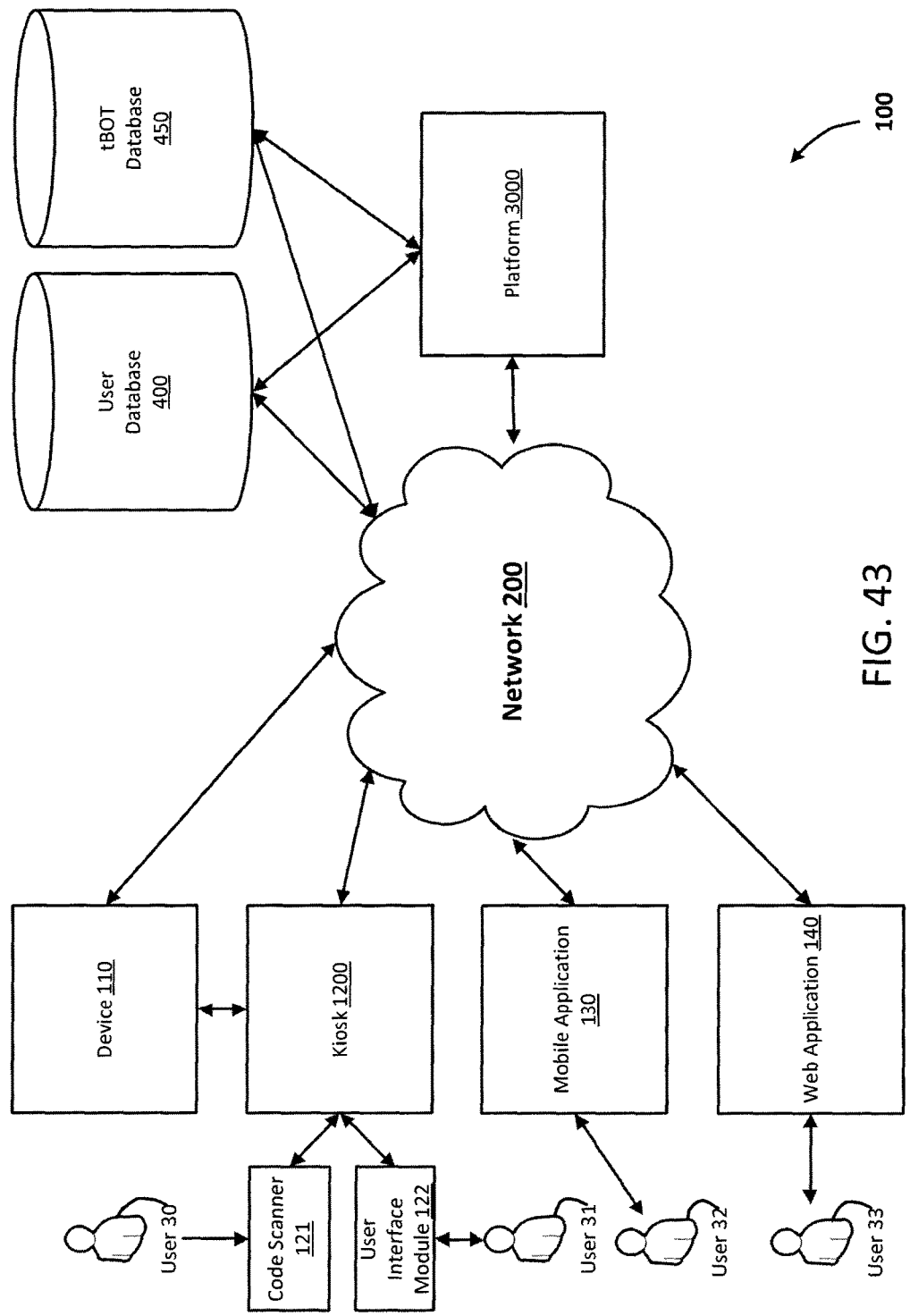

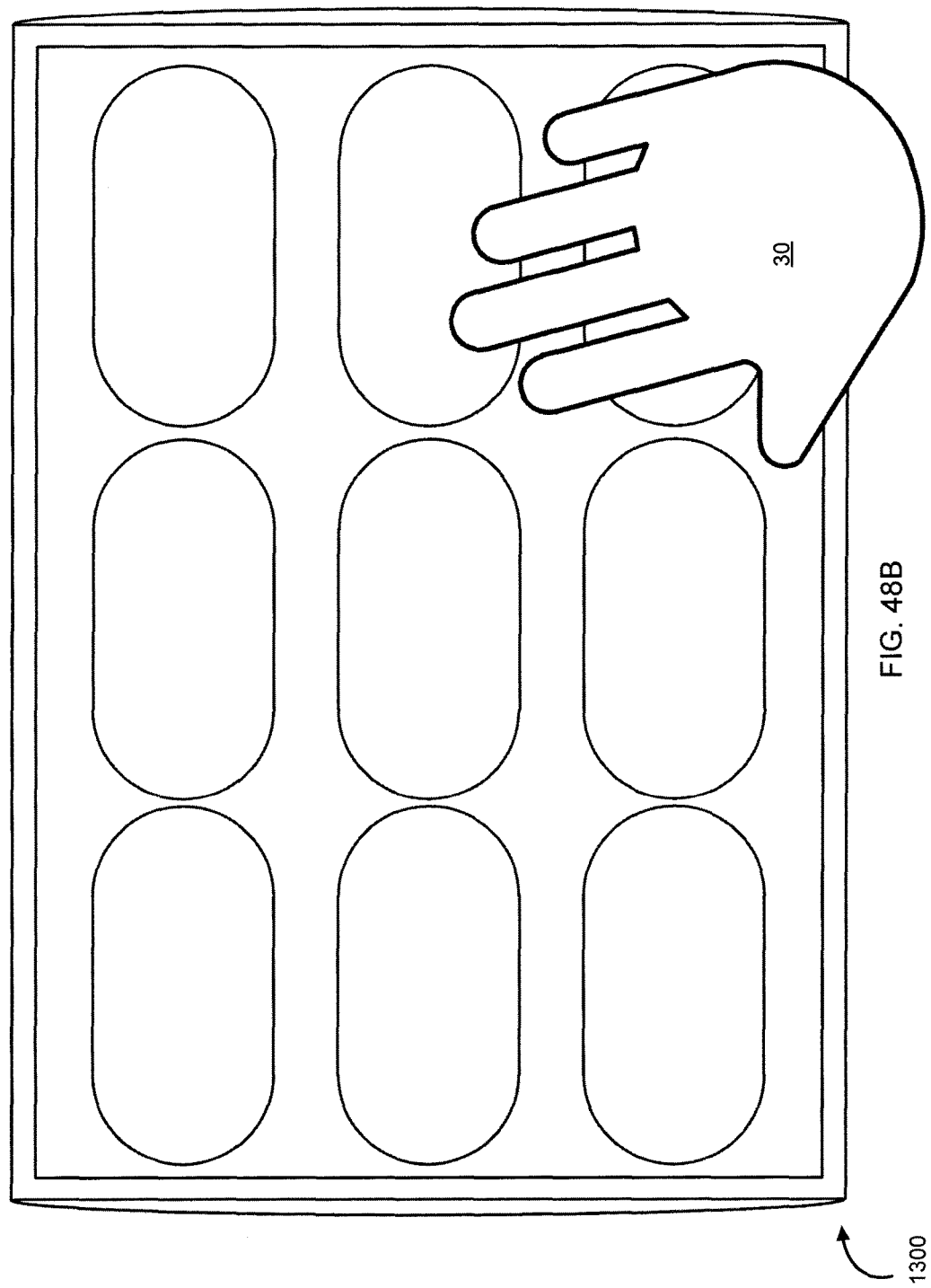

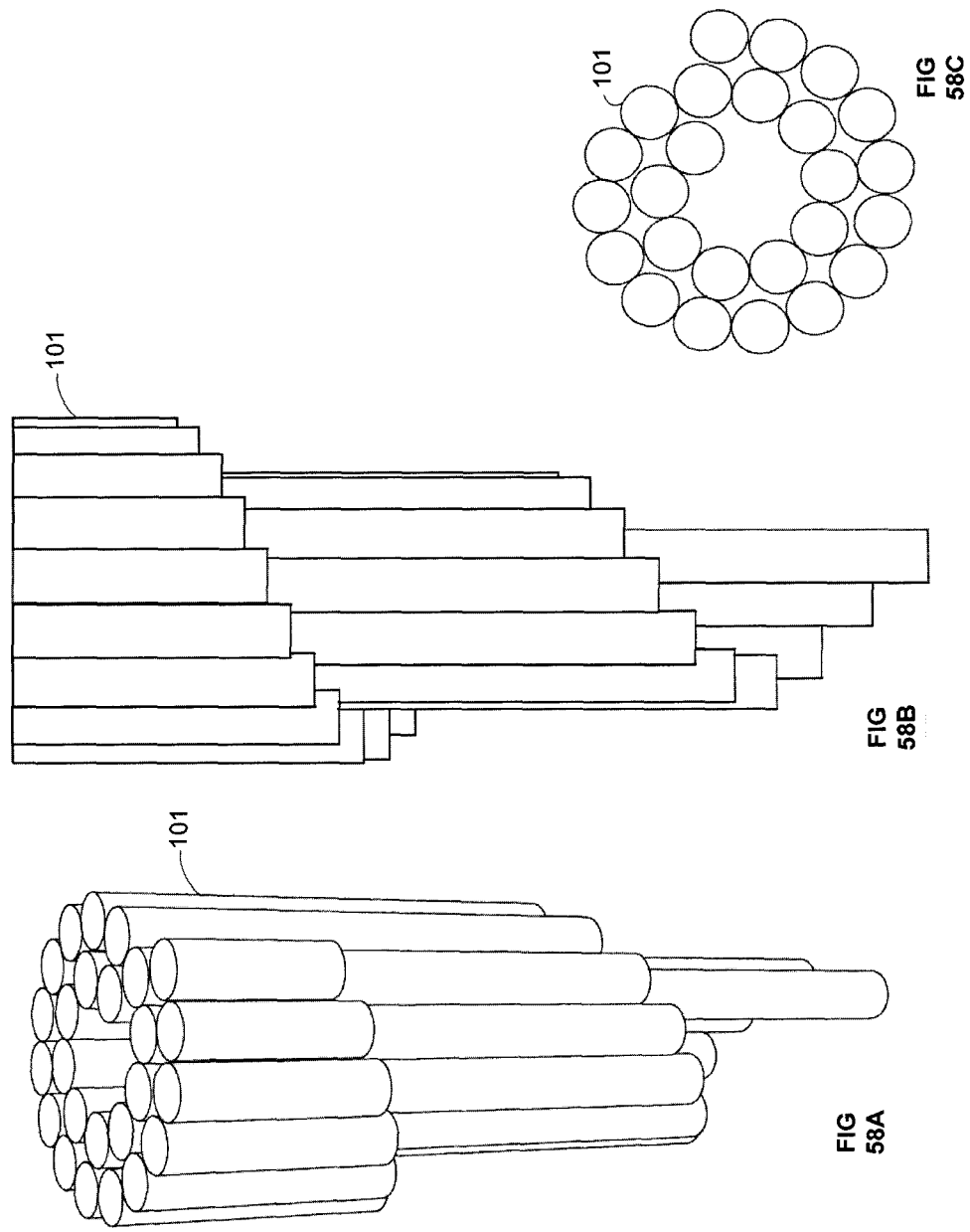

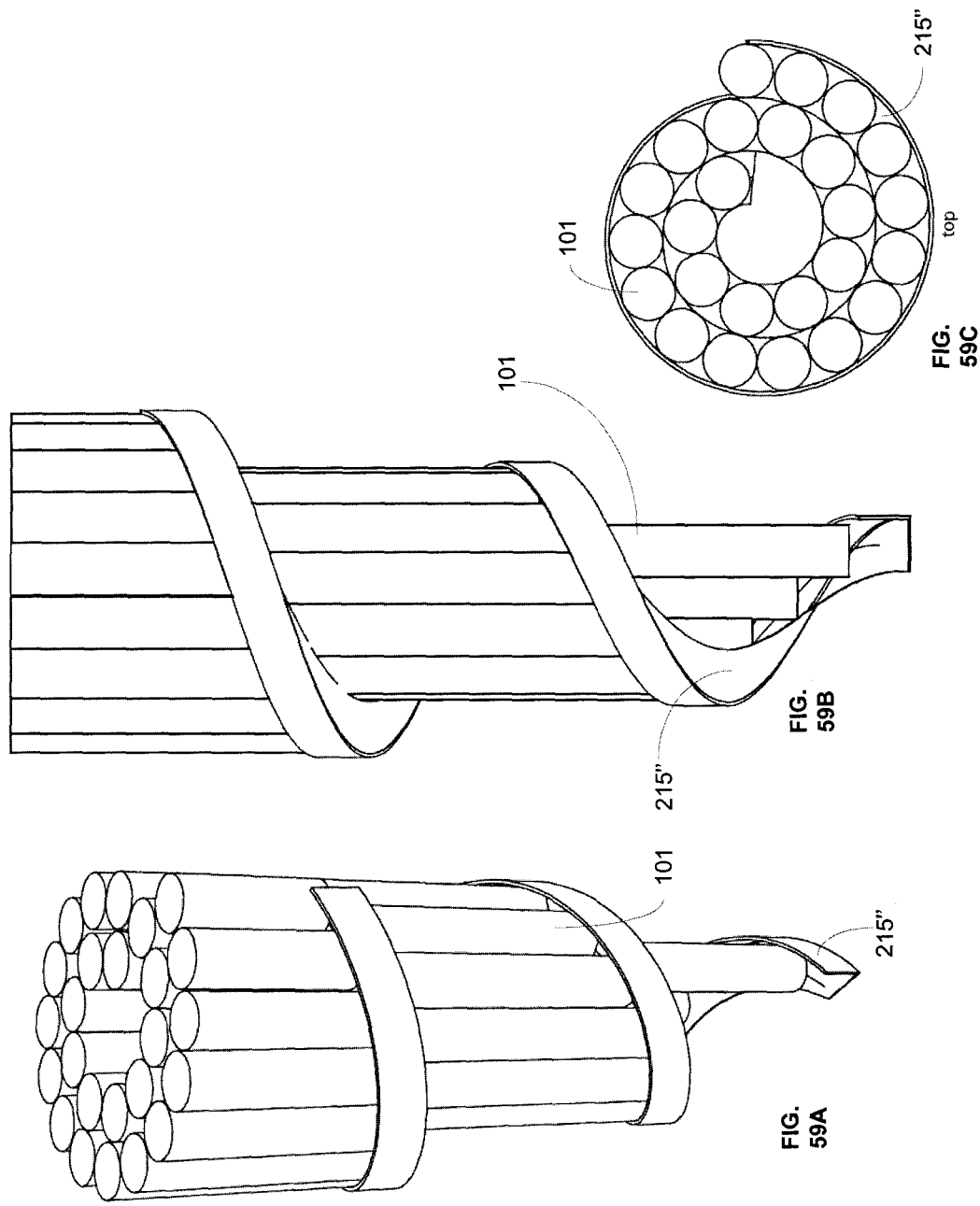

SYSTEMS AND METHODS FOR AUTOMATED DISPENSING

CROSS-REFERENCE TO RELATED APPLICATION

This application claims the benefit of U.S. Provisional Patent Application No. 62/042,969 filed Aug. 28, 2014, the content of which is incorporated by reference in its entirety.

FIELD

This present disclosure relates generally to systems and methods for dispensing food products into a consumption receptacle, and more particularly to systems and methods for customizing or automating the dispensing, or blending of beverages or flavourings.

INTRODUCTION

The automation of food and beverage processing is of importance to many customers. Through purchasing food and beverages from automated vending machines, consumers are able to obtain products quickly, affordably, and outside of regular business hours. Such systems also are important to business owners who, through use of automated food and beverage dispensing, are able to streamline operations and cut costs.

However, there may be two challenges facing the automated food and beverage dispensing industry. The first challenge involves the dispensing of food and beverages that are customized to a consumer's individual tastes. The second challenge involves the dispensing of delicate and/or structurally complex products that usually require the skill of a person in order to provide customers with accurate and quality products.

Currently, devices exist that may dispense beverages such as coffee according to preset recipes. However, such devices do not solve the challenges of dispensing customized beverages, especially beverages that may involve delicate or complicated flavoring products.

SUMMARY

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

An apparatus, system and device are provided for dispensing a granular food product into a receptacle for consumption. The apparatus may include: a hopper containing said granular food product, said hopper having an outlet proximate a bottom end thereof; a dispensing rotor mounted proximate said bottom end of said hopper, said rotor rotatable to push said granular food product through said outlet; a control subsystem operable to receive a signal indicative of a desired quantity of said granular food product and to dispense the desired quantity of said food product through said outlet by rotating said rotor by a specific amount; and a chute positioned below said outlet to direct dispensed food product into said receptacle.

In one aspect, said rotor may be configured to push said granular food product with a convex leading surface.

In another aspect, said rotor may have an arm extending in a spiral configuration.

In yet another aspect, said rotor can be rotated clockwise or counter-clockwise, and wherein said rotor is configured to push said granular food product in either direction with a convex leading surface.

In one aspect, the apparatus may include an agitator fixed to said rotor for mixing said granular food product in said hopper.

In another aspect, the apparatus may include a plurality of hoppers, each of said hoppers having an outlet proximate a bottom end thereof and a dispensing rotor rotatable to push a granular food product through said outlet.

In yet another aspect, said hoppers contain a plurality of different food products and said control subsystem is operable to receive a signal indicative of a desired blend of specific amounts of ones of said food products, and to dispense said food products according to said desired blend by rotating corresponding ones of said rotors by specific amounts.

In still another aspect, said control subsystem is operable to receive said signal by wireless transmission.

In one aspect, said control subsystem is operable to receive said signal by near-field communication.

In another aspect, said control subsystem is operable to send a and receive payment signals over a computer network.

In yet another aspect, said granular food product comprises loose tea.

A method of dispensing a blend of a plurality of granular food products into a receptacle for consumption is provided. The method may include: receiving a wirelessly transmitted signal identifying a desired recipe comprising respective quantities of said plurality of food products; sending dispensing signals to a plurality of hoppers, each containing a respective one of said plurality of food products, said dispensing signals causing said hoppers to dispense said food products in said respective quantities; and directing said dispensed food products into said receptacle for consumption.

In one aspect, said method includes pushing said granular food product with a rotor having a convex leading surface.

In another aspect, said method includes receiving said wirelessly transmitted signal over a computer network.

In yet another aspect, said method includes receiving said wirelessly transmitted signal by near-field communication.

Instill another aspect, said signal is received by near-field communication from a tag on a drinking receptacle.

In one aspect, said method includes sending a message representative of said desired recipe to a database.

In another aspect, said sending a message comprises sending a message to a server over a computer network.

In yet another aspect, said method includes receiving a user input indicative of an ingredient preference of a user and presenting a recommendation based on said user input.

In still another aspect, said user input is received by wireless transmission.

In some embodiments, the device may be configured to prepare multiple outputs. Such outputs may include (a) a cup of tea; and, (b) custom-made tea bags that may be taken home for subsequent brewing. In some embodiments, there may be various options for indicating the heat of the tea, which may include, but are not limited to, preparing tea that is heated, cold, and/or room temperature. For example, the system may be configured such that the user may select the temperature, and the temperature may have the ability to provide various hot and cold temperatures.

In some embodiments, the device may be configured to add sweetener directly into the bag or beverage container by means of a dispenser or other such means of releasing sweetener.

In some embodiments, the device may be configured to dispense a cup, for example, via a top-dispensing mechanism. In some embodiments, the dispensing mechanism may be configured such that a cup rises from a base.

In some embodiments, the device may be configured to dispense beverage flavouring directly into a beverage flavouring bag via a flavouring dispenser.

In some embodiments, the device may be configured with a bag sealer to seal beverage flavouring bags automatically.

In some embodiments, the device may be configured to print text and/or designs onto beverage flavouring bags. For example, the device may be configured to print the name of a user and/or a particular logo on beverage flavouring bags.

In some embodiments, the device may be configured with a bag cutter to measure, cut, and seal material in order to create beverage flavouring bags.

In some embodiments, the device may be configured automatically to measure, cut, and seal beverage flavouring bags based on user input data and/or other data, including, but not limited to, the size of cup present. For example, a user may select a quantity and/or quality of product which requires a particular sized beverage flavouring bag. The device may then measure, cut, and seal such a bag and, then, vend that bag.

In some embodiments, the device may be configured with a sensor enabling it to determine the height and/or width of a cup. This may be used to allow the device to alter its various other functions. For example, the size of cup present may cause the device to perform a particular process in order to measure, cut, seal, fill, and vend a flavouring bag sized to that cup.

In some embodiments, the device may be configured with a system to store or intake water and/or other liquids.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

FIG. 2a is a perspective view of a dispensing device of the system of FIG. 1;

FIG. 2b is a top elevation view of the dispensing device of FIG. 2a;

FIG. 2c is a front elevation view of the dispensing device of FIG. 2a;

FIG. 2d is a section view of the dispensing device of FIG. 2a along line A-A in FIG. 2c;

FIG. 4 is a perspective view of a hopper of the dispensing device of FIG. 2a;

FIG. 5 is a perspective view of a dispensing assembly of the hopper of FIG. 4;

FIG. 6 is a top elevation view of the dispensing assembly of FIG. 5;

FIG. 7 is a side elevation view of the dispensing assembly of FIG. 5;

FIG. 17 is a perspective view of a tube forming device;

FIG. 18 is a top elevation view of the tube forming device of FIG. 17;

FIG. 19 is a front elevation view of the tube forming device of FIG. 17;

FIG. 20 is a side elevation view of the tube forming device of FIG. 17;

FIG. 29 is a perspective view of another sealing device;

FIG. 30 is a top elevation view of the sealing device of FIG. 29;

FIG. 31 is a front elevation view of the sealing device of FIG. 29;

FIG. 32 is a side elevation view of the sealing device of FIG. 29;

FIG. 35 is a perspective view of another folding guide;

FIG. 36 is a top elevation view of the folding guide of FIG. 35;

FIG. 37 is a front elevation view of the folding guide of FIG. 35;

FIG. 38 is a side elevation view of the folding guide of FIG. 35;

FIG. 39 is a block diagram of a control system of the device of FIG. 2a;

FIG. 42 provides a workflow diagram of a process of determining a blend recipe performed by the platform 3000, according to some example embodiments;

FIG. 43 provides another high-level block schematic diagram of a platform 3000 and associated network components, in accordance with some other embodiments;

FIG. 48B provides a depiction of the kiosk's user interface module according to some embodiments;

FIG. 58A is a perspective view of another dispensing device;

FIG. 58B is a front view of the dispensing device of FIG. 58A;

FIG. 58C is a top view of the dispensing device of FIG. 58A;

FIG. 59A is a perspective view of another dispensing device;

FIG. 59B is a front view of the dispensing device of FIG. 59A; and

FIG. 59C is a top view of the dispensing device of FIG. 59A.

DETAILED DESCRIPTION

Terms and Definitions

Figure 1:
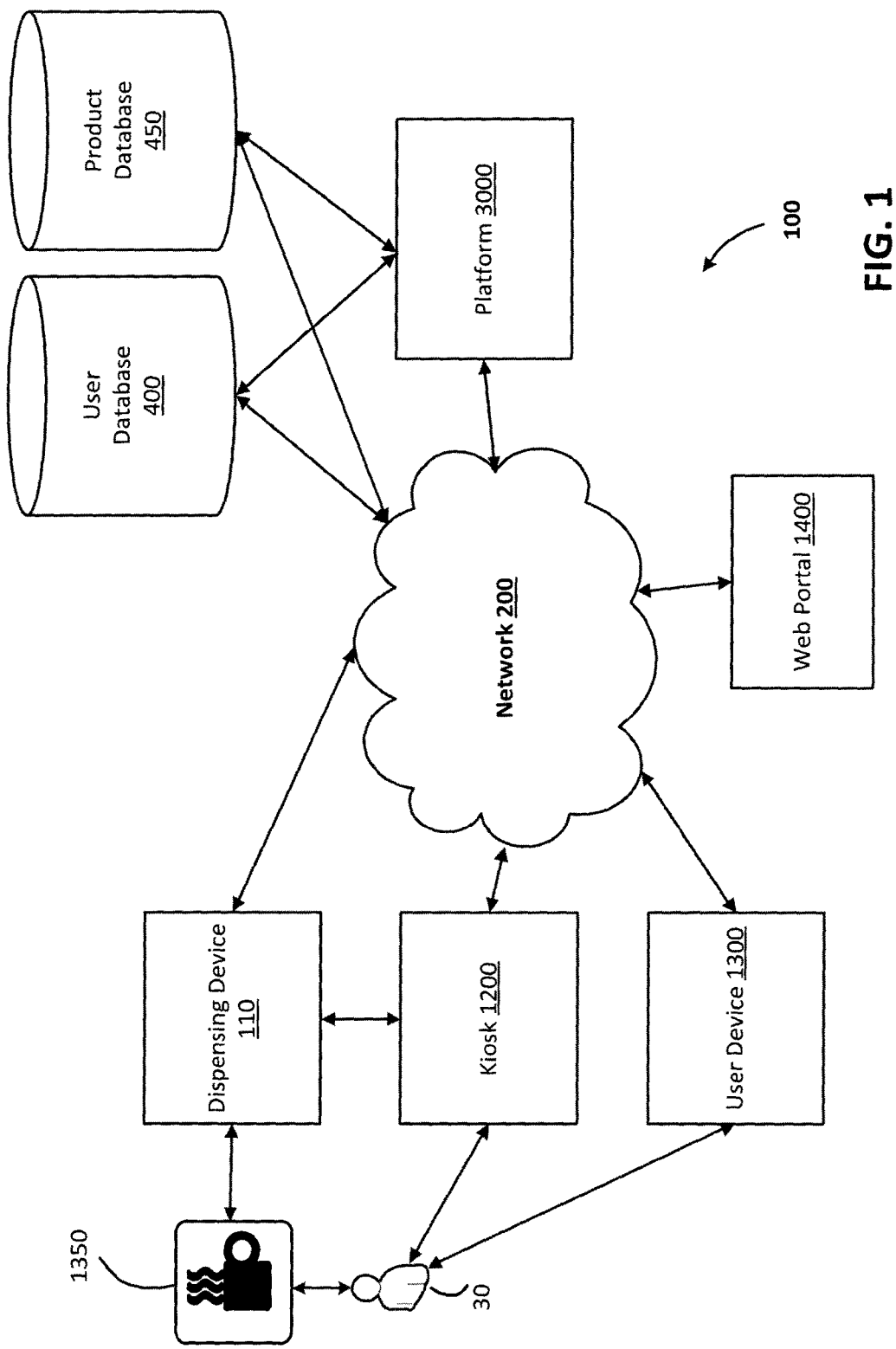
FIG. 1 illustrates a system block diagram of a food product dispensing system 100, in accordance with some example embodiments.

In the below descriptions words may carry their usual meaning or the meanings outlined herein. However, these meanings are not intended to limit in any way the scope of possible meaning for the terms defined hereunder. In this regard:

"Beverage" may mean one or more liquids flavoured with one or more types of flavourings.

"Flavouring", "inventory", "ingredient" or "product" may refer to the flavourings or ingredients that are used to add flavour to one or more liquids in order to make a beverage or a food product ready to be consumed.

"Device" may mean an apparatus used to add one or more flavourings to liquid in order to prepare a beverage.

"Customer" and/or "user" may mean a person or entity that purchases a beverage prepared by the device.

"Bag" may mean a sealed fold of material or other similar means used to hold flavourings for use in a beverage.

"Blend" may mean a combined food product comprising one or more flavourings, with or without water.

"Blend recipe" or simply "recipe" may mean a list of individual flavourings, ingredients or products and a specific quantity for each listed flavouring, ingredient or product. The blend recipe may also include a ratio between respective quantities of one or more listed flavourings, ingredients or products. The blend recipe may further include a specific temperate at which one or more listed flavourings, ingredients, or products should be steeped (e.g. brewed in hot water).

"Kiosk" may mean an apparatus with a display screen that may receive input from a customer in order to cause the device to prepare a beverage. In some embodiments, the kiosk may a tablet device.

"Mobile device" or "user device" may mean an apparatus such as, but not limited to, a smart phone, a tablet (e.g. iPad™), a smart watch (e.g. Apple Watch™) or other device that may transmit and receive electronic signals for the purpose of ordering a food product, a beverage or a bag of flavourings. In some embodiments, the mobile device may be configured for operation online, or off-line.

"Server platform" or simply "platform" may mean a server environment that processes and sends requests and executes logical sequences through computer hardware, processor-executable instructions and computer-readable media.

"Database" may mean one or more tables of stored information on non-transitory computer-readable media.

"Hopper" may mean an apparatus used to contain a specific type of flavouring that may be arranged together with other hoppers in order to release specific flavourings into a beverage.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The present system and method may be practiced on computer devices including a desktop computer, laptop computer, tablet computer or wireless handheld having the ability to connect with the Internet and/or various social networking platforms and/or promotional offer inventory systems. In some embodiments, the systems and methods may be performed on distributed networking devices, such as devices arranged in a "cloud computing" implementation.

The computing device components may be connected in various ways including directly coupled, indirectly coupled via a network, and distributed over a wide geographic area and connected via a network (which may be referred to as "cloud computing").

For example, and without limitation, a computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and processes described herein.

The present disclosure relates to a system, method, and a device operable for preparation of beverages or product including, but not limited to, hot loose-leaf tea. Preparation may include, but is not limited to, blending, bagging, steeping, and dispensing tea and/or other beverage flavourings as well as heating water to a specific temperature, and dispensing water.

The present disclosure in some embodiments describes a process and/or a device for a kiosk system with various capabilities that may include ordering, customizing, preparing, and vending beverage flavourings and prepared flavoured beverages. The system and method of the present invention in the embodiments described below may enable a user to order a pre-defined flavoured beverage, and/or a customized flavoured beverage, and/or a portion of beverage flavouring for later use. In particular, some embodiments may be used to capture customer input either through a kiosk interface and/or over a communications network. Customer input may then be received and executed by the dispensing system in order to produce flavoured beverages and/or beverage flavouring for later use.

Referring now to FIG. 1, which illustrates a system block diagram of a food product dispensing system 100, in accordance with some example embodiments. Dispensing system 100 may include a dispensing device 110, one or more databases 400, 450, a server platform (or simply "platform") 3000, a kiosk 1200, and a user device 1300 over a network 200.

Dispensing device 110 may be configured for dispensing one or more granulated food product, such as tea leaves or herbs into a receptacle for consumption. For example, dispensing device 110 may dispense a brewed cup of tea, or a sealed tea bag, on demand based on user selection or customization in accordance with embodiments described herein.

Dispensing device 110 may be configured to receive electronic input from a kiosk 1200 connected to the dispensing device 110. Alternatively or concurrently, the 1200 may be connected to the dispensing device 110 over network 200. Kiosk 1200 may be implemented by way of a tablet device such as iPad™. Kiosk 1200 may have a touch screen display and interface for displaying data and receiving user inputs.

User devices 1300 may include any suitably configured device that may communicate with platform 3000. For example, it may be a smart phone, a tablet device or a smart watch. The user device 1300 may include a mobile application thereon for interfacing with kiosk 1200 and/or platform 3000.

In some embodiments, users may, by causing network signals to be transmitted via a network to the platform through the use of the mobile application, be able to control various aspects of the dispensing device 110, kiosk 1200, and/or the platform 3000. Interaction with dispensing device 110, kiosk 1200, or platform 3000 via a mobile application may allow users to customize beverages prepared by the dispensing device 110, such as a customized blend of brewed tea.

In some embodiments, the user device 1300, such as a mobile phone, may be configured to store and/or display a two dimensional code on the mobile device's display by which orders may be executed and verified at a kiosk 1200. The mobile application may also be configured to generate 2D barcodes that can be read by a kiosk 1200 or directly by dispensing device 110. In some embodiments, the mobile application may be configured to provide remote access and/or control functionality associated with the kiosk.

An example of a user device 1300 may be a mug 1350 that is configured to communicate with the dispensing device 110 directly over a short range. For example, the mug 1350 may communicate with dispensing device 110 over infrared (IR) or Near Field Communication (NFC) technologies. In one embodiment, the mug 1350 may be configured with a NFC device or tag that is operable to communicate with a NFC reader on dispensing device 110. The NFC tag on the mug 1350 may be pre-programmed or customized to store electronic data representative of a favorite blend of the user 30. The NFC reader on dispensing device 110 may receive the electronic data wirelessly or upon contact with the mug 1350. Dispensing device 110 may then act accordingly, as described herein.

In another embodiment, a RF reader in the dispensing device 110 may be configured to detect Radio Frequency (RF) tags. The RF tag may enable the device 110 to communicate with user devices 1300 such as smart phones, smart watches, as well as with passive RF tags embedded within a mug. Therefore, if and when a user places a mug 1350 on a designated surface of the device 110, the device 110 may be configured to determine which products to dispense and blend, in accordance with a pre-set blend recipe including a quantity of each ingredient, a pre-set water temperature and volume as well as pre-set amount(s) of sweetener and dairy, if applicable. In addition, the user may be billed automatically, through platform 3000, using a pre-set payment method stored in the corresponding user account. Further, the device 110, through platform 3000, may be configured to issue a receipt, text/message the user when the blended beverage has been steeped to the right temperature. In one embodiment, a single RF or NFC tag may be able to replace the ordering and payment system.

Web portal 1400 may be a portal available to users 30 for managing user accounts, viewing order history, customizing blends, and/or other types of activities. Web portal 1400 may be facilitated in whole or in part by platform 3000.

Figure 44:
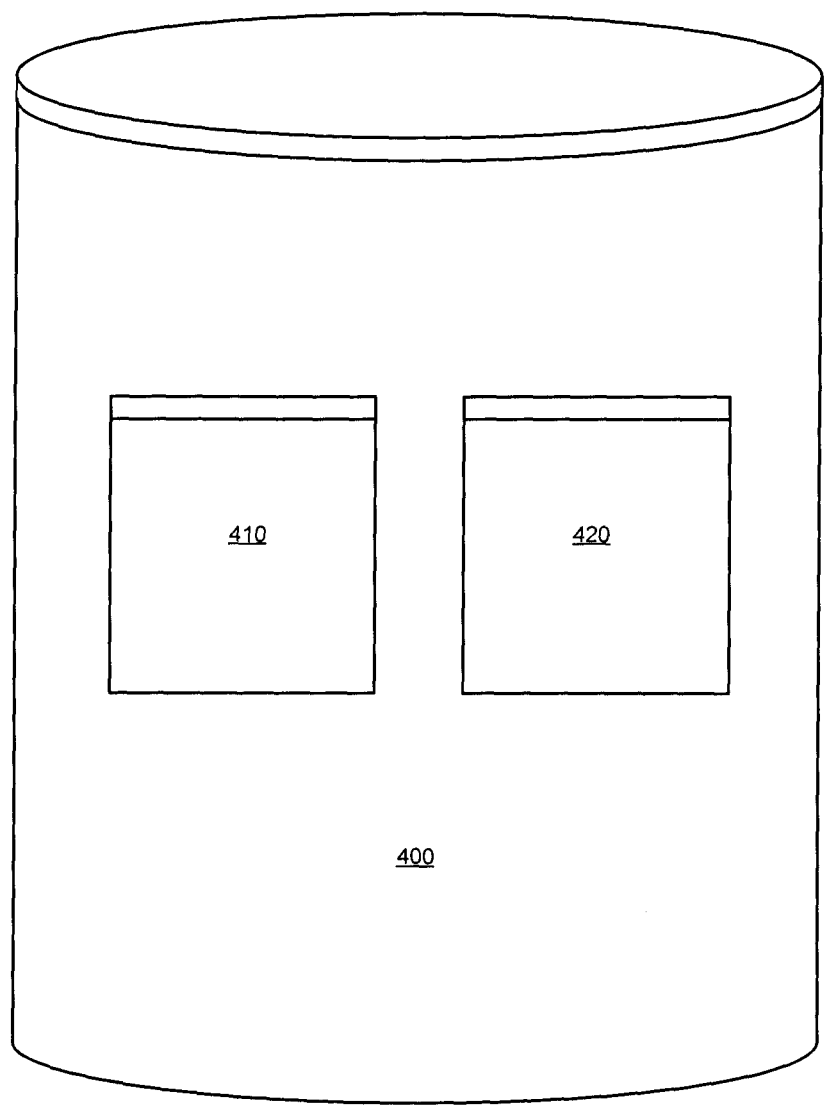
FIG. 44 provides a block diagram of the User Database 400 according to some embodiments.

User database 440 may store user account information and other types of user data such as order history, payment information, credit amount, pending balance, and so on. Referring now to FIG. 44, in one embodiment, user database 400 may include user customization table 410 and user purchase history table 420. User customization table 410 may be configured to store one or more customized blend recipes that a user has ordered, created or otherwise associated with the user (e.g. "liked" on a social media platform). User purchase history table 420 may be configured to save all purchases the user has made, and may specify the devices 1300, 1350 through which the user has used for said each purchase.

Figure 45:
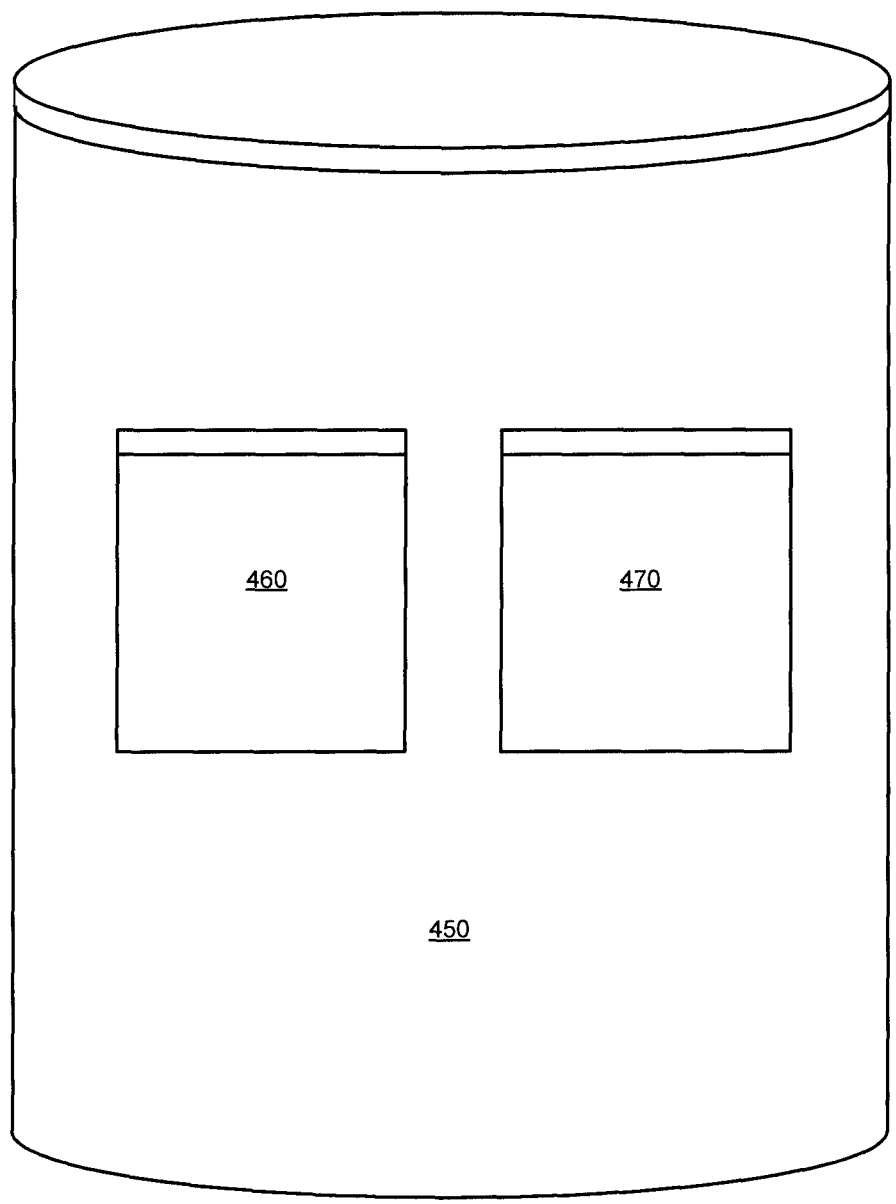
FIG. 45 provides a block diagram of the Product Database 450 according to some embodiments.

Product database 450 may store information related to products (e.g. inventory level) and associated instructions for dispensing said products. Referring now to FIG. 45, in one embodiment, product database 400 may include product inventory table 460 and device instruction table 470.

Platform 3000 may be comprised of one or more servers having one or more processors, operating in conjunction with one or more computer-readable storage media, configured to provide backend services, such as data processing, data storage, data backup, data hosting, among others. Each of these subsystems may be implemented using one or more modules comprising instruction sets executed on one or more processors. Details of platform 3000 is further elaborated below. Platform 3000 may be configured to receive user inputs and instruct dispensing device 110 to dispense the appropriate products or blend based on user inputs. Platform 3000 may also be operable to facilitate and support web portal 1400.

Network 200 may be any type of network, including, but not limited to, the internet, various intranets, wireless connections, wired connections, etc.

FIGS. 2a-2d depict an example dispensing device 110. Dispensing device 110 includes a number of product hoppers 101, each of which is configured to contain a granulated food product and dispense the product in precise amounts when desired. The device may also include a mechanism for releasing liquid. The device may also include a mechanism for producing, filling and sealing flavoring bags that may be used to store beverage flavoring for later consumption.

FIGS. 2a, 2b and 2c depict perspective, top and front views of device 110. FIG. 2d depicts a side section view of device 110 along line A-A shown in FIG. 2c. In the embodiment depicted, device 110 includes 19 cylindrical hoppers 101 in which various products and/or ingredients such as flavourings may be held. The device need not be limited to 19 hoppers 101. The hoppers 101 may be arranged in various manners.

Figure 3:
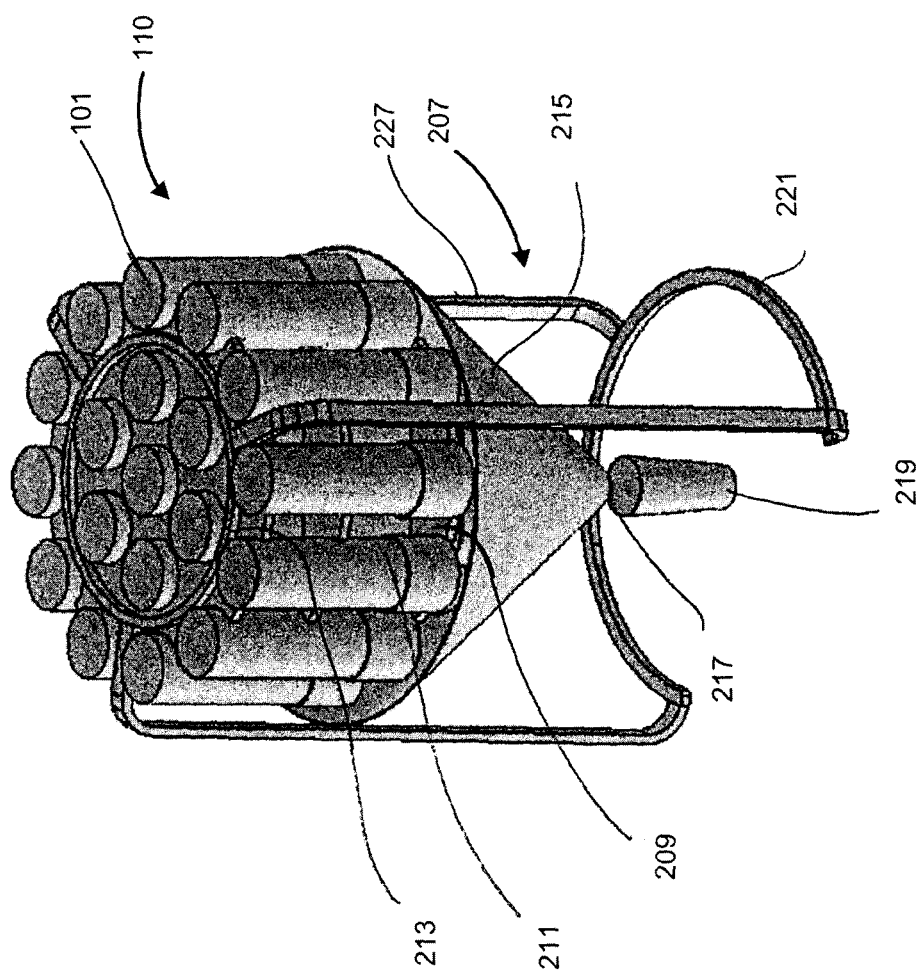
FIG. 3 is a perspective view of another dispensing device.

As depicted, hoppers 101 are generally cylindrical, and are received in corresponding apertures 205 of a retainer structure 203. FIG. 3 depicts a top view of retainer structure 203 in greater detail. As depicted, apertures 205 of retainer structure 203 are arranged generally in concentric circular patterns. Thus, when received in retainer structure 203, hoppers 101 are likewise arranged generally in concentric circular patterns. Such an arrangement may allow good visibility of hoppers 101 to a user of device 110, such that hoppers 101 generally do not obscure one another from view. Moreover, hoppers 101 may be constructed of translucent or transparent material to permit viewing of products inside the hoppers.

Retainer structure 203 may be mounted to a support frame 207 such that hoppers 101 are maintained in a generally vertical orientation.

In some embodiments, retainer structure 203 may be partially constructed from multiple members. For example, retainer structure 203 may include a plurality of tiered plates which may be designed in order to increase the amount of product displayed. For example, FIG. 3 depicts an embodiment with a retainer structure formed of three pieces: a bottom plate 209, middle plate 211, and a top plate 213. The bottom plate 209 may act as a base plate for the outer ring.

Referring to FIGS. 2a-2d, Dispensing device 110 may further include a chute 215. Chute 215 may be mounted to support frame 207 and positioned below hoppers 101. Chute 215 may be configured to receive material dispensed from hoppers 101 and direct the received material through a blend outlet 217, into a consumption receptacle 219 such as a cup or mug. The consumption receptacle may be supported on a bed. In some embodiments, the bed may include a wireless communication receiver, such as a near field communication reader or Bluetooth receiver for reading information from a consumption receptacle placed below chute 215. In such embodiments, the wireless communication reader may be interconnected in data communication with a control system of device 110. As depicted, chute 215 is frustoconical in shape. However, in other embodiments, chute 215 may have any other suitable shape.

As shown in FIGS. 2a-2b, support frame 207 may have a base 221 and one or more vertical members 227. A retainer support 223 may be mounted to the vertical members 227. Retainer structure 203 may be mounted to retainer support 223. Support frame 207 may further include one or more struts (not shown) configured to support chute 215.

Device 110 may also comprise a display kiosk 1200. As is described in greater detail below, kiosk 1200 may present a user interface describing products available from device 110. For example, kiosk 1200 may present representations or descriptions of the contents of each hopper 101. Kiosk 1200 may also allow a user to input a selection of a desired preparation to be dispensed. A preparation may be defined, for example, by a selection of a blend of quantities of products in hoppers 101, and one or more preparation parameters, such as volume and temperature of water, volume of ice, and the like. Kiosk 1200 may be, for example, a touch-sensitive computing device or a computing device with an input pad.

In some embodiments, dispensing device 110 may contain an outer housing composed of a transparent material; the opacity of this material may be governed by the application of electrical currents and/or other means of governing opacity.

Figures 53, 54:
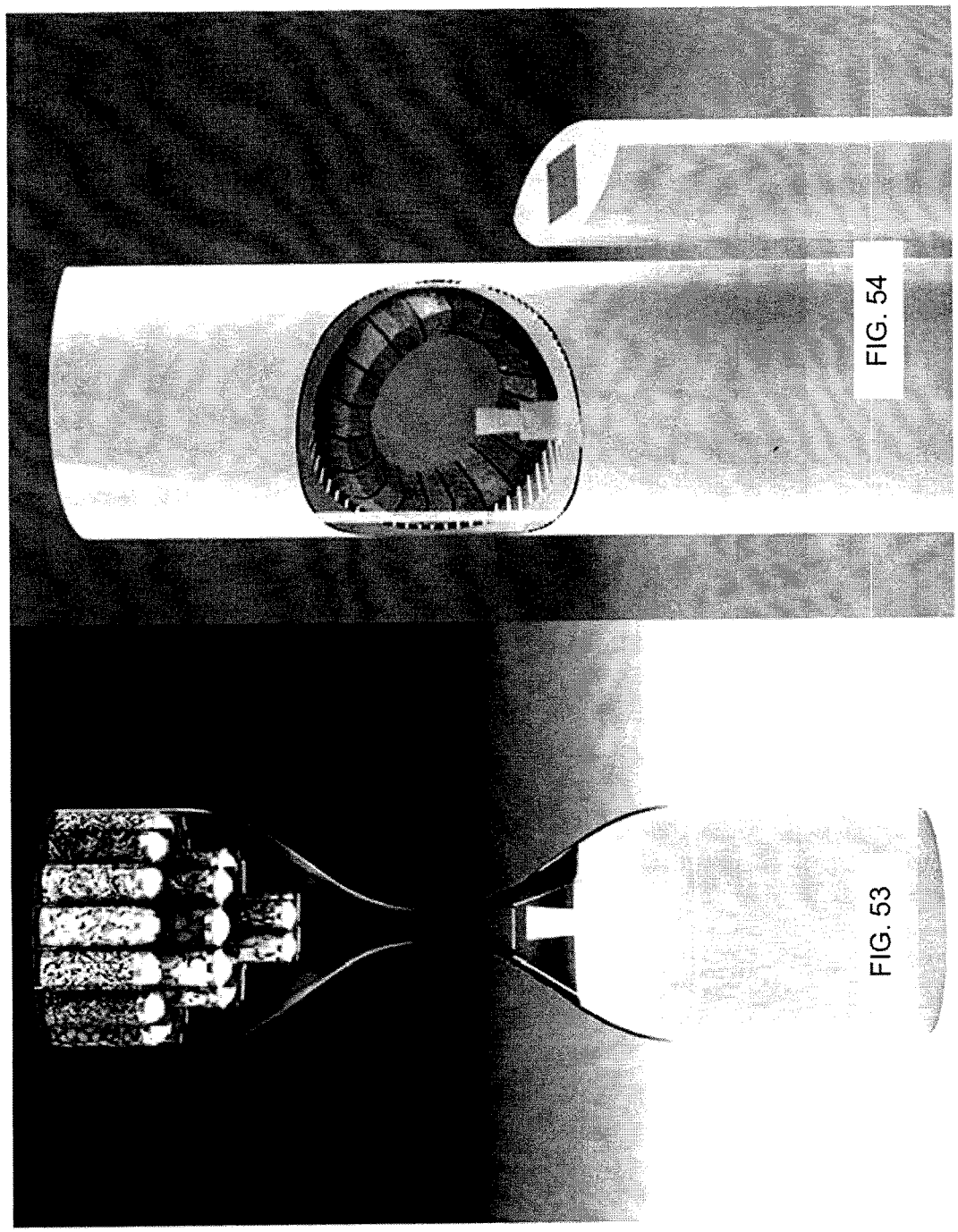
FIG. 53 provides a perspective view of one embodiment of dispensing device in an hourglass shaped, clear canister suspended over a central platform.
FIG. 54 provides a perspective view of another embodiment of dispensing device where the product hoppers are arranged in a circular pattern.
Figure 55:
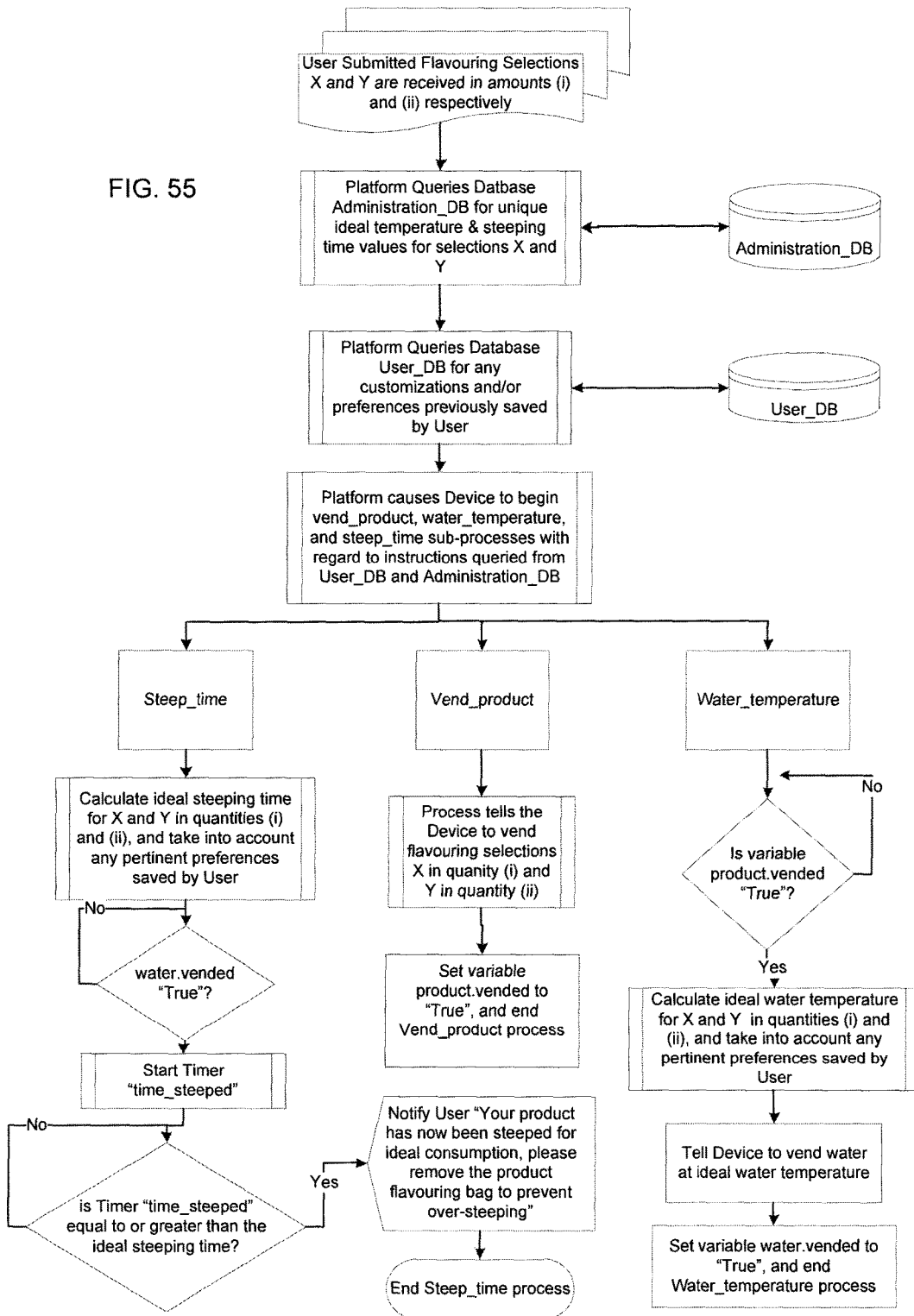
FIG. 55 provides a logical flow diagram of the blending logic performed by the platform according to some embodiments.

For example, FIG. 53 provides a perspective view of an embodiment of the device 110 where the hoppers 101 are filled with various flavouring products and are contained in an hourglass-shaped clear canister, suspended over an area in which a cup may be placed.

FIG. 54 provides a perspective view of another embodiment of dispensing device where the product hoppers are arranged in a circular pattern.

In some embodiments, the opacity of the housing that houses the product hoppers may be modified when users approach the device and/or kiosk. For example, the housing of the device 110 may change from opaque to transparent or translucent when a user approaches the device 110. The changing of the opacity of the housing of the device 110 from opaque to transparent or translucent may serve the purpose of protecting delicate product including, but not limited to, loose-leaf tea, which may be sensitive to light. In some embodiments, the opacity of the glass housing the hoppers may be modified in order to display patterns (e.g., words and pictures) on the glass when the glass is in an opaque state.

In some embodiments, the housing that houses the product hoppers may be made of various suitable materials, such as glass and/or acrylic.

Figure 4:
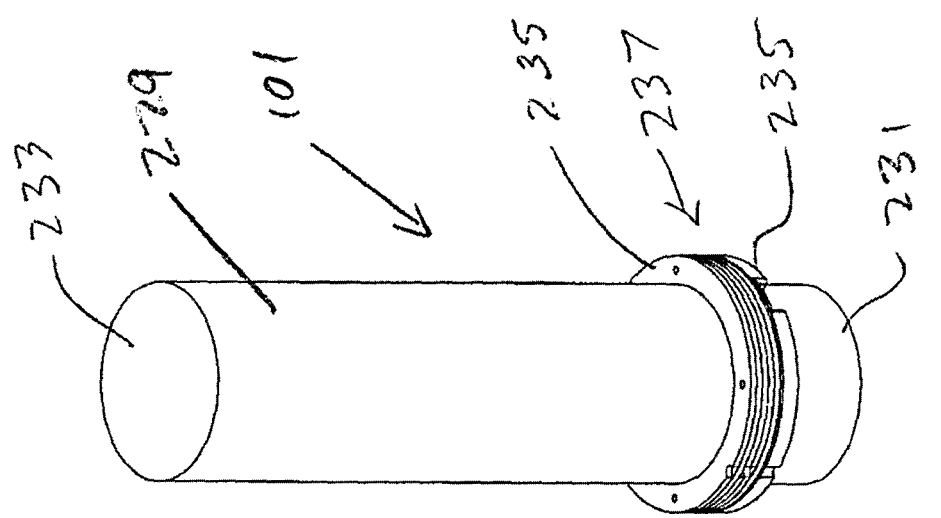

FIG. 4 depicts a perspective view of an example hopper 101. Hopper 101 is generally cylindrical, with top and bottom tube portions 229, 231, respectively. Tube portions 229, 231 may be constructed of any suitable food-safe material. In some embodiments, tube portions 229, 231 may be translucent or transparent to allow viewing of materials within hopper 101. Each of tube portions 229, 231 has an open end with a flange 235. Top tube portion has a closed top end with a top wall 233. Bottom tube section 231 has an open bottom end.

Tube sections 229, 231 are mounted together using flanges 235. A dispensing assembly 237 is retained between flanges 235. Food products may be loaded in hopper 101 above dispensing assembly 237 such that gravity urges the food products down to dispensing assembly 237. As will be explained in further detail hereinafter, dispensing assembly 237 may block passage of food products from top tube section 229 to bottom tube section 231, and may be selectively operable to cause loaded food products to be dispensed through bottom tube portion 231 in precise quantities.

Flange 235 of bottom tube section 231 may have one or more detents 236 configured to engage a corresponding alignment guide mounted to retainer structure 203.

Hopper 101 may also have one or more electrical contacts (not shown) for electrically coupling hopper 101 to other components of device 110. For example, hopper 101 may have electrical contacts to receive signals for operating dispensing assembly 237. In some embodiments, hopper 101 may have a plurality of electrical contacts allowing two-way data communication between hopper 101 and the rest of device 110.

FIG. 5 depicts components of dispensing assembly 237 in greater detail. Dispensing assembly 237 includes a metering plate 239. Metering plate 239 has one or dispensing holes 104 located proximate its outer periphery. dispensing holes 104 define an outlet of hopper 101.

A rotor 102 is rotatably mounted to metering plate 239. Rotor 102 has a hub portion 243 allowing for the attachment of a motor 103 via a motor shaft. Rotor 102 also has one or more arms 247 extending from hub portion 243. In the embodiment depicted in FIGS. 5-7, rotor 102 has one arm 247. However, in other embodiments, rotor 102 may have more arms. Arms 247 may extend radially from hub 243 or they may be swept in a spiral pattern, as shown in FIGS. 5-7.

Rotor 102 may be rotated by operation of motor 103. As is best shown in FIG. 6, arm 247 extends away from the center of metering plate 239. The maximum radial extent of arm 247 is such that, as rotor 102 is rotated, it defines a path that overlaps dispensing hole 104. Thus, the spinning of the motor shaft, and, consequently, the rotor 102, may cause product, including but not limited to beverage flavourings, to be pushed outward from the center of metering plate 239 toward the dispensing hole 104.

In some embodiments, the shape of the rotor 102 or other dispensing component of the product hopper may be designed so as to avoid damaging fragile products such as, but not limited to, loose-leaf tea. For example, arm 247 is shaped so that, as it is rotated, its leading edge is swept away from the direction of rotation (indicated by arrow R in FIG. 6). Rotor 102 may be formed from a resilient, food safe material. In some embodiments, rotor 102 may be formed from nylon.

FIG. 7 depicts a side view of components of dispensing assembly 237. As depicted, motor 103 is coupled to rotor 102 by a shaft 249, such that operation of motor 103 causes rotation of rotor 102. Motor 103 may be a DC motor, a stepper motor, or any other suitable type of motor. Motor 103 may be capable of driving rotation of rotor 102 in both clockwise and counter-clockwise directions. Motor 103 may be connected to a microcontroller (not shown). The microcontroller may be integrated with hopper 101 or may be external to hopper 101. In embodiments in which the microcontroller is external to hopper 101, motor 103 may communicate with the microcontroller by way of electrical contacts on hopper 101.

In some embodiments, motor 103 may be equipped with an encoder to report the angular position of motor 103 to the microcontroller. In such cases, the microcontroller may be able to detect the amount and direction of movement of the motor, and thus, the rotor 102. In other embodiments, the amount and direction of rotation may be inferred from the signal provided to motor 103 and the length of time during which the signal is provided.

In some embodiments, one or more hoppers, such as the middle hopper, can be configured to contain electronics or liquid products (water, honey, syrup). A potential benefit of such a design would be the ability to have the electronics and/or products avoid touching the funnel when dispensed.

Figure 8:
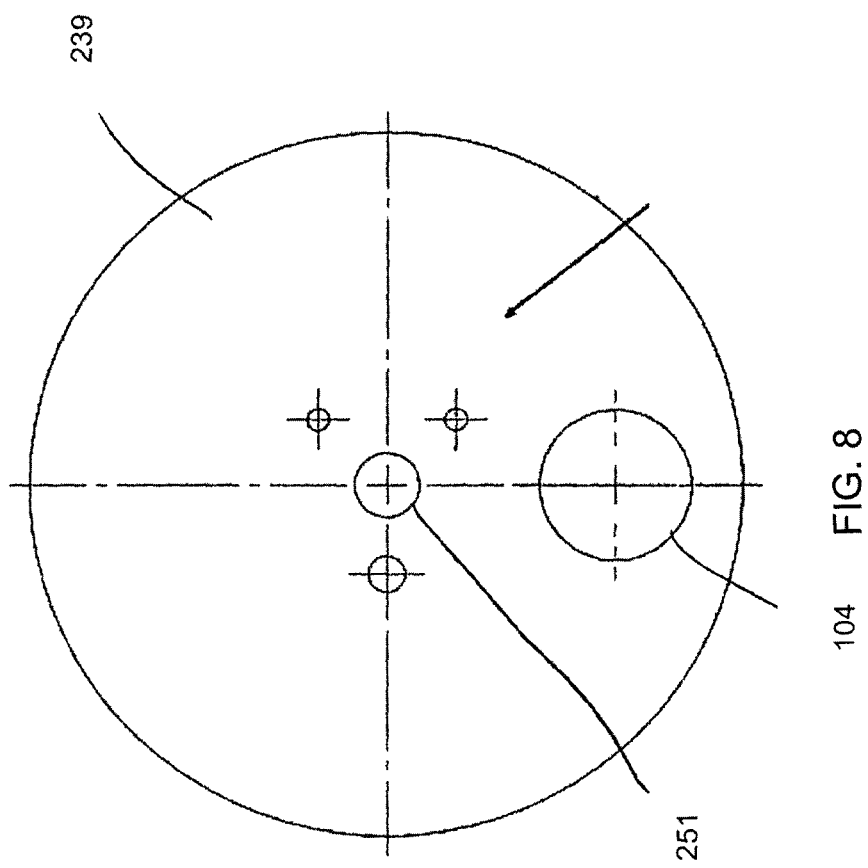
FIG. 8 is a top elevation view of the dispensing assembly of FIG. 5.

FIG. 8 provides a bottom view of metering plate 239 of a product hopper 101 with its dispensing hole 104 according to some embodiments of the device 110. Metering plate 239 has an aperture 251 through which shaft 249 extends to couple motor 103 to rotor 102. The spinning of the motor shaft 249, and, subsequently, the rotor 102, may cause product, including but not limited to beverage flavourings, to be pushed outward from the center of the spiral toward the dispensing hole in the base plate.

Turning of rotor 102 may cause product to be pushed through dispensing hole 104 in a specific amount and at a specific rate, depending on the speed at which rotor 102 is rotated and the angular displacement through which rotor 102 is rotated. The relationship between rotation of rotor 102 and product dispensed may also depend on other factors, such as product particle size, product density and hopper fill level, and the like. For a specific set of conditions, such as type and fill level of a product, rotation of rotor 102 through a specific, known angular displacement may cause a specific, known quantity of product to be dispensed. This relationship may, for example be experimentally determined or estimated based on product characteristics, or a combination thereof.

Figure 9:
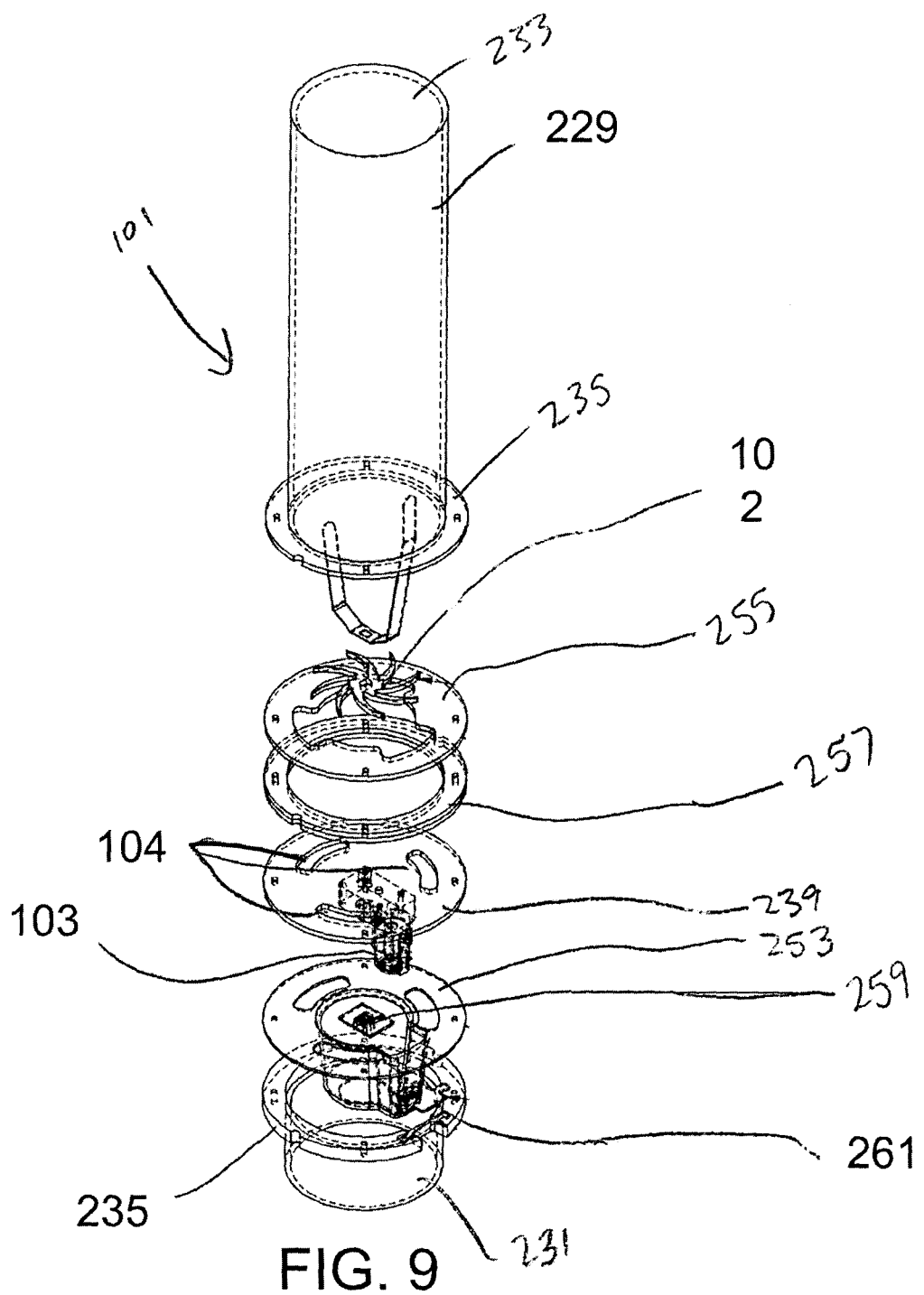
FIG. 9 is an exploded view of another dispensing assembly.

FIG. 9 depicts an exploded view of a hopper 101 with an alternative dispensing assembly 237'. Dispensing assembly 237 includes motor 103, which is contained in a housing fixed to a motor shield 253, attached to the underside of metering plate 239'. Metering plate 239' includes three dispensing holes 104. A rotor 102' is rotatably mounted atop metering plate 239' and coupled to motor 103. A blocking plate 255 is mounted above metering plate 239' and rotor 102', with a spacer ring 257 positioned between the blocking plate 255 and metering plate 239'. A microcontroller 259 is positioned within the motor housing and is interconnected with a printed circuit board 261 positioned and configured to interface with other components of device 110 when hopper 101 is installed.

Dispensing assembly 237' further includes an agitator 238 fixedly mounted to rotor 102'. Agitator rotates along with rotor 102' to mix product in hopper 101, which may help to prevent clumping or jamming. Agitator 238 may alternatively be mounted to the output shaft of motor 103.

Figure 10:
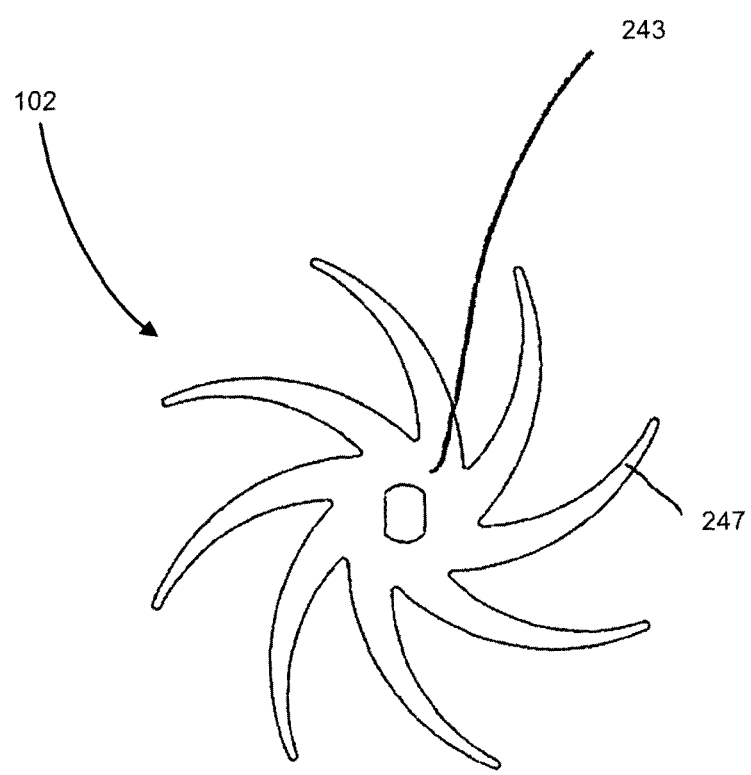
FIG. 10 is a top elevation view of a rotor of the dispensing assembly of FIG. 9.

As is best shown in FIG. 10, rotor 102' has a hub portion 243 and eight arms 247' extending from hub portion 243 in a counter-clockwise spiral configuration. Providing multiple arms may allow for rotor 102 to effectively move products within hopper 101, while limiting stress on any individual arm, which may make rotor 102' relatively durable.

Figure 11:
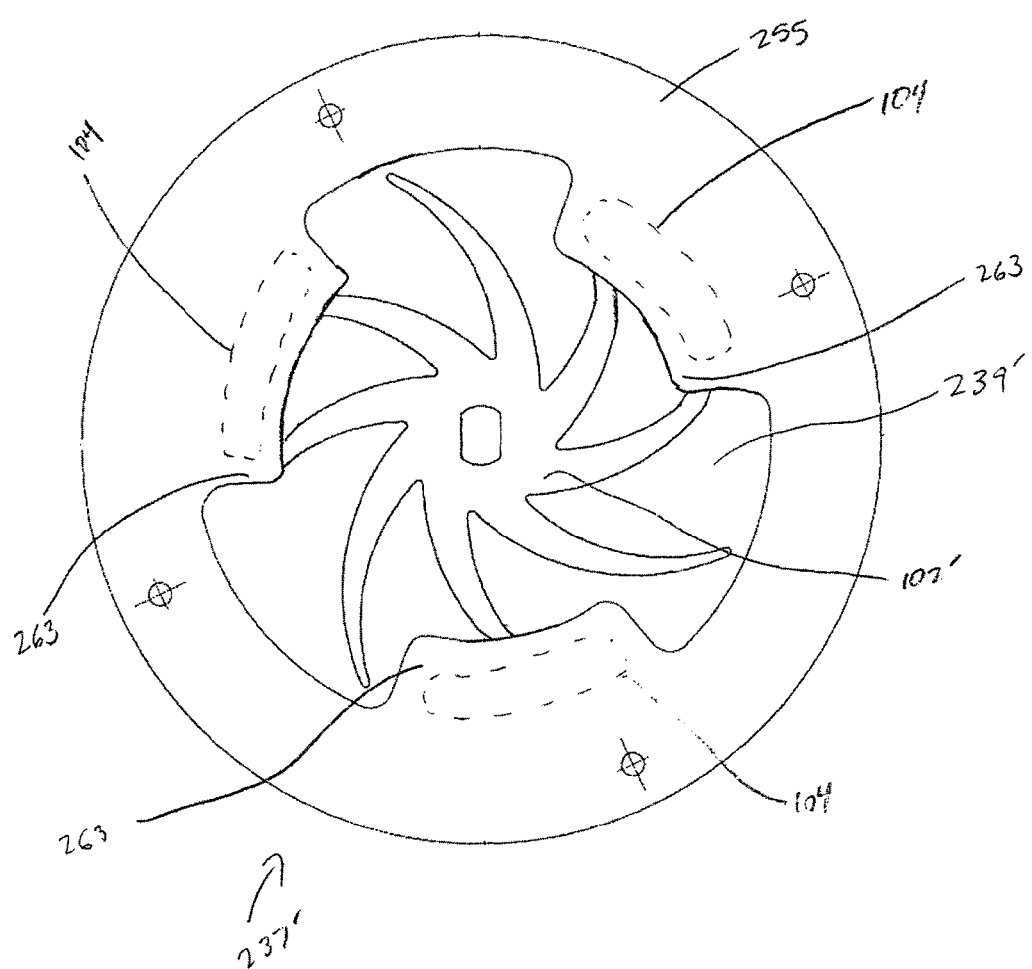
FIG. 11 is a top elevation view of the dispensing assembly of FIG. 9.

FIG. 11 depicts a top view of dispensing assembly 239'. As noted, blocking plate 255 is positioned above metering plate 239' and rotor 102'. Blocking plate 255 is generally ring-shaped and has a plurality of lobes 263 which extend radially inwardly. Lobes 263 cover dispensing holes 104 of metering place 239'. Blocking plate 255 has a central opening positioned over rotor 102' and metering plate 239'. Thus, blocking plate may permit products in hopper 101 to fall onto metering plate 239' proximate rotor 102', so that rotor 102' can push products through dispensing holes 104. However, blocking plate 255 may prevent products from falling through dispensing holes 104 without being pushed by rotor 102'.

Figure 12:
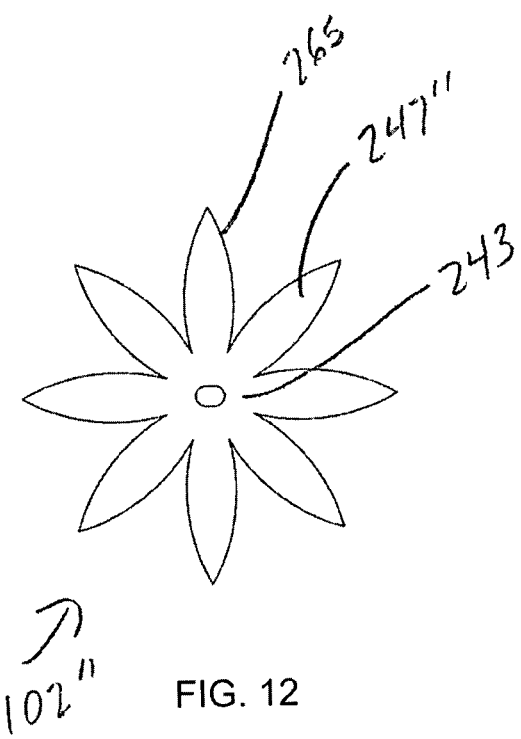
FIG. 12 is a top elevation view of another rotor.

Both of rotors 102, 102' have arms which extend in a spiral pattern. However, other embodiments may include rotors with non-spiral arms. FIG. 12 depicts a top view of one such rotor 102". Rotor 102" has a hub 243 and arms 247" that extend radially from hub 243. Each of arms 247" has curved edges such that, when rotated in either direction, the leading surface is a convex surface. In other words, rotor 102" may be rotated in either a counter-clockwise or clockwise direction, and in both cases, the leading edge of arms 247" curve away from the direction of rotation.

As will be further described below, in some embodiments, motor 103 is operated by a controller that senses current delivered to the motor. In the event of a current spike, which may be indicative of jamming, motor 103 may be rotated in reverse to attempt to clear the jam. Thus, the shape of arms 247" may limit the stress exerted on rotor 102" and the likelihood of breaking product particles when rotor 102" is rotated in reverse.

Figure 13:
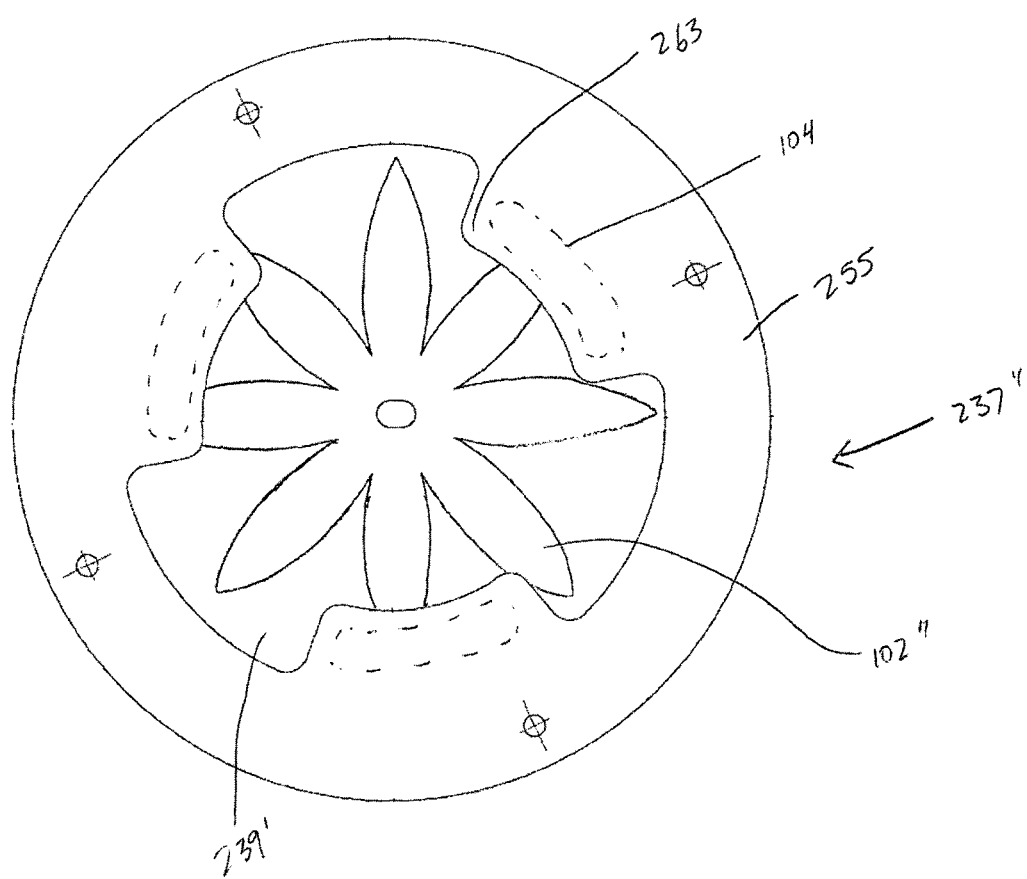
FIG. 13 is a top elevation view of another dispensing assembly including the rotor of FIG. 12.

FIG. 13 depicts a top view of a dispensing assembly 237", identical to dispensing assembly 237' except that rotor 102' is replaced with rotor 102".

Figure 14:
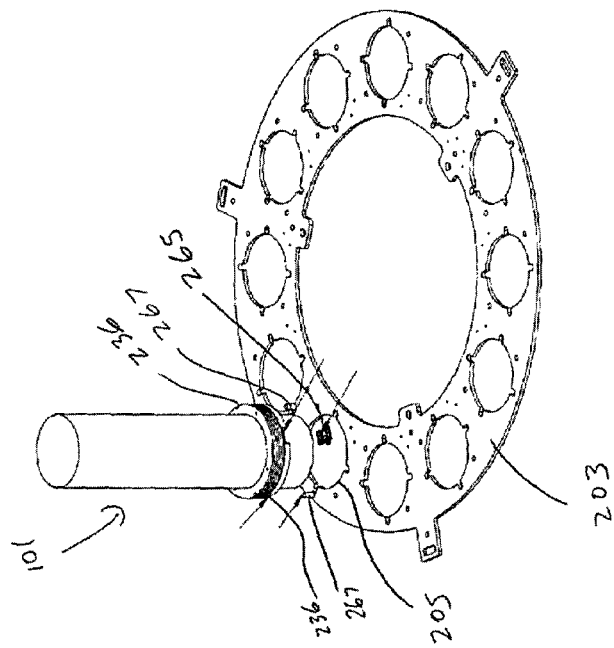
FIG. 14 is a partial exploded view of a retainer structure with a hopper.
Figure 15:
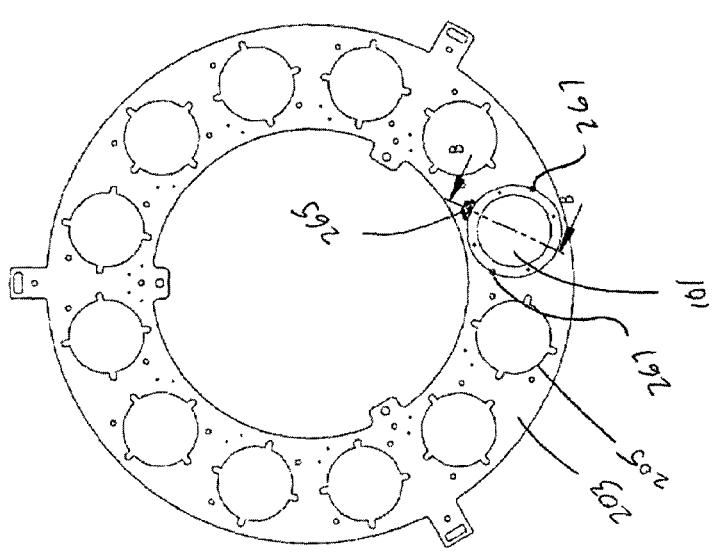
FIG. 15 is a top elevation view of the retainer and hopper of FIG. 14.

FIGS. 14 and 15 depict a partial exploded view and a top view, respectively, of retainer structure 203 with a hopper 101. As noted above, retainer structure 203 has a plurality of apertures 205 configured to receive hoppers 101. An electrical connector 265 may be provided to engage corresponding electrical contacts (e.g. circuit board 261) on each hopper 101, thereby connecting the hopper and its dispensing assembly to the control system of device 110.

Retainer structure 203 may also include one or more alignment guides to maintain proper alignment of hoppers 101 to retainer structure 203. For example, as depicted in FIG. 14, retainer structure 203 has a plurality of dowels 267 extending upwardly from the surface of retainer structure 203 and configured for reception in a corresponding detent 236 of hopper 101. Engagement between dowels 267 and detents 236 maintains correct alignment of hopper 101 with the corresponding aperture 205. Dowels 267 may be taller (i.e. may extend farther) than connectors 265 so that, as hopper 101 is installed, dowels 267 engage detents 236 before the hopper 101 contacts connector 265. This may reduce the likelihood of damaging the connector 265 due to misalignment of the hopper 101.

In some embodiments, hoppers 101 may be outfitted with components including, but not limited to, one or more microprocessors, RAM, a data storage unit (e.g., solid state memory), one or more sensors (e.g., weight or temperature sensors), input and output modules for communicating with the device 110, and/or pre-programmed instructions and routines.

In some embodiments, each hopper 101 may meter the level of product remaining within the hopper unit. Metering of product levels may be accomplished via an initial calibration of an on-board weight sensor when the hopper 101 is filled with inventory.

Referring again to FIGS. 2a-2d, device 110 may also include one or more spouts 269 for dispensing liquids such as hot or cold water or solids such as ice cubes into receptacle 219. Separate spouts 269 may be provided for hot water, cold water and ice, or a single spout could be used for multiple streams, with appropriate internal valving, as will be apparent to skilled persons.

Spouts 269 are connected to a water supply system 271, depicted schematically in FIG. 15. Water system 271 may have a separate hot water line 273 and cold water line 275, which may draw from a common water reservoir 277. Hot water line 273 may be driven by a hot pump 279, which delivers water to a boiler by way of a flow meter 281 and check valve 283. Boiler 285 may be equipped with a temperature sensor and a water level sensor. Cold water line 275 may be driven by a cold pump 287, which may supply water through a flow meter 289 and check valve 291. Components of water supply system 271 may be connected to the control system of device 110 in two-way communication.

Spouts 269 may also be connected to an ice dispenser for dispensing ice cubes in the case of preparation of cold or lukewarm beverages.

In some embodiments, device 110 may be equipped with a device for forming receptacles to receive dispensed products in dry form for later consumption. For example, device 110 may be equipped with a bag-forming device. The bag forming device may have a tube-forming device and one or more sealing devices. FIGS. 17, 18, 19 and 20 depict perspective, top, front and side views, respectively, of an example tube forming device 293. Tube forming device 293 may be used as an alternative to receptacle 219. That is, if desired, tube forming device 293 may be provided to dispense products into a container formed using tube forming device 293, rather than into receptacle 219. Tube forming device 293 may be used to form containers from a flexible material, such as teach bags, sachets or sleeves.

Tube forming device 293 has an inlet 295 and may be positioned below outlet 217 of chute 215 so that products dispensed through chute 215 may be received in outlet 217. Tube forming device 293 may be attached to chute 215 or support frame 207 by any suitable method, which will be apparent to skilled persons, or may simply be rested on a support beneath chute 215.

Tube forming device 293 may comprise upper and lower plates 297, 299, and a folding guide 303 with a curved collar 105 disposed around a generally cylindrical neck 106. An annular space may be cooperatively formed between guide 303 and neck 106.

FIGS. 21, 22, 23 and 24 depict perspective, top, front and side views of folding guide 303. Collar 105 may have an upper edge 305 and a gap 307 at its front edge which forms a seal guide.

In use a flat sheet of a material may be fed into tube forming device over collar 105 and drawn downwardly into the annular space between guide 303 and neck 106. Edge 305 may guide the sheet of material into an annular or tube shape, with opposing edges brought into engagement with one another in gap 307.

A first sealing mechanism 309 may be provided to receive material folded into a tubular configuration. Sealing mechanism 309 may comprise a rotatably-mounted wheel 311 and a frame 313. Wheel 313 and frame 313 may carry sealing members 315 which tightly engage one another. Container-forming material may be fed between wheel 311 and frame 313 after passing through folding guide 303. Sealing members 315 may form a seal between opposing material edges, i.e., along the length of the tube. The seal may for example be formed thermally, such as by heating sealing members 315, by applying an adhesive, or by applying pressure to set a pre-applied adhesive.

A second sealing mechanism 317 may also be provided, and may include opposed sealing arms 319 and a motor 321. Sealing arms 319 may also include gears 323 which mesh to couple the arms 319. Motor may be configured to selectively cause motion of the arms 319 toward or away from one another. The arms 319 may be pulled apart to allow product to fall freely between the arms, and the arms may be pushed together to cause a seal. As depicted, arms 319 create a substantially horizontal seal. One arm 319 may contain a heating cartridge which may be regulated to the suitable temperature to seal the material, but not to burn the material. Once sealed, a container can be released. Arms 319 may also be equipped with a cutting device to cut the seal formed by arms 319, such that each seal made by arms 319 becomes a top seal of a current container and a bottom seal of a subsequent container.

Figure 34:
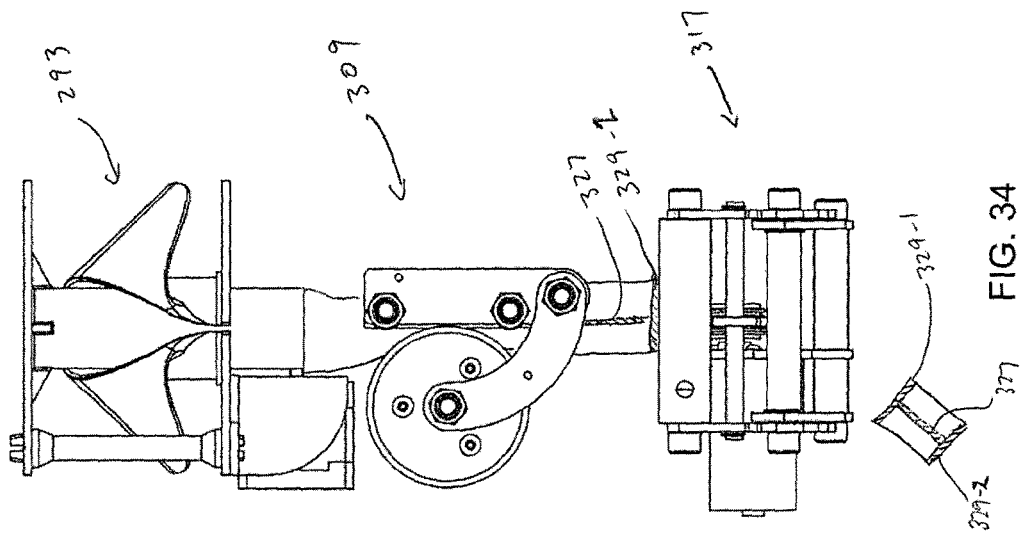
FIG. 34 is a side of the container forming device of FIG. 33.
Figure 33:
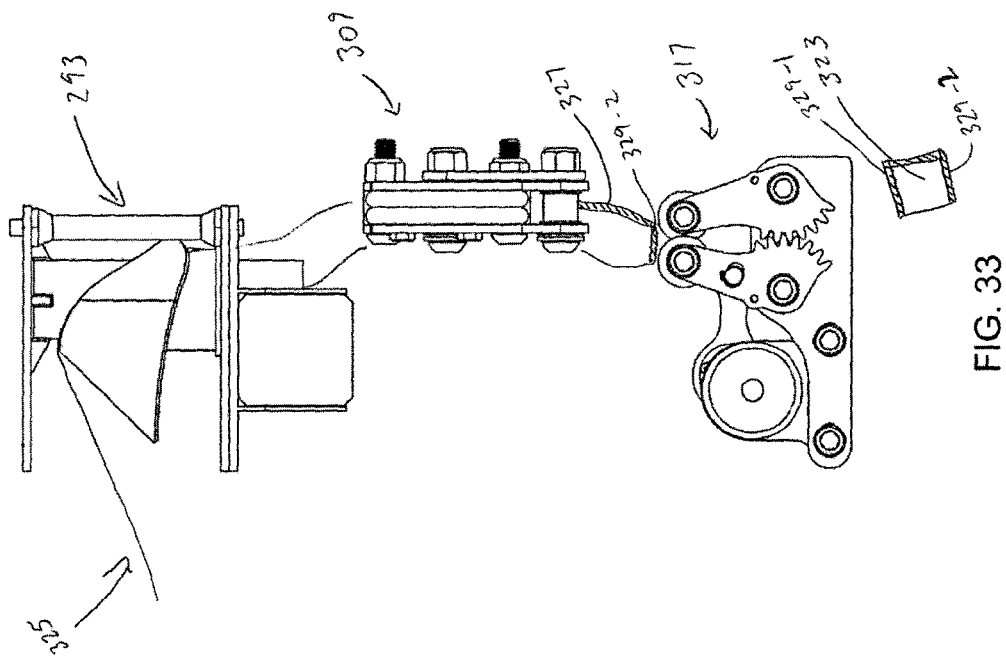
FIG. 33 is a front view of a container forming device.

FIGS. 33 and 34 depict side and front views, respectively of a bag-forming device including tube forming device 293, first sealing mechanism 309 and second sealing mechanism 317 forming a sealed container 323 from a sheet of material 325.

Material 325 is drawn through each of tube forming device 293, first sealing mechanism 309 and second sealing mechanism 317 by a feed device (not shown). Material exits tube forming device 293 in a tubular form and passes through first sealing device 309 which forms a lengthwise seal 327. Material is then passed through second sealing mechanism 317, which forms a transverse seal 329, which is then cut in half to form an upper seal 329-1 of a current container and a lower seal 329-2 of a subsequent container. The formed container 323, such as a tea bag may be dispensed into a receptacle such as a cup or mug.

In some embodiments, the length of the container 323 may be set by the device 110 according to the height of the cup as determined by a laser or other such apparatus connected to the device 110. The motor may cause more tea paper to be pulled through the mechanism to make a longer bag or attachment of tea paper roll that may be folded over the edge of a cup in order to allow the bag to be removed easily from a user's cup. In some embodiments, the device 110 may be configured such that the amount of ingredient may be adjusted based on the volume of the cup, and therefore the volume of water. The device 110 may be configured to ensure that the ratio of ingredient to water is maintained.

In some embodiments, the tube forming device may be configured to guide the edges of material 325 into an overlapping relationship. FIGS. 35-38 provide perspective, top, front and side views, respectively of one such tube forming device 293'. This may allow the tea paper to be formed into a tube with a lengthwise seal made between overlapping edges (the inside edge of one side overlapping the outside edge of the other side) of the tea paper (or other material used to form a product bag).

Figure 39:
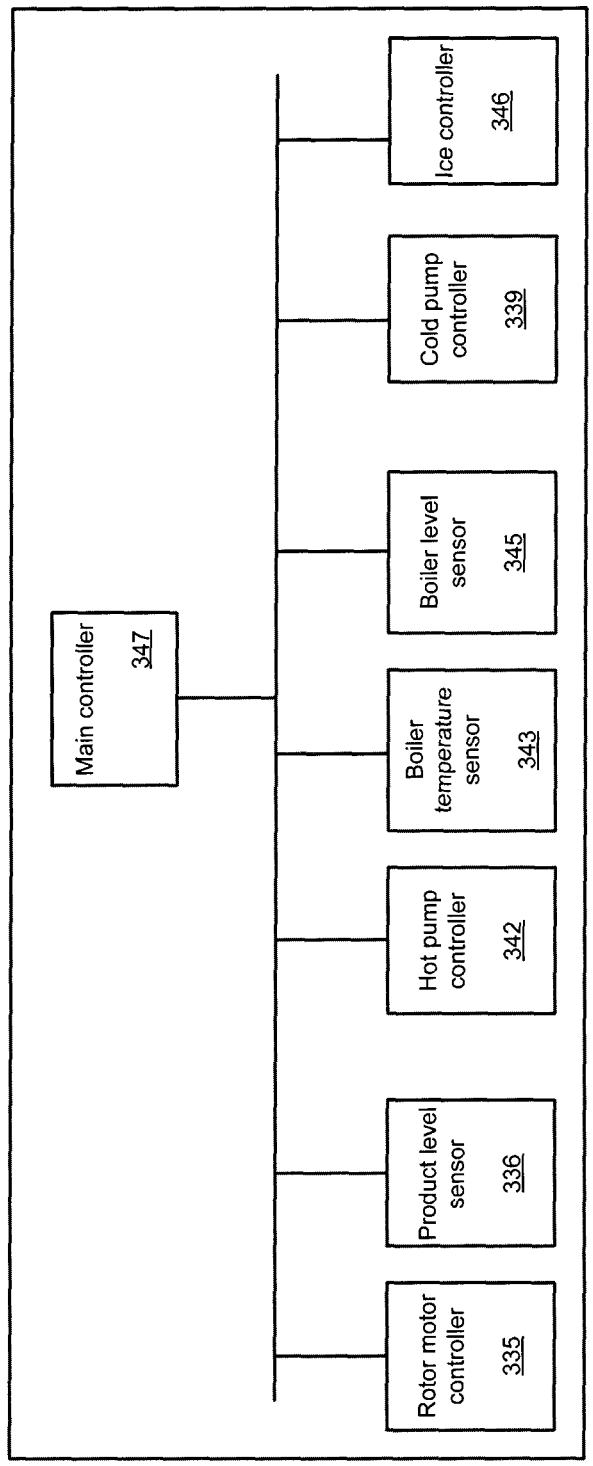

FIG. 39 is a block diagram of a control subsystem 331 associated with device 101. Control subsystem 331 may include a hopper control subsystem 333 for each hopper 101. Hopper control subsystems include a rotor motor controller 335 for operating motor 103. Rotor motor controller 335 may include an encoder for reporting movement of rotor 102 and a current sensor (not shown), which may report spikes in current indicative of jamming of rotor 102. Hopper control subsystem 333 may further include a product level sensor 336.

Figure 16:
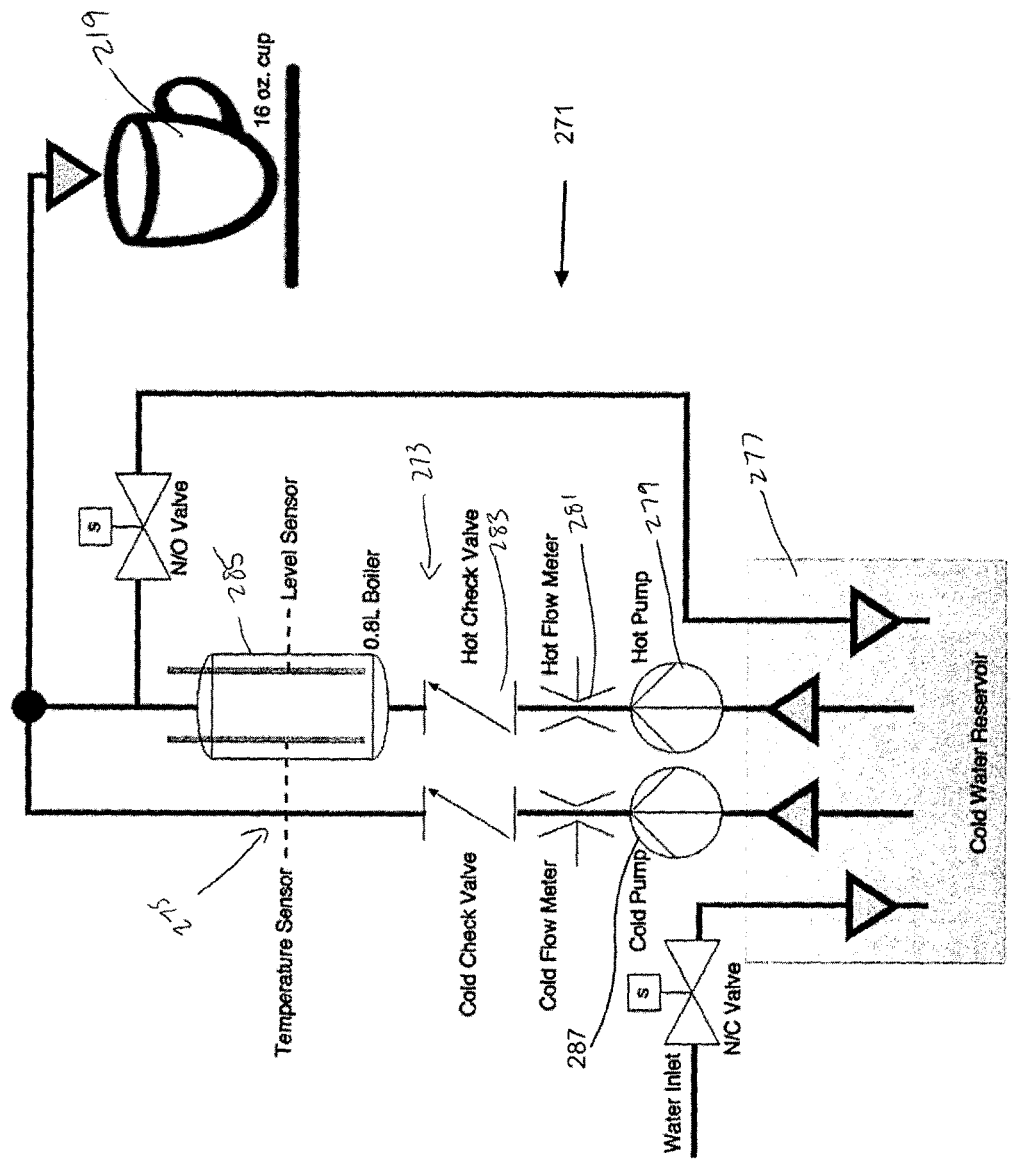
FIG. 16 is a schematic diagram of water supply circuit.
Figure 22:
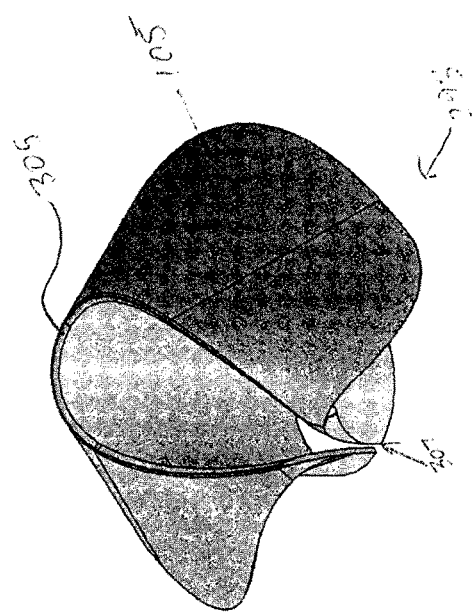
FIG. 22 is a top elevation view of the folding guide of FIG. 21.
Figure 21:
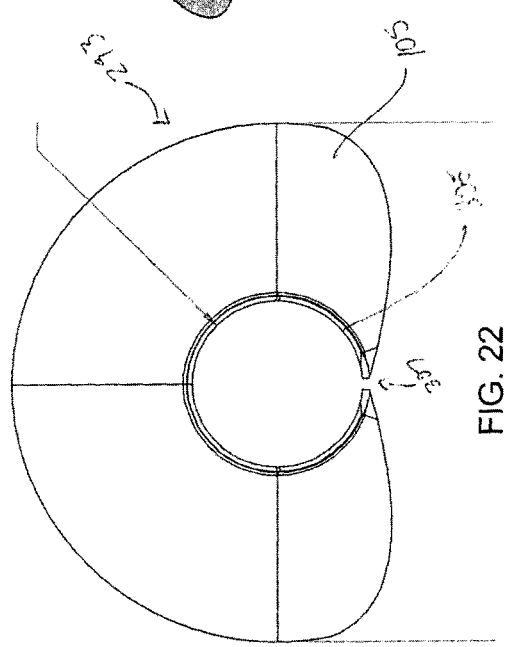
FIG. 21 is a perspective view of a folding guide of the tube forming device of FIG. 17.
Figure 24:
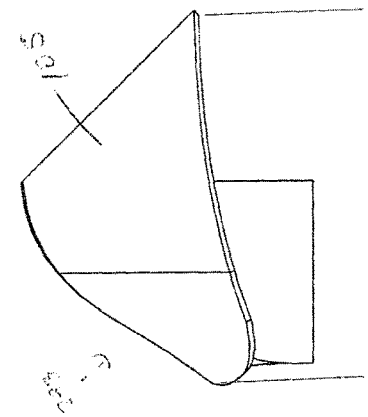
FIG. 24 is a side elevation view of the folding guide of FIG. 21.
Figure 23:
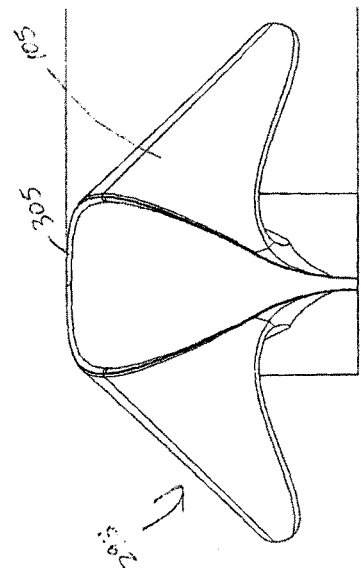
FIG. 23 is a front elevation view of the folding guide of FIG. 21.
Figure 25:
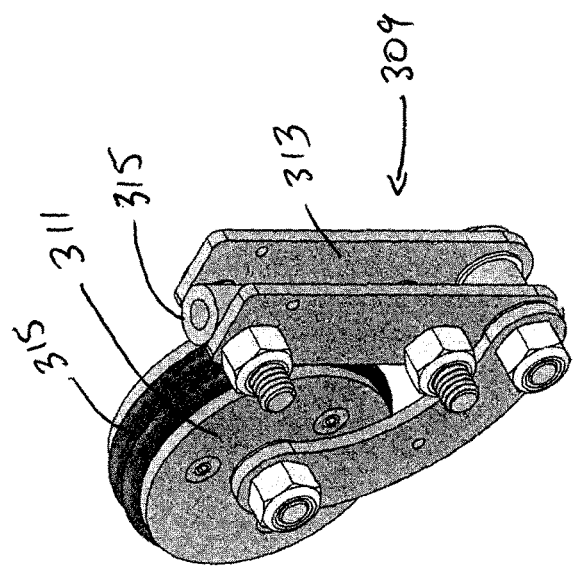
FIG. 25 is a perspective view of a sealing device.
Figure 28:
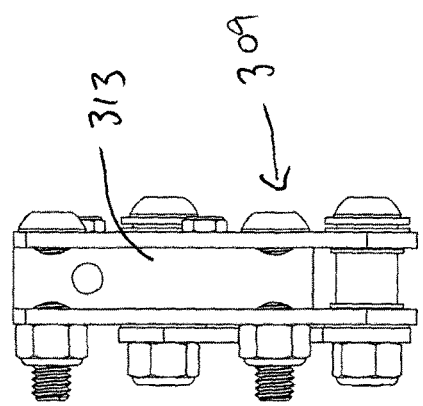
FIG. 28 is a side elevation view of the sealing device of FIG. 25.
Figure 26:
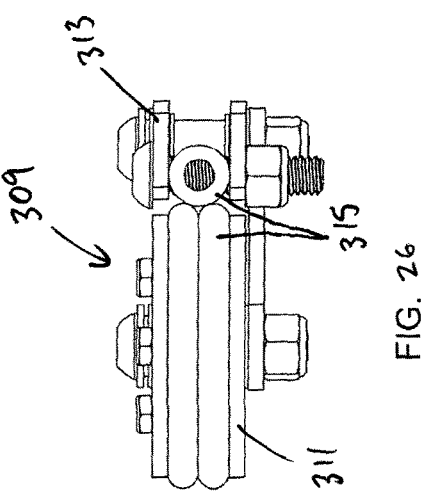
FIG. 26 is a top elevation view of the sealing device of FIG. 25.
Figure 27:
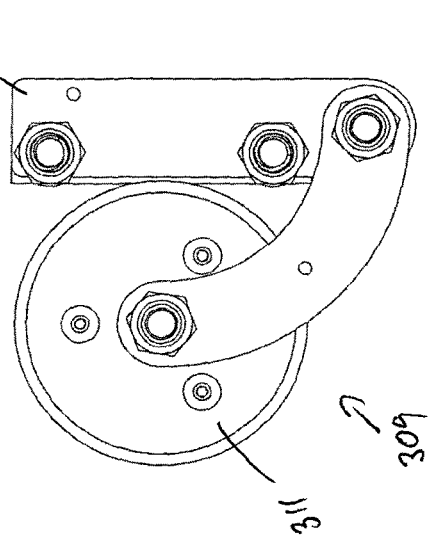
FIG. 27 is a front elevation view of the sealing device of FIG. 25.

Control subsystem 331 may further include a hot water control subsystem 337. Hot water control subsystem 337 may include a hot pump controller 342 for operating hot pump 279 (FIG. 16) and boiler temperature and level sensors 343, 345.

Control subsystem 331 may further include a cold pump controller 339 for operating cold pump 287 and an ice controller 346.

Control subsystem 331 may further include a main controller 347. Main controller 347 interfaces with the other controllers and control subsystems and may have one or more interfaces for two-way communication with one or more external devices. Main controller 347 may interface, for example, with display kiosk 1200 to receive instructions for a preparation, and to return data such as product levels in hoppers 101, water conditions and the like. Alternatively or additionally, main controller 347 may interface with one or more computing devices such as PCs, mobile phones or the like. The interfaces may be, for example, by physical bus connection, wired or wireless internet connection, bluetooth, near-field communication (NFC), or the like.

The instructions received by control subsystem 331 (e.g. via main controller 347) may include, but are not limited to, a specific quantity of product to be dispensed in order to fulfill part or all of a user's order. Control subsystem 331 may be configured with a specific set of instructions for controlling the operation of each hopper 101 with regard to the specific product housed within that hopper 101. For example, control subsystem 331 may be programmed with a relationship between the rotation of each rotor 102 and the amount of product dispensed. That is, control subsystem 331 may be programmed with a rate of dispensing for each hopper 101 based on rotation of its rotor 102 through a particular angular displacement in order to accurately dispense a specific product quantity. The programmed rate may be dependent on characteristics of the particular product, such as density, particle size and the like. Accordingly, two rotors 102 of different hoppers 101 containing different products may be configured to rotate different distances to dispense the same amount of product.

Main controller 347 may be configured with instructions pertaining to the particular characteristics of the product it houses (e.g., potency, particle size, density). Once the value received from a product level sensor 336 reaches a predetermined level, Main controller 347 be configured to communicate (e.g., by display on kiosk 1200 or message to another computing device) that the relevant hopper 101 is running low on, or out of, product. Main controller 347 may also be programmed with instructions take into account specific information pertaining to each product (e.g., frequency of user orders containing a product), these factors may also govern the function of the hopper (e.g., when notifications as to low product levels are sent).

Replenishment based on data collected by hoppers 101 within particular devices 110 means that replenishment of product may take into account the particular preferences of the users likely to frequent a particular kiosk 120. Further, the rotating spiral mechanism 102 for dispensing product means that products of varying sizes and levels of delicateness may be consistently dispensed in accurate portions without causing damage (e.g., crushing/pulverizing) to those products.

Figure 49:
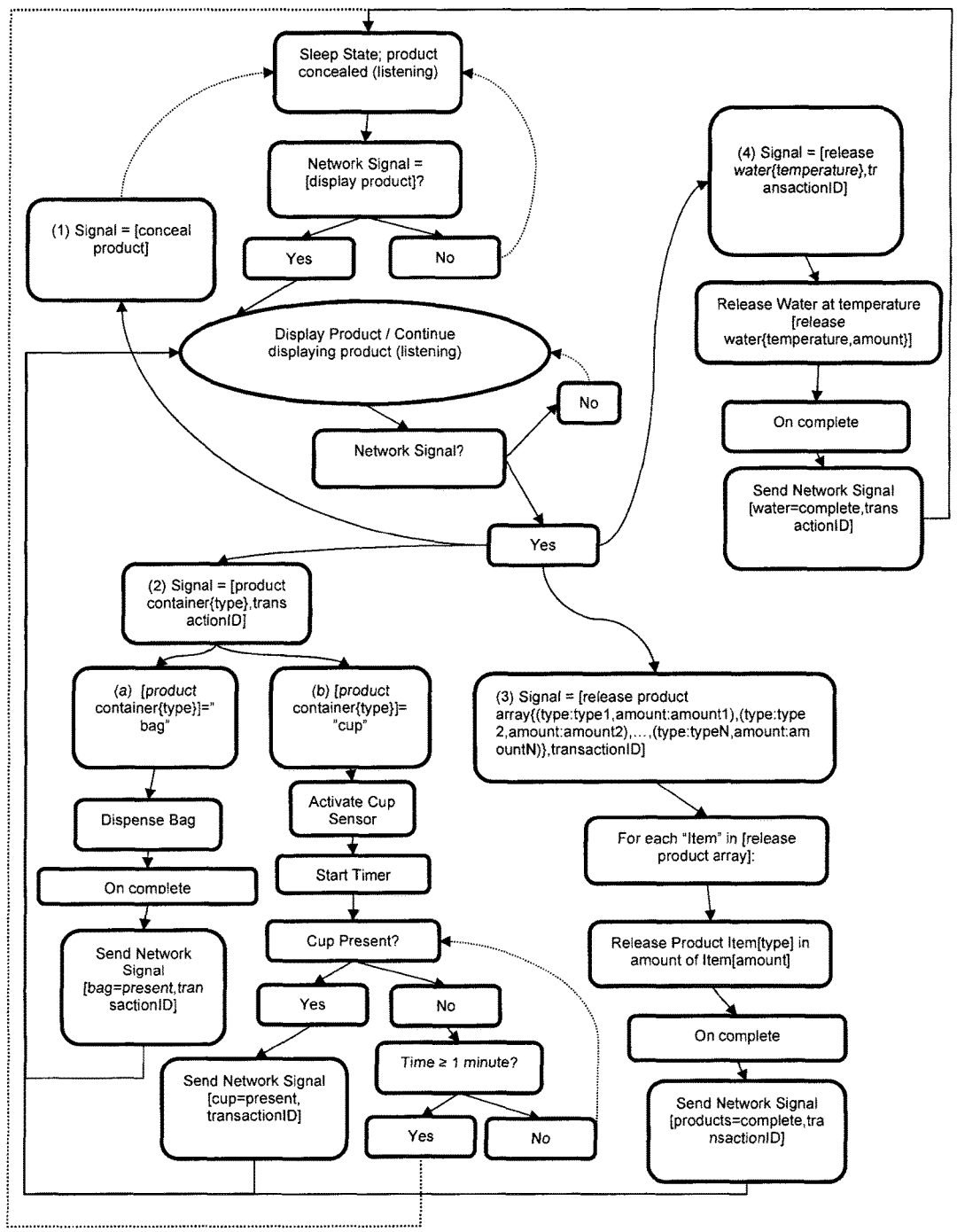
FIG. 49 provides a logical flow diagram of a dispensing device's logic according to some embodiments.

FIG. 49 provides a logical flow diagram of the dispensing device 110's functioning states according to some embodiments, which illustrates the scheme by which Blends may be produced. There may be multiple ways of organizing the device's logic with regards to facilitating linkages between various interface rules, and the transport of resultant information to be processed by other modules composing the present disclosure. The following is simply illustrative of some embodiments of the device.

The device may begin in a sleep state wherein the product is concealed and the device waits for a signal, such as a network signal from kiosk 1200 or platform 3000, indicating the product should be displayed [the Sleep State]. When a signal indicating the product should be displayed is received by the device, the device may display the product and wait for further signals [the Awake State].

There may be four further signals that may be received by this embodiment of the device 110 when it is in the Awake State: (1) a conceal product signal, (2) a container signal, (3) a release product signal and (4) a release water signal. These signals may be sent by the device interaction module of the platform 3000 as described in relation to FIG. 50 below. When (1) a conceal product signal enters the device 110, the device 110 may return to a sleep state and listen for a network signal.

When (2) a container signal is received by the device 110, the container signal may contain a Transaction ID number and a container type designator such as (2) (a) "bag" or (2) (b) "cup." When (a) the container type is that of a "bag," the device 110 may dispense a bag and, when complete, send an outbound network signal indicating that the bag has been dispensed along with the corresponding Transaction ID number. When (b) the container type is that of a "cup," the device 110 may activate a cup sensor and wait for a cup to be placed in the cup tray of the device 110. In some embodiments, a cup may also be dispensed automatically. If a cup is not placed in the tray within a specified period of time, the device 110 may return to the Sleep State. When a cup has been placed in the tray, an outbound network signal may be sent indicating the Transaction ID and that a cup is present, after which the device 110 may return to the Awake State.

When (3) a release product signal is received by the device 110, the release product signal may contain a Transaction ID and an array of N elements, each indicating a product type and a quantity (the Product Array). The product type values correspond to the types of product contained in the device 110. For each element in this array, the device 110 may release the corresponding product in an amount corresponding to the amount value in the same element of the product array. The mechanism of release may involve causing the rotating spiral or rotor 102 of a hopper 101 to turn a specified amount (a non-limiting example being 45 degrees) for a specified length of time or through a specified angular displacement, based on programmed characteristics for the particular product. In some embodiments, instead of, or in addition to, turning for a specified amount, a weight scale may also be utilized and the mechanism may continue to dispense until the desired weight is dispensed. In some embodiments, the volume of tea may also be measured and utilized to determine the desired volume of product dispensed.

The product released through by the hoppers 101 in the device 110 may then fall into a chute 215 such that product may be dispensed into the cup in specified quantities. The dispensing of product into the cup may be performed by the device 110 in a manner that reduces damage to the product, which may be desirable in the case of delicate product flavouring including, but not limited to, loose-leaf tea. When all elements of the Product Array have been executed, the device 110 may send an outbound network signal indicating the Transaction ID and that the product release process is complete, after which the device 110 may return to the Awake State. The device 110 may then send an outbound network signal indicating product stock levels in the hoppers 101 of the device 110.

Determining current stock levels may be accomplished through various methods including, but not limited to, weight sensors, and pre-programmed processors that may be installed in each hopper 101 receptacle containing beverage flavouring or other products for vending and/or measuring the total initial amount of product and the amount that has already been vended. Determining stock levels accurately may be desirable in order to keep the device 110 stocked with product.

When (4) a release water signal is received by the device 110, the water release signal may contain a Transaction ID, a temperature value and/or an amount value. On such a signal, the device 110 may release water at the specified temperature and quantity corresponding to this network signal. Releasing water at the specified temperature and quantity may be desirable in order to reduce the likelihood of damaging delicate beverage flavouring including, but not limited to, loose-leaf tea. When complete, the device 110 may send an outbound network signal indicating the Transaction ID and that the water has been released and may then return to the Sleep State.

Figure 40:
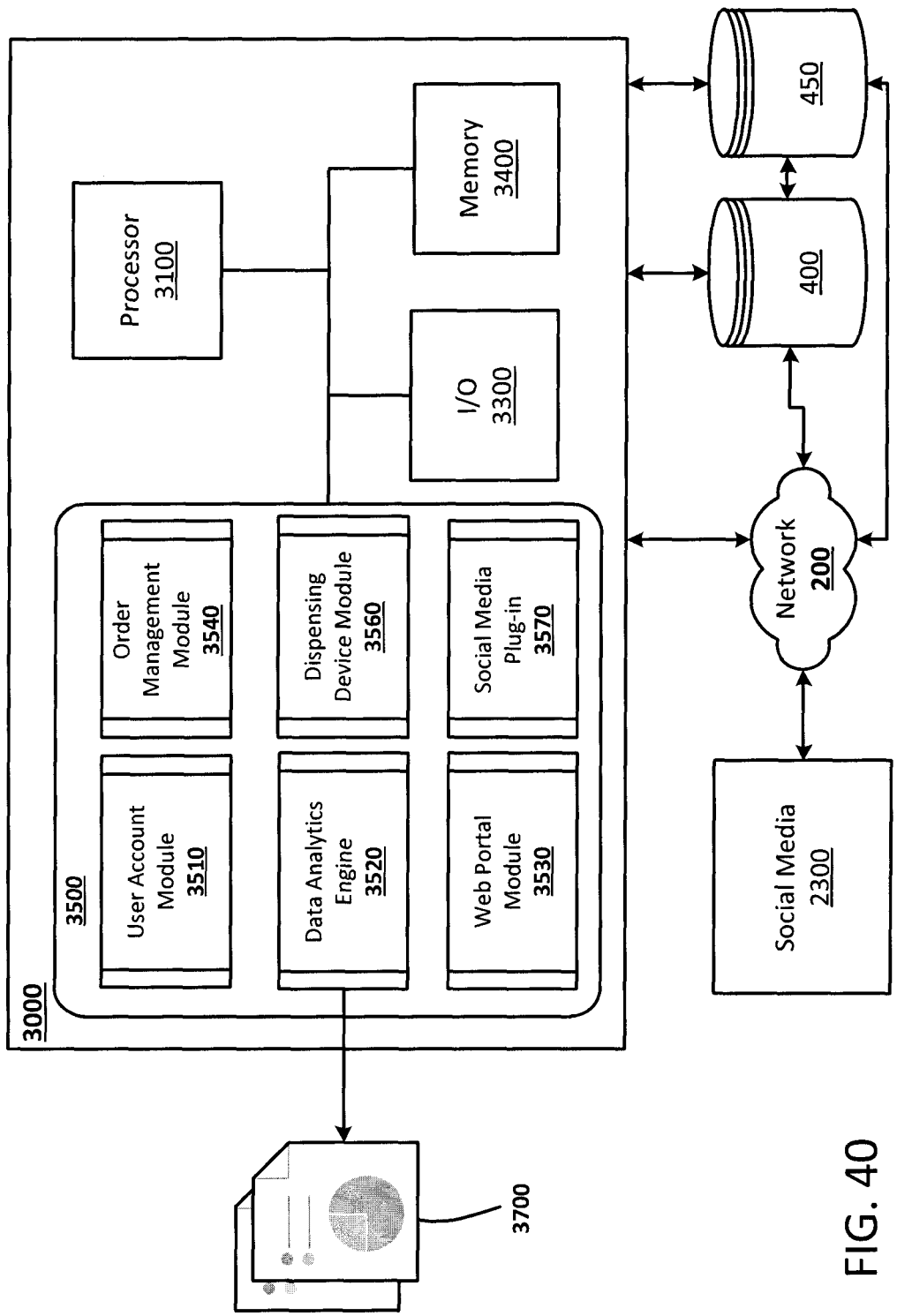
FIG. 40 illustrates a high-level block schematic diagram of a server platform 3000 and associated network components, in accordance with some example embodiments.

FIG. 40 illustrates a high-level block schematic diagram of a server platform 3000 and associated network components, in accordance with some example embodiments. Platform 3000 may include a central processing unit ("CPU") or processor 3100 connected to a memory storage unit 3400. The processor 3100 may process an operating system, application programs, and data. The operating system, application program, and data may be stored in memory 3400 executed by processor 3100, as may be required. Platform 3000 may further include an I/O interface 3300 for interfacing with various external systems and input/output devices (e.g. keyboard, mouse or touch screen). Platform 3000 may form part of a network 200 via a network interface (not shown), allowing platform 3000 to communicate over network 200 with other network entities, systems, or other web applications or portals such as social media 2300.

As shown, Platform 3000 may include instructions for execution of one or more application programs such as User Account Module (UAM) 3510, Data Analytics Engine (DAE) 3520, Web Portal Module (WPM) 3530, Order Management Module (OMM) 3540, Dispensing Device Module (DDM) 3560 and Social Medial Plug-in (SMP) 3570 stored on a non-transitory memory media 3500.

User Account Module (UAM) 3510 is operable to register and authenticate users (using a login, unique identifier, and password for example) prior to providing access to applications, a local network, network resources, other networks and network security devices. UAM 3510 may be configured to add new users to user database 400, or modify existing user information, based on electronic data received from kiosk 1200, user device 1300, mug 1350, and/or web portal 1400.

In some embodiment UAM 3510 can be configured to maintain or manage user customization table 410 as well as user purchase history table 420 in user database 400.

UAM 3510 may be further configured to securely store user's financial or payment information in user database 400 or a separate secure database.

Data Analytics Engine (DAE) 3520 may be configured to provide a plurality of reports or insights 3700 based on gathered data. For example, such reports 3700 may be utilized to plan and implement advertising or marketing campaigns. DAE 3520 may make recommendations, such as best or most popular blend(s) for a specific demographic group of users, such as a specific age group or a specific geographic region based on order history of some or all users in the same demographic group, such as the same age group or same geographic group. DAE 3520 may also make recommendations as to ideal target audience for a new blend, or a demographic group to which one should target to promote certain kind of flavours, and so on. In some embodiments, DAE 3520 may be further configured to make recommendations of one or more product (e.g. ingredient) based on a selected product for a user 30, as described further below.

In some embodiments, DAE 3520 may provide one or more dashboards 3700 for decision support, where administrators and/or vendors may be able to receive various suggestions or recommendations from the dashboards as determined by the engine based on a set of rules, and these suggestions may vary depending on the objectives, target audience, product/service type, etc. The decision support may, in some embodiments, provide feedback in relation with industry averages and/or any other type of available success or business metrics. The one or more set of rules may be determined and refined by way of machine learning. Additional weighting and ranking steps may be performed by DAE 3520 to further refine the results.

DAE 3520 may be configured to utilize various machine learning techniques, such as neural networks, hidden Markov models, etc. to discover trends and/or parameters of trending products, emerging products, and/or target audiences.

Web Portal Module (WPM) 3530 may be configured to manage and maintain web portal 1400 as well as various mobile applications on user device 1300.

Order Management Module (OMM) 3540 may be configured to manage shopping cart, accept one or more user orders, process one or more orders, saving an order for a blend, retrieve payment transaction details, as well as verify and apply credit/voucher/promotion codes. In some embodiments, OMM 3540 may be configured to process an order for a pre-set blend from a user device without active prompts for user input or authorization. For example, if a user 30 places a mug 1350 on the dispensing device 110, the mug 1350 is verified to belong to user 30, and there is a credit card on file for user 30, then OMM 3540 may be configured to process the order based on a pre-set blend as received from the mug's NFC chip, and automatically charge the credit card for said user, without the user having to manually input any credit card information, or to even explicitly acknowledge that a particular credit card is being used for payment.

Dispensing Device Module (DDM) 3560 may be responsible for controlling of the dispensing device 110 by platform 3000. In particular, DDM 3560 may be configured to send instructions to dispensing device 110 for dispensing of product. For example, DDM 3560 may be configured to interface with dispensing device 110 to receive/transmit both data (e.g. inventory or user data) and electronic signals (e.g. synchronization signals).

Social Medial Plug-in (SMP) 3570 may be configured to interface various kinds of social media applications 2300 such as Facebook™, Twitter™, Instagram™, and so on. For example, SMP 3570 may be configured to retrieve information related to recent check-ins by a user's Facebook™ friends and to send said information to data analytics engine 3520 or user account module 3510 such that platform 3000 may inform the user 30 of his friends' activities relating to one or more dispensing devices located at one or more locations. For another example, SMP 3570 may be configured to gather information from Twitter™ (and/or another social media platform) regarding popular or well-received blends, based on a natural language processing module (not shown).

Figure 41A:
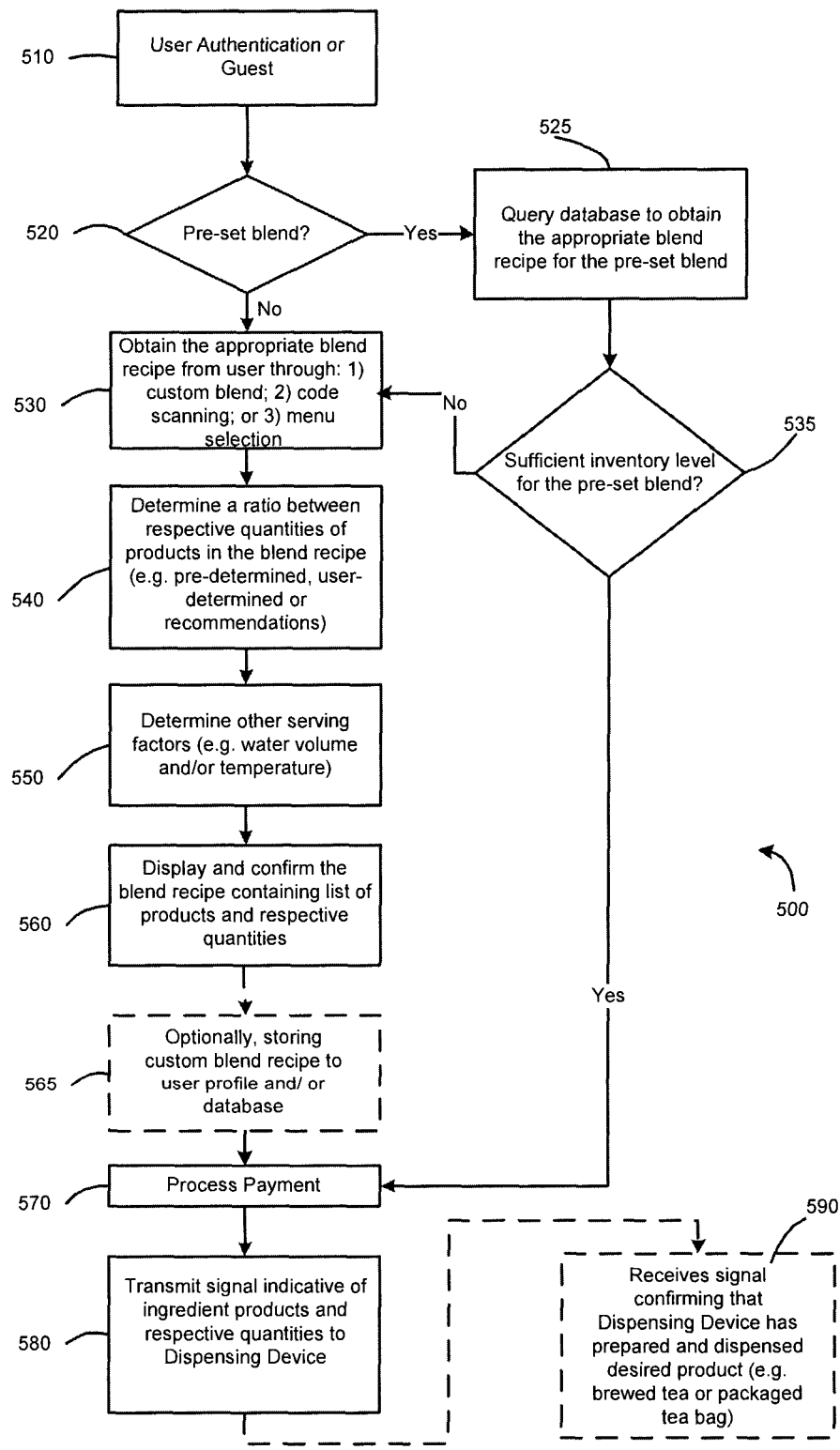
FIG. 41A provides a workflow diagram of a process performed by the platform 3000, according to some example embodiments.

Referring now to FIG. 41A, which provides a workflow diagram of a process 500 performed by the platform 3000, according to some example embodiments.

At step 510, User Account Module 3510 of Platform 3000 may be configured to authenticate a user, or allow a guest to continue the ordering process, based on the electronic data signal received from a user through a user associated device. For example, the signal may come from a kiosk 1200, a user device 1300, or a user's travel mug 1350. If the signal is transmitted by a user device 1300 or mug 1350, then the user may be authenticated immediately based on a device ID or a mug ID embedded within the signal. The device ID or mug ID may be tied to a user account in user database 400. An user account may have one or more device or mug IDs. For example, the mug ID, which may be included in the data signal transmitted by a NFC tag in the mug 1350, may be associated with an existing user account ID, which has a setting of a favorite drink and a stored credit card on file.

The data signal transmitted may also simply indicate a beverage ID (e.g. a QR or barcode scanned by kiosk 1200), in which case, processor 3100 may be configured to retrieve, from local memory or a remote database, the blend recipe containing a list of appropriate ingredients or products for the beverage based on the beverage ID.

At step 520, the processor 3100 is configured to determine if the electronic data signal represents a pre-set blend. If this is the case, at step 525, the processor 3100 can query product database 450 to obtain the appropriate blend recipe for said pre-set blend. Once the query has returned the list of ingredients or products for the blend recipe, the processor 3100 may be further configure to check, at step 535, with dispensing device 110 to confirm if there is sufficient inventory stored in the device 110 for the creation of the blend based on the blend recipe. If there is sufficient inventory for each of the ingredient or product in the recipe, the processor 3100 is configured to process payment at step 570 and subsequently transmit, at step 580, a data signal indicative of ingredient products and respective quantities to dispensing device 110 for fulfillment of the blended beverage order.

At step 530, if there is insufficient inventory level for one or more ingredients or products needed to create the pre-set blend, or the electronic signal received from user indicates that it is not a pre-set blend, the processor 3100 is configured to present the user with one or more of the following three options: 1) custom blend; 2) code scanning; or 3) menu selection, and to obtain the appropriate blend recipe in accordance with the same, which is further described below in relation to FIG. 42.

Next, at step 540, the processor 3100 is configured to determine a ratio between respective quantities of products in the blend recipe. In some embodiments, the ratio may be with respect to the a final volume of the blended beverage. In some embodiments, the ratio may be between respective weights of ingredients or products. For example, the ratio may be pre-determined, user-determined or based on a recommendation. A pre-determined ratio may for example be based on professionally sourced opinion or a crowd-sourced opinion as saved in product database 450. A recommended ratio may be based on the most popular blends based on the same or similar ingredients/products for some or all users. For example, a recommended ratio may be that "the best-tasting Earl Gray is one part tea leaves, three parts water and two parts 2% milk based on the users in this area (or city)." A user may see a pre-determined or a recommended ratio, and further adjusts said ratio via kiosk 1200 or user device 1300. For example, the user may adjust the amount of tea leaves to the amount of chocolate powder.

In some embodiments, the processor 3100 may be configured to recommend, based on analysis done by data analytics engine, a recommended blending ratio among the selected ingredients or products. Such recommendation may be computed based on historical purchase data across all users, social network feedback, or general user feedback, and so on.

It is to be appreciated that one of the food products in the recipe may be water, a sweetener, a diary product (e.g. milk or cream), or any other ingredients suitable to be included for a beverage.

Next, at step 550, other serving factors are determined including for example a water volume and/or a water temperature for said blend product. Such factors may also be determined, in some embodiments, based on a pre-determined value as stored in product database 450 or by user customization. For example, a user may wish to reduce the overall volume of beverage as to leave room for additional flavouring by himself or herself.

Next, at step 560, the processor 3100 is configured to display and confirm the blend recipe containing list of products and respective quantities.

Optionally at step 565, the processor 3100 may be configured to store the custom blend recipe to the associated user profile and databases 400, 450. For example, a electronic code (e.g. barcode or QR cord) may be generated for the custom blend and stored in the databases, and further linked to the user profiles. Users may also have the option to post the custom blend on their social media profiles.

At step 570, payment may be processed in accordance with payment methods stored within or linked to the user's account, or alternatively, the platform 3000 may prompt user to confirm or enter payment information to proceed.

In some embodiment, if the user's account or profile has a setting that indicates that all payments can be processed automatically based on an existing payment record on file, then the processor 3100 may be configured to process the payment automatically without prompting for the user's confirmation. This way, a user who prefers to use a mug 1350 to buy a favorite drink can simply walk up to the dispensing device and receive the favorite drink without having to use a mobile device or a credit card for payment. An receipt may be automatically generated after by platform 3000 and e-mailed to the user accordingly.

At step 580, once the payment has been successfully processed, an electronic signal may be transmitted indicating ingredient or products and respective quantities to dispensing device 110.

At step 590, optionally receives signal confirming that Dispensing Device has prepared and dispensed desired product (e.g. brewed tea or packaged tea bag).

FIG. 42 provides a workflow diagram of a process 600 of determining a blend recipe performed by the platform 3000, according to some example embodiments. For example, the process 600 may be implemented by processor 3100 to obtain the appropriate blend recipe from user through: 1) custom blend; 2) code scanning; or 3) menu selection at step 530 of process 500.

At step 610, processor 3100 may receive user input regarding blend options. For example, the user input may choose one of 1) custom blend; 2) code scanning; or 3) menu selection At step 620, if the user input indicates that a code scan is received, then the processor 3100 may be configured to retrieve the blend recipe represented by the code scan, and check, at step 623, if sufficient inventory level exists for each of the ingredients or products in the recipe. If sufficient inventory level exists, then the appropriate blend recipe may be selected based on a lookup operation from product database 450 at step 625.

If there is no code scan detected, or if the blend recipe based on the code scan has ingredients or products with insufficient inventory levels, then at step 630, user is asked if he or she would like to opt for a menu selection or a custom blend option.

At step 635, if the user has opted for a menu of blends with pre-selected products, then a menu may be presented. The presentation may include various default and/or recommended blend recipes as generated by data analytics engine.

The recommended blends may be based on a variety of factors such as location of dispensing device 110, age or gender of user, or other types of demographic characteristic of the user as available in user database 450 or from social media 2300. The recommended blends may also be based on the most popular blends among the user's friends as indicated in user database 400, or among the user's friends in social media 2300. The recommended blends may also be based on user's purchase history, or a user's taste compilation based on said purchase history. The recommended blends may be based on other factors such as time of day, day of the week, or any promotions applicable at the time of ordering.

At step 640, a user selection is received, indicative of selected blend recipe.

At step 630, if a user prefers to select his or her own ingredients or products, then at step 650, the user is presented with a list of ingredients, products or other types of flavourings.

At step 655, the processor 3100 may receive one or more user selections of products to be used in the blend.

At step 660, as an option, the processor 3100 may recommend one or more products based on the user selections. In some embodiments, the recommended products may be based on a variety of factors such as location of dispensing device 110, age or gender of user, or other types of demographic characteristic of the user as available in user database 450 or from social media 2300. The recommended products may also be based on the most popular blends among the user's friends as indicated in user database 400, or among the user's friends in social media 2300. The recommended products may also be based on user's purchase history, or a user's taste compilation based on said purchase history. The recommended products may be based on other factors such as time of day, day of the week, or any promotions applicable at the time of ordering.

In one embodiment, the recommended products or blends may be based on data mining or a heuristic process, where a prediction or determination is made regarding the ingredients or products that are most likely to go well together, along with associated quantities and steeping temperature(s).

In another embodiment, location data may be used to make recommendations based on specific geographic locations. If the user is using a mobile application on a device 1300, additional user details may be received or determined, and recommendations may be generated based on the additional user details, such as frequently visited locations, most used applications, and so on.

In yet another embodiments, recommendations of products or blends may be based on one or more of the following information: individual user information including purchase history and preferences; purchase history or preferences of selected user groups, or across all users; most popular blends of the day (as determined by historical data and/or social media data, e.g. most liked blend on Facebook™); and databases storing best flavours, which may be crowd-sourced or professionally sourced.

In some embodiments, the recommendations may be based on one or more blends that includes at least one of: created, shared and purchased blends.

In another embodiment, the recommendations may be based on an access points as determined by a location of user device 1300, such as mobile phone, tablet, or desktop.

In another embodiment, the recommendations may be based on blends suggested, mentioned and/or requested through interaction or user feedback to platform 3000 or social media 2300. For example, the recommendations may be based on information received from comments, votes, and so on, via e-mail, in person, word-of-mouth, website, blog or the platform 3000.

In yet another embodiment, the recommendations may be based on a geolocation e.g. by frequent or most popular orders at specific locations.

In one embodiment, the recommendations may be based on a time of day, such as by frequently ordered products or blends at specific times during the day.

In another embodiment, the recommendations may be based on a number of purchases of a blend at a specific location or for a user group.

In yet another embodiment, the recommendations may be based on information from user profiles such as demographics or lifestyle data. Such data may be obtained through profiles in user database 400, or connected social media 2300.

The user may further make selections based on the recommendations if desired.

At step 670, a maximum number of ingredients is reached and a confirmation page is presented to the user, confirming the list of products as selected, including associated quantity and/or ratio, and a final custom blend recipe is generated accordingly.

This custom blend recipe may then be assigned a unique electronic ID or code, such as a barcode or QR code, stored accordingly in product database 450, and may be linked to user database 400. The blend recipe may be further uploaded to social media 2300 per user's setting or preferences.

Figure 41B:
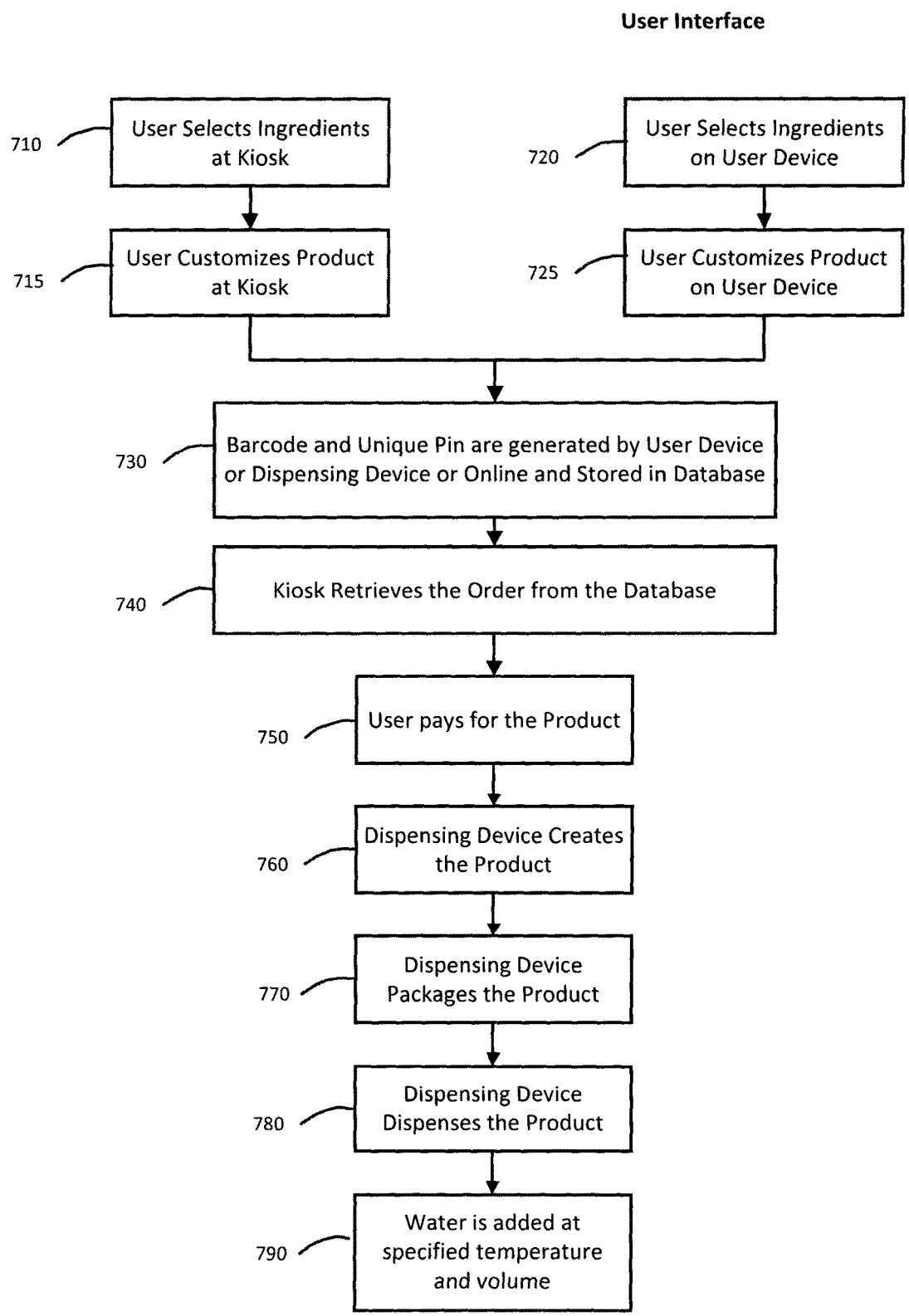
FIG. 41B provides another workflow diagram of a process performed by the dispensing system 100, according to some example embodiments.

FIG. 41B provides another workflow diagram of a process performed by the dispensing system 100, according to some example embodiments.

At step 710, user may select ingredients at kiosk 1200. Alternatively, user may selects ingredients on user device 1300 at 720.

At step 715 or 725, user may customize product or blend at kiosk 1200 or user device 1300, respectively.

At step 730, a barcode and an unique pin may be generated by user device 1300 or dispensing device 110 online, or stored in a database.

At step 740, the kiosk 1200 may retrieve the order from database.

At step 750, the user may pay for the product.

At step 760, the dispensing device 110 may create the product.

At step 770, the dispensing device 110 may package the product.

At step 780, the dispensing device 110 may dispense the product.

At step 790, water may be added at a specific temperature and volume.

In one embodiment, users or customers can create blends on their smartphone 1300, computer 1300, or the kiosk 1200 itself. They can select ingredients or products, and ratio(s) as between those ingredients, water temperature, volume of water, sweetener, and associated quantity of each product. Then they can name their blend and add a description or picture. The customers can share these blends via social media 2300. Each blend may be assigned a unique code and this code can be transmitted to the dispensing device 110 by manual entry, or by encoding it in a barcode and scanning it, or wirelessly through RF, NFC, or IR. Once the blend is sent to the dispensing device, a kiosk 1200 or the dispensing device itself may be display the relevant information (name, description, picture, and so on), and then follow the blend recipe to make the blended beverage accordingly. Payment information may or may not be required when simply transferring the blend to the kiosk. For example, if a user's friend sent the user a blend code and the user has scanned her phone at the kiosk 1200 to order it, then the device 110 or platform 3000 may prompt the user for payment information before starting fulfillment of the blended beverage. However, if the user uses a mobile application on his user device 1300 to create a blend, or if the user has imported a specific blend into the platform 3000 before ordering, then the user can proceed with automatic payment processing as the user's account may be associated with a pre-existing payment information and has a preference setting to allow the system 100 to process the payment automatically based on information on the user's account. For example, when a phone or a mug is scanned and a pre-set blend is sent through the wirelessly transmitted signal, the device 110 may simply make the drink and bill the user afterwards. The bill may be sent to the user's e-mail associated with the user's account.

Figure 56A:
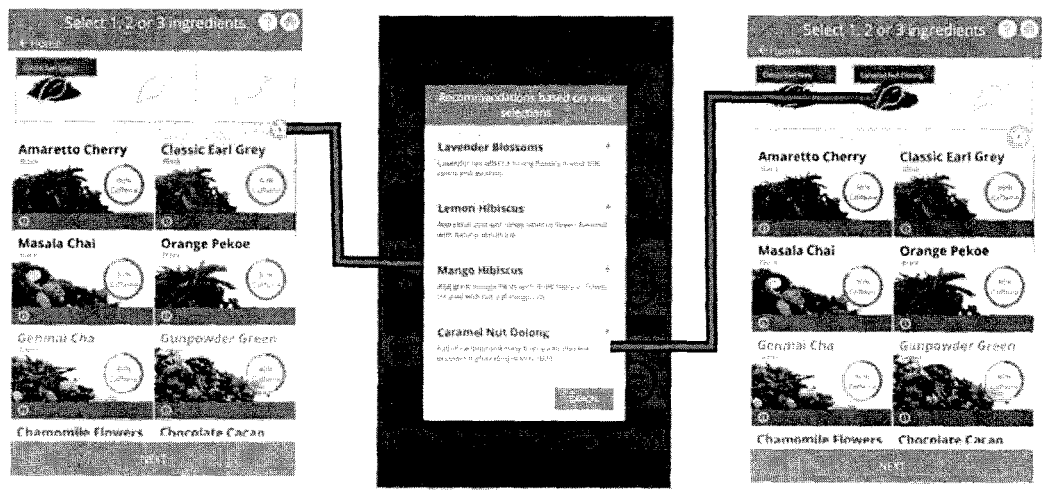
FIGS. 56A, 56B and 56C provide example user interfaces for ordering and receiving a food product (e.g. brewed tea) from dispensing device 110.
Figure 56B:
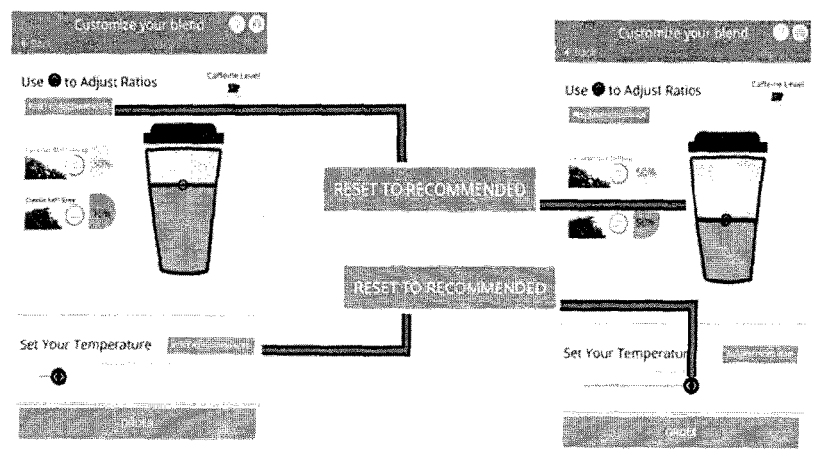
Figure 56C:
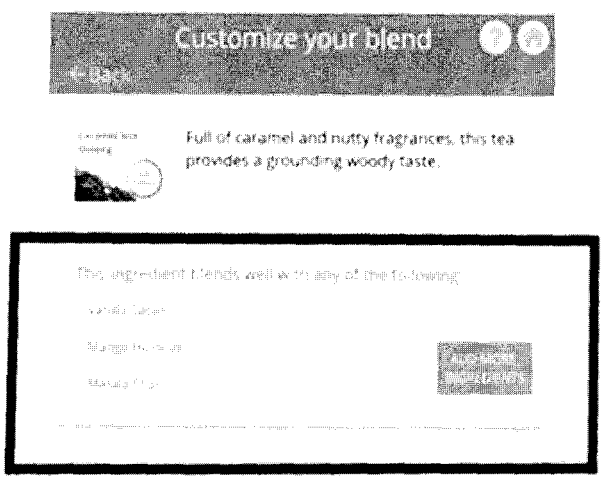

FIGS. 56A and 56B provide example user interfaces for ordering and receiving a food product (e.g. brewed tea) from dispensing device 110. As can be seen in FIG. 56A, recommendations are made based on a user's selection of ingredients and products during the blend customization process. Further, in FIG. 56B, a user may further customize a blend by adjusting a ratio between two products and setting a water temperature. FIG. 56C provides an example user interface showing a recommendation of a product generated by data analytics engine based on a selection of a first product by the user. As can be seen, as a user selects a first product (e.g. "caramel nut oolong"), platform 3000 through a data analytics engine is configured to query a plurality of sources including, but not limited to, social media 2300, user database 400, product database 450, and other information, in order to generate one or more products to be recommended to the user. A temperature (e.g. steeping temperature for tea) may also be recommended or adjusted by user.

Figure 57A:
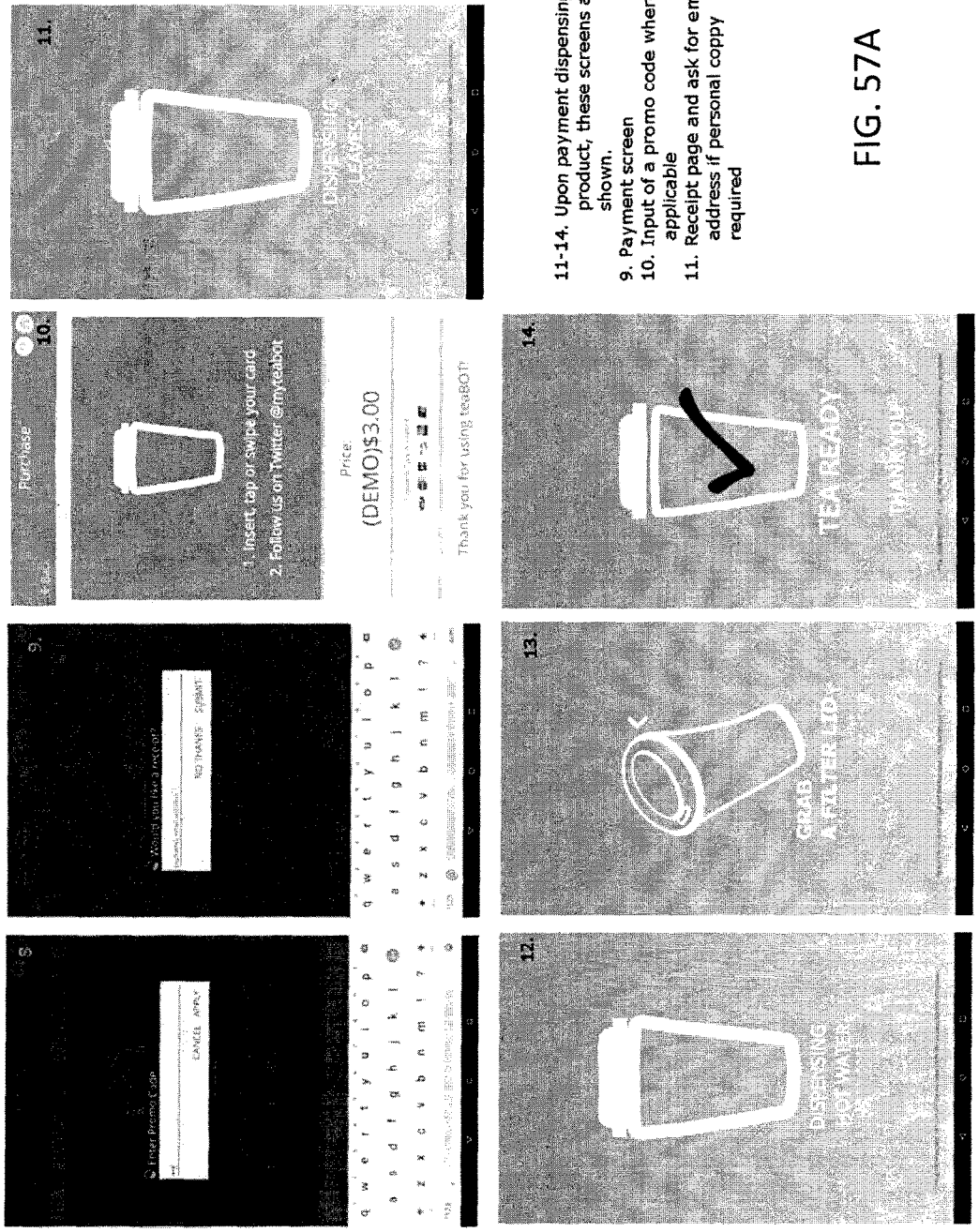
FIGS. 57A and 57B provides example user interfaces shown on a kiosk 1200 or user device 1300 associated with ordering and receiving a food product from dispensing device 110.

FIG. 57A provides example user interfaces shown on a kiosk 1200 or user device 1300 associated with ordering and receiving a food product.

Figure 57B:
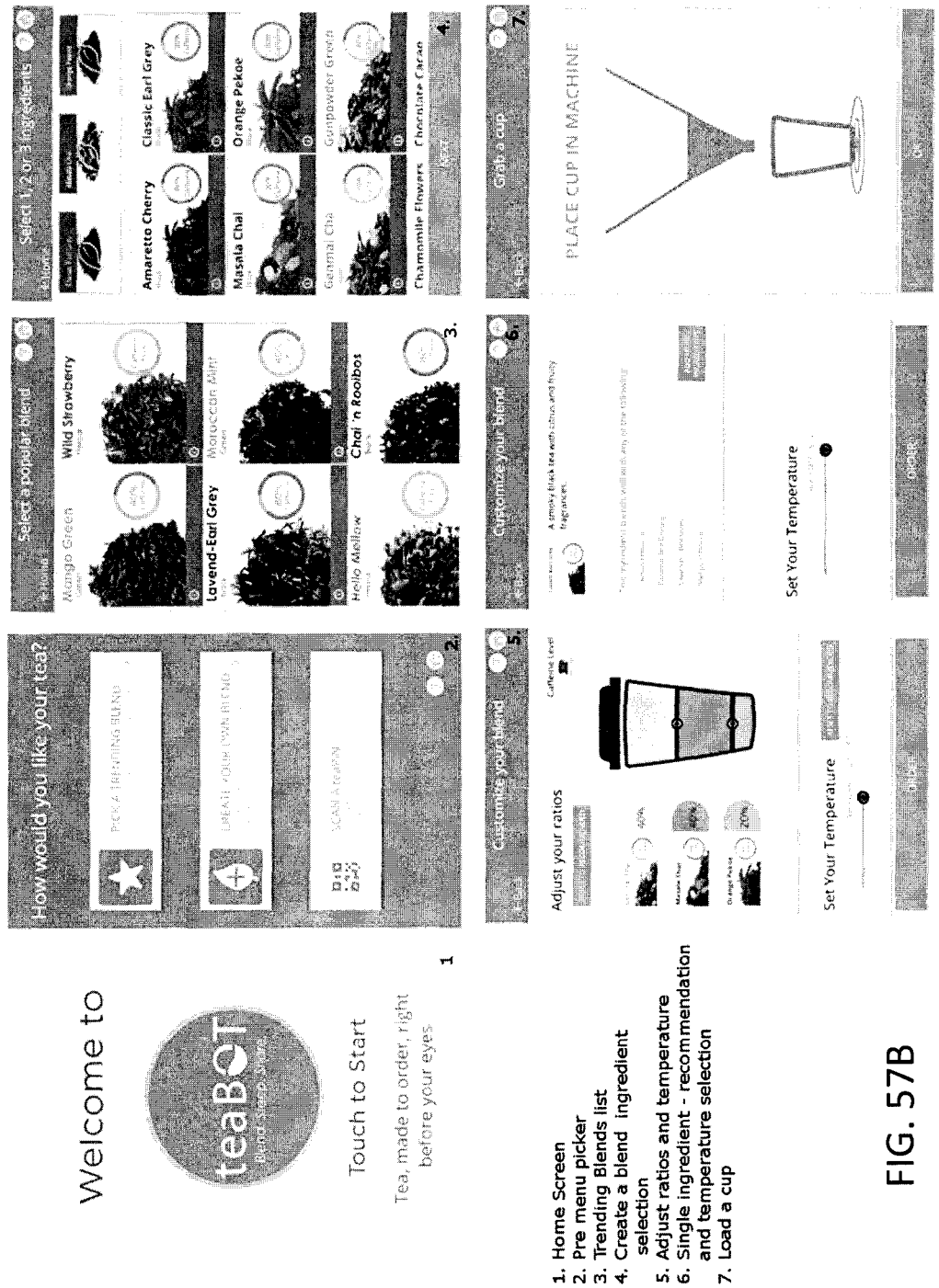

FIG. 57B provides example user interfaces designed to walk a user through the blend-ordering process in some embodiments. As illustrated, a user may pick a trending blend, create his or her own blend, or scan a pin code to specify a blend. A user may select up to a pre-determined number of products. Platform 3000 may be configured to graphically illustrate a ratio, based on an overall volume, as between each product. A respective volume of a product may be corresponding to a specific weight of said product, based on a pre-determined formula. Said formula may be stored in product database 450. Once a respective volume of a product has been determined based on an overall volume and a ratio between the selected products, a corresponding weight may be determined by platform 3000 (or determined by device 110), as to facilitate the device 110 to dispense a finely tuned amount of product accordingly. In some embodiment, platform 3000 or device 110 may be operable to check an inventory level of one or more selected products based on said volume or weight, and act accordingly.

FIG. 43 provides another high-level block schematic diagram of a platform 3000 and associated network components, in accordance with some other embodiments. The platform 3000 may be configured to utilize specific data structures and/or data processing technologies. In some embodiments, the platform 3000 may be a software application on a mobile device.

In some embodiments, the platform 3000 may include a notification module for causing messages or notifications to be generated and/or sent. Notifications may include, but are not limited to, Short Message Service (SMS), Multimedia Message Service (MMS), e-mail messages, and/or social media messages such as Twitter™, Facebook™ and/or Google+™ posts.

In some embodiments, a notification module may cause messages or notifications to be generated and/or sent to users, for example to a mobile device via a telecommunications network, indicating the optimal period of time to remove the beverage flavouring bag (a non-limiting example being a tea bag).

In some embodiments, a notification module may cause messages to be sent to the platform, for example messages containing feedback, comments, or other information may be sent to the platform via wired or wireless telecommunications networks.

In some embodiments, the platform may be configured to notify users at the optimal time or period of time to consume their beverage. For example, the platform may cause a kiosk to display a message.

In some embodiments, platform 3000 may include a delivery module that may read data from databases and transmit data to the device in order to govern the function of the dispensing device 110. For example, the choice of a specific beverage option by a user may cause the platform's delivery module to query specific values stored in a database that represent the ingredients and preparation algorithm for that beverage. The delivery module may then cause that data to be converted into a signal containing a set of machine-executable instructions that may be sent to the device for execution.

In some embodiments, the platform may include a blending module. The blending module may receive instructions containing specific ratios of product to be blended (creating a blend), for example, from the kiosk, and may query one or more databases in order to determine various serving factors. These factors may include, but are not limited to: a temperature, and/or range of temperatures, of water to be used; an amount, and/or range of amounts, of water to be used; and, a steeping time, and/or span of steeping times. The blending module may further be configured to update a recommendations database based on user feedback and user customizations of recipes. Various algorithms may be utilized, by the blending module, to develop recommendations based at least on various information from the databases, such as top blends, timing, particular tastes, flavoring combinations, etc. In further embodiments, the blending module may be configured to adapt and iterate the recommendations based on historical use and/or reviews.

In some embodiments, the blending module may, after determining serving factors, cause the platform to notify the user as to the ideal serving instructions for a vended product. For example, the blending module may cause the platform to notify the user via the mobile application that his or her beverage flavouring bag should be removed a specific number of minutes after vending.

In some embodiments, the platform may include a module for providing analytics and reporting.

In some embodiments, the platform may include a module for managing a mobile application and/or the data sent to or received from users of the mobile application.

In some embodiments, the platform may be configured to store messages sent to the platform in an online database; the platform may, subsequently, allow users to recall those messages.

In some embodiments, the platform may allow users to select specific amounts of various beverage flavourings via an interface such as, for example, a mobile device or web application. The platform may then save those specific values as data entries in an online database, thereby allowing users to cause those values to be transmitted to another device over a network such as a kiosk.

In some embodiments, the platform may include a social media module for the management of data sent and/or received to and/or from social media providers. Social media providers may include, but are not limited to, Facebook™, Instagram™, Twitter™, Google+™, WhatsApp™, and Kik™.

In some embodiments, a two dimensional code, near field communications tag (NFC tag) or other such instrument may be used to save a particular Blend for later re-order or for sharing via communication network, social media providers, e-mail messages or other means of sharing a two dimensional barcode.

For example, each unique blend and recipe may be associated with a unique electronic representation such as a code, a 2D barcode, and in some embodiments, even the same recipe with a different name may be assigned a unique code.

The system 100 may be configured to utilize a 2D barcode or NFC tag to (1) login to the system—bring up a user's order history, personalized recommendations, loyalty program, etc., and (2) a coupon. 2D barcodes/NFC tags may be scanned at the kiosk, platform and/or any generic barcode scanner, and the system may be configured to send a user to an e-commerce site, which may be configured such that the system is aware of the specific blend, login or the presence of coupons.

In some embodiments, the platform may include a module for processing payments. Such payments may include, but are not limited to, payments made at kiosks, payments made via mobile device, and payments made via web applications.

In some embodiments, a payment module may be configured to support virtual currency or crypto-currency.

In some embodiments, a payment module may be configured to generate receipts automatically.

In some embodiments, the platform 3000 may include a module (e.g. web portal module 3530) for managing a web application and/or the data sent to or received from users of a web application.

In some embodiments, users may customize blends of beverage flavouring (e.g., tea) by various means, for example: via a kiosk, by scanning a two dimensional code via a kiosk's code-scanner, or via an application installed on a mobile device. Some embodiments may allow users to cause these Blends to be shared via social media and/or to discover Blends that have been shared via social media by others.

In some embodiments, the device may be configured to prepare multiple outputs. Such outputs may include (a) a cup of tea; and, (b) custom-made tea bags that may be taken home for subsequent brewing. In some embodiments, there may be various options for indicating the heat of the tea, which may include, but are not limited to, preparing tea that is heated, cold, and/or room temperature. For example, the system may be configured such that the user may select the temperature, and the temperature may have the ability to provide various hot and cold temperatures.

In some embodiments, the device may be configured to add sweetener directly into the bag or beverage container by means of a dispenser or other such means of releasing sweetener.

In some embodiments, the device may be configured to dispense a cup, for example, via a top-dispensing mechanism. In some embodiments, the dispensing mechanism may be configured such that a cup rises from a base.

In some embodiments, the device may be configured to dispense beverage flavouring directly into a beverage flavouring bag via a flavouring dispenser.

In some embodiments, the device may be configured with a bag sealer to seal beverage flavouring bags automatically.

In some embodiments, the device may be configured to print text and/or designs onto beverage flavouring bags. For example, the device may be configured to print the name of a user and/or a particular logo on beverage flavouring bags.

In some embodiments, the device may be configured with a bag cutter to measure, cut, and seal material in order to create beverage flavouring bags.

In some embodiments, the device may be configured automatically to measure, cut, and seal beverage flavouring bags based on user input data and/or other data, including, but not limited to, the size of cup present. For example, a user may select a quantity and/or quality of product which requires a particular sized beverage flavouring bag. The device may then measure, cut, and seal such a bag and, then, vend that bag.

In some embodiments, the device may be configured with a sensor enabling it to determine the height and/or width of a cup. This may be used to allow the device to alter its various other functions. For example, the size of cup present may cause the device to perform a particular process in order to measure, cut, seal, fill, and vend a flavouring bag sized to that cup.

In some embodiments, the device may be configured with a system to store or intake water and/or other liquids.

FIG. 44 provides a block diagram of the user database 400 which may include a user customizations table 410 and user purchase history table 420. In one embodiment, the platform 3000 may transfer data to and from the user database 400 in order to provide various features to users, for example, registering user accounts, tracking purchases made by particular users, and suggesting customized blends based on user preferences.

FIG. 45 provides a block diagram of the product database 450 which may include a product inventory table 460 and device instruction table 470. The platform 3000 may transfer data to and from the user database 400 in order to provide various features to users, such as calculating the steep time for a specific blend.

Kiosk

Figure 46:
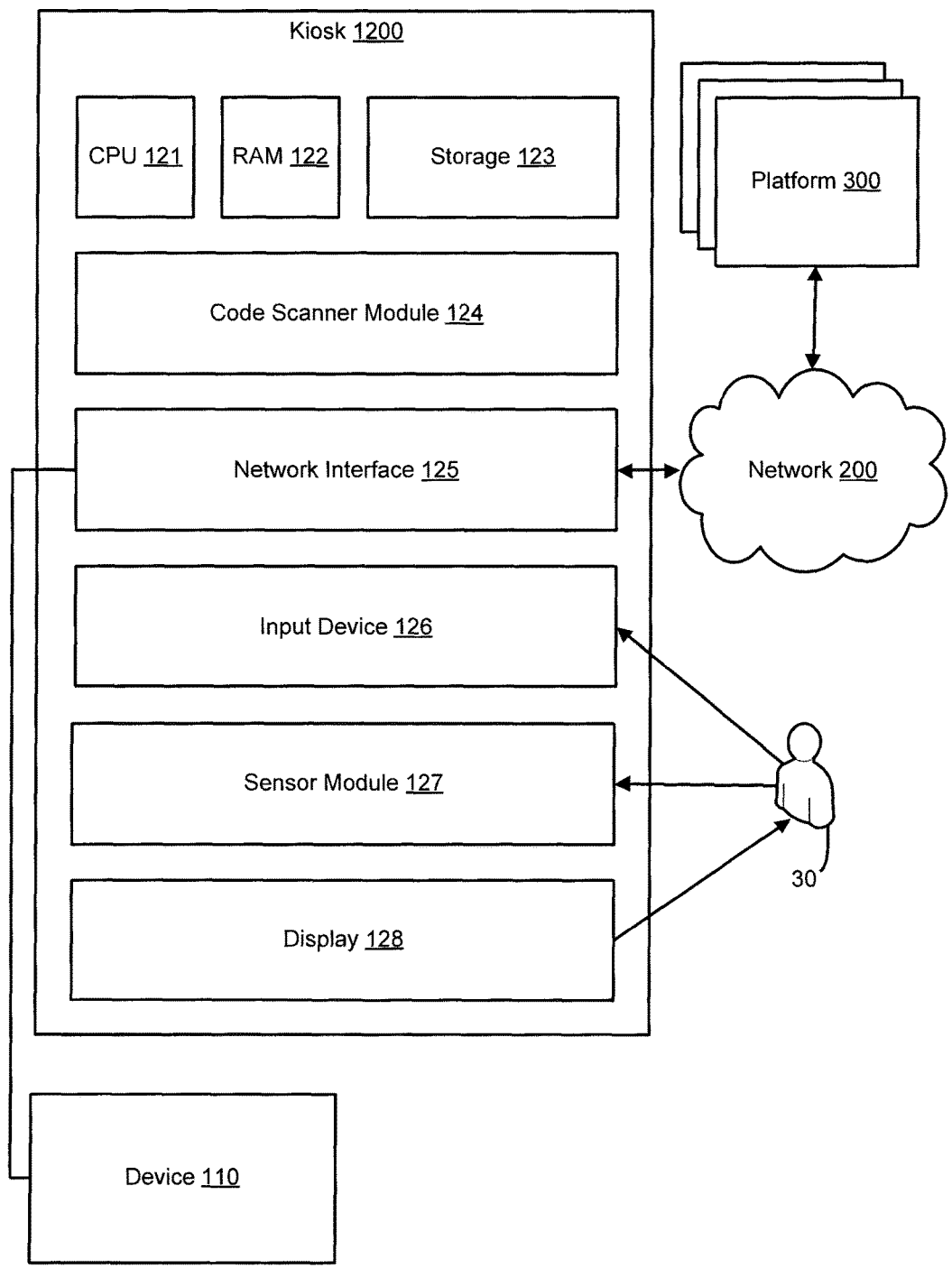
FIG. 46 provides a block diagram of a kiosk according to some embodiments.

Referring now to FIG. 46, a block diagram of a kiosk according to some embodiments is shown. Kiosk 1200 or a similar automated ordering apparatus may be provided. The kiosk 1200 may include some or all of the following: a central processing unit (CPU) 121, random access memory (RAM) 122, a data storage unit 123, an optical code scanner module 1240 (or a camera-like apparatus), a network interface 125, a human interface device (for example a keyboard or touch screen) 126, a sensor module 127, various communications means (e.g. Bluetooth, near field communications) and/or a display unit 128.

In some embodiments, the data storage unit 123 may contain a specifically programmed set of instructions to be performed in the event that no signal is received from any network interface with which the kiosk is configured. Such a set of instructions may direct the kiosk in a manner such that it may disable certain functions and/or display specific pre-configured messages to users via the kiosk's display unit.

There may be multiple ways of organizing the system with regards to facilitating linkages between a present user's input, various interface rules, and the subsequent transport of resultant information to be processed by other modules. In some embodiments, the kiosk may be attached to the device and may be configured to allow users 30-33 to place orders and to receive prompts and feedback that may be generated by the platform 3000, communicated to the kiosk 1200 via a network interface 125, and displayed to users via the kiosk's display 128.

Figure 47:
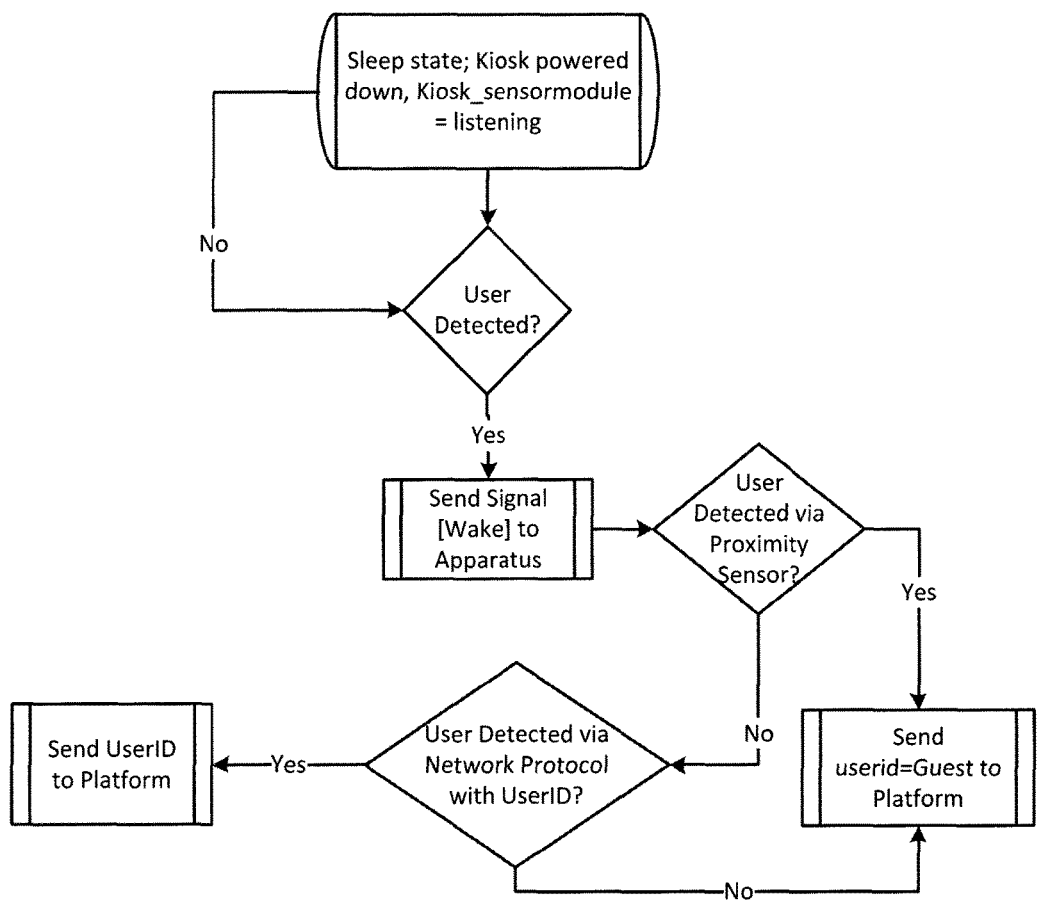
FIG. 47 provides a logical flow diagram of the logical function of the kiosk's user detection module according to some embodiments.

FIG. 47 provides a logical flow diagram of the kiosk's user detection module according to some embodiments. The kiosk 1200 may be configured to employ a sensor module 127. The kiosk 1200 may be configured with corresponding functionality such that various information about the location of the kiosk 1200, relative or absolute, combined with various information about the location of a user's 30-33 mobile device and/or the user 30-33, relative or absolute, may be utilized to determine that a user 30-33, and/or a mobile device associated with a user 30-33, may be in physical proximity.

Various means may be utilized for determining location, such as Bluetooth, proximity sensors (e.g. a light sensor), WiFi location determination, Global Positioning System (GPS) position detection, and cellular triangulation, among others. These means may be utilized individually and/or in combination with one another.

As a non-limiting, illustrative example, the sensor module 127 may include a proximity sensor to detect the relative location of a user's 30-33 physical presence which comes within a specified range of the kiosk. The sensor module 127 may also include, for example, a Bluetooth and/or WiFi receiver to detect the relative location of a mobile device associated with the user 30-33 that comes within transmission range of the sensor module. The sensor module 127 may also use cellular triangulation, WiFi triangulation and GPS position detection, individually, or in various combinations, in order to determine the absolute location of the kiosk 1200. For example, the sensor module 127 may compare the sensor module's 127 absolute location to the absolute location of a user's 30-33 mobile device, which may also be determined through triangulation and/or GPS. Once a potential user 30-33 has come within a specified range, data, which may include, but need not be limited to, the method of detection, time of day, location of the particular kiosk 1200 unit, and other data (User Detection Data) may be transmitted electronically over a data network, non-limiting examples being the Internet or a Wide Area Network (WAN), to be processed by the platform 3000.

Some embodiments may transmit User Detection Data to the device 110, which may apply various algorithms to determine, based on the nature of the User Detection Data, the device's 110 proper operating state. The algorithms may also, in some cases, cause a processor to direct the kiosk 1200 to communicate certain information related to the user 30-33 to the platform 3000 (e.g., location and purchase history).

In some embodiments the sensor module 127 may be configured to determine the time and/or date.

Figure 48A:
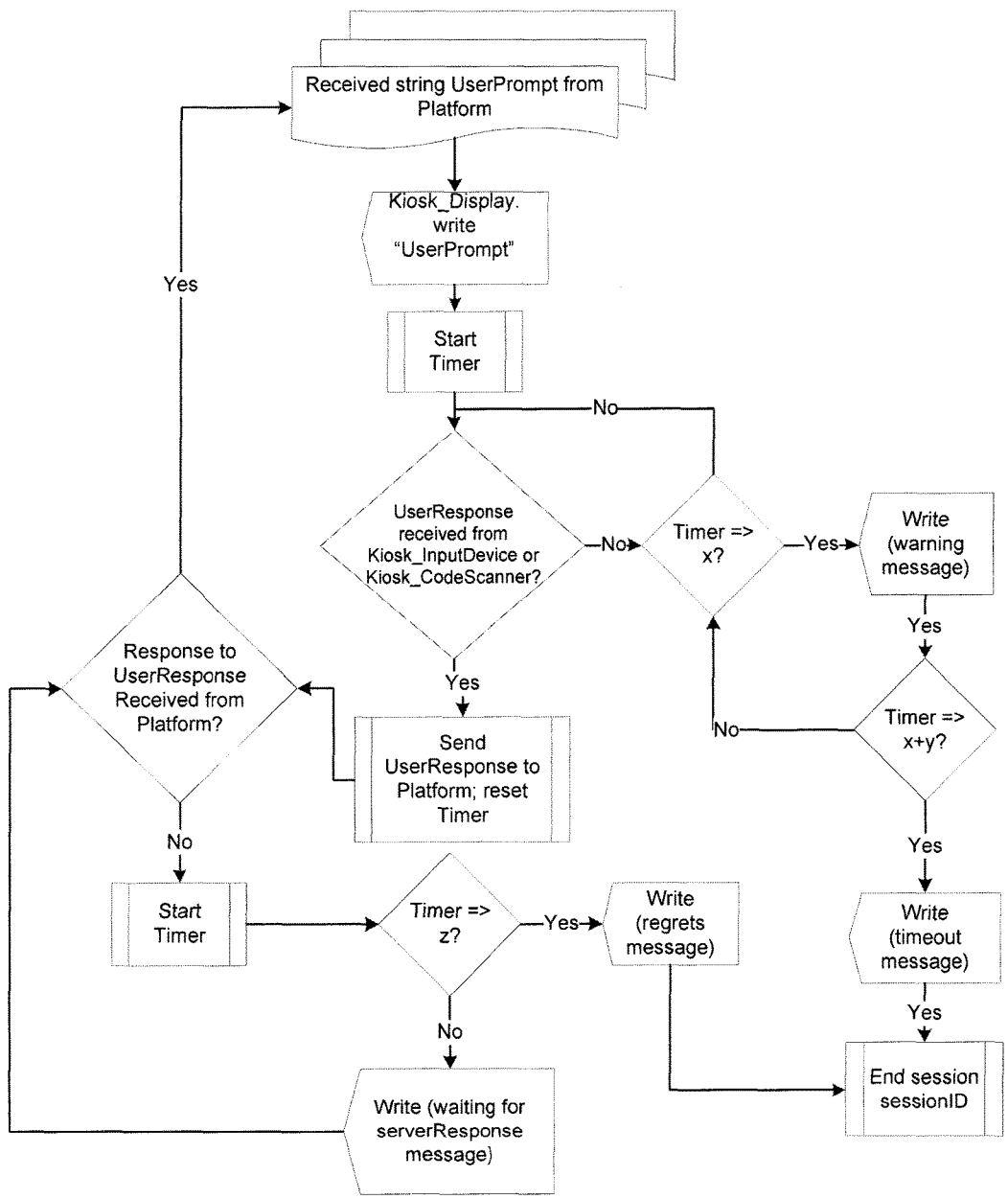
FIG. 48A provides a logical flow diagram of the kiosk's interaction with users according to some embodiments.

FIG. 48A provides a logical flow diagram of the kiosk's 1200 interaction with a user 30-31 through the user interface module 122 (a non-limiting example of which is provided in FIG. 48B) through which the kiosk 1200 may be configured to display prompts, as generated by the platform 3000, via a web application module 1400 and capture data input by the user 30-31 in response to those prompts. Additionally, the kiosk 1200 may be configured to store, process, and transmit the data captured via the user interface module 122 and to cause that data to be communicated and/or transmitted over a network to the platform 3000 for further processing. In some embodiments of the invention, the kiosk 1200 may process data input by users 30-33 captured from the user interface module 122 (e.g., product selections) through particularly configured processors within the kiosk 1200 and, subsequently, the kiosk 1200 may transmit a set of instructions directly to the device 110, this may allow the device 110 to fulfil users' 30-33 orders when the kiosk 1200 is unable to communicate with the platform 3000.

In some embodiments, the kiosk 1200 may include a user interface module 122 configured to receive and transform electronic signals for display on two or three dimensional display screens.

In another embodiment, the kiosk 1200 may be equipped with code-scanner modules 124. Code-scanner modules 124 may include image sensors paired with one or more specifically configured processors for digitally analyzing encoded data (e.g., barcodes, QR scanners or camera).

In some embodiments, once the kiosk 1200 receives data from a code-scanner module 124, it may then process the data via the kiosk's 1200 CPU 121 and then communicate instructions directly to the device 110 or over a network back to the platform 3000 for further processing.

In some embodiments a code may be scanned by the code scanner modules 124, device 110, mobile device 130 or other another device connected to a network or connected to the device 110. In such an embodiment the code (e.g., a QR code, NFC signal, or network signal) may provide instructions to the device 110 defining any and/or every aspect of a Blend such as the product mix, temperature, steeping time, amount of liquid, etc. A scanned code, or another such designator, may, in some embodiments, be shared over social media networks (e.g., Facebook™, Twitter™, or Google+™), or via other modes of communication (e.g., e-mail, instant messaging, and SMS). Scanning and sharing codes may enable users 30-33 to share their preferred Blends.

In some embodiments, the kiosk 1200 may be configured to conduct functions such as vending product or registering users 30-33 while unable to communicate with the platform 3000.

In some embodiments, the kiosk 1200 may be configured to monitor its connection to the network and/or the platform 3000. This may be accomplished by means of a timer function that monitors how much time has elapsed during which the kiosk 1200 has not received a signal from the platform 3000 via the kiosk's network interface 125. The kiosk 1200 may be configured to alter its function after a certain duration has elapsed without network contact from the platform 3000.

In some embodiments, the kiosk 1200 may run a timer function that may be reset if the kiosk's network interface 125 receives an electronic signal from the platform 3000. If the timer reaches a pre-set value before receiving a signal from the platform 3000, the kiosk 1200 may be programmed to enter a pre-programmed dormant mode (Kiosk Offline Mode). The Kiosk Offline Mode may be governed by a set of offline mode parameters with its own specific set of routines and features. The specific set of parameters governing the Kiosk Offline Mode may be stored in the kiosk's 1200 data storage unit 123. Once the kiosk 1200 has retrieved the offline mode parameters from the kiosk's data storage unit 123, the kiosk 1200 may direct the kiosk's 1200 display module 128 to display a specific Kiosk Offline Mode message and user-interface to the kiosk's users 30-33 via the kiosk's display module 128.

In some embodiments, the Kiosk Offline Mode may also activate the kiosk's 120 code scanner module 124. The code scanner module 124 may allow a user 30 to scan a code, for example a QR or UPC code. After scanning the code via the code scanner module 124, a processor 121 may process that code and compare it against a set of values stored on the kiosk's data storage unit 123 specifically for use in the eventuality that the kiosk enters Kiosk Offline Mode.

If the value input by the kiosk's user 30 via the code scanner module 124 does not match any of the values stored on the kiosk's data storage unit 123, the kiosk 1200 may cause the kiosk's display module 128 to display a pre-programmed error message. If the value input by the kiosk's user 30 via the code scanner module 124 matches one of the values stored on the kiosk's data storage unit 123, a pre-programmed process may begin whereby the kiosk 1200 creates a new Transaction ID stores the Transaction ID in the kiosk data storage unit 123, displays a pre-programmed message to the user 30 via the kiosk's display module 128, and sends a Transaction Signal to the device 110 instructing it to begin a pre-programmed vend routine similar to that depicted in FIG. 49. The kiosk 1200 may also mark the locally stored value corresponding to the code scanned by the user 30 as having been used to vend a product. In some embodiments, once a value has been used to vend a product while in Kiosk Offline Mode, the kiosk 1200 may remove the locally stored value from the kiosk's data storage unit 123, or otherwise mark the locally stored value. Removing or marking locally stored values in the fashion described above may function to ensure that users 30-33 are not able to cause the kiosk 1200 to vend products free of charge while the kiosk 1200 is in Kiosk Offline Mode.

In order to ensure that the kiosk 1200 is able to communicate with the platform whenever possible, in some embodiments, the kiosk 1200, while in Kiosk Offline Mode, may periodically send electronic signals to the platform 3000 through the kiosk's 1200 network interface module 125. In the event that the network interface module 125 receives an electronic signal from the platform 3000 while in Kiosk Offline Mode, the kiosk 1200 may transmit any locally stored Transaction IDs to the platform 3000, exit the Kiosk Offline Mode and return to an online mode. This may allow the platform 3000 to process any orders made while a kiosk 1200 was in Kiosk Offline Mode. As a non-limiting example, the platform 3000 may be configured to cause orders made while in Kiosk Offline Mode to be entered into pertinent records in the user database 400 and/or the product database 450.

Logical Flow Diagram of the Device Interaction Module

Figure 50:
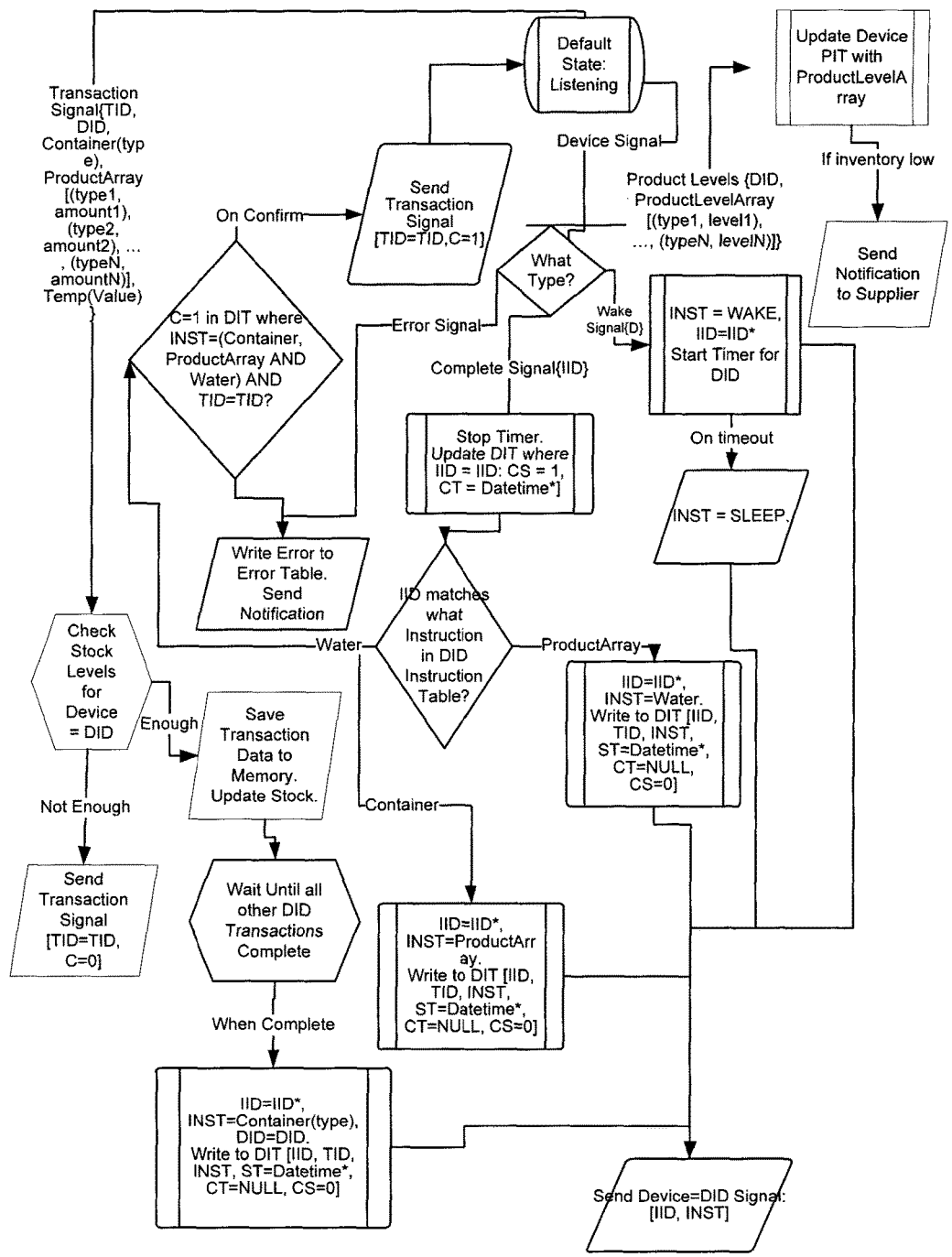
FIG. 50 provides a logical flow diagram of the platform's Device Interaction Module according to some embodiments.

FIG. 50 provides a logical flow diagram depicting the underlying computer implemented logic of one embodiment of the device interaction module (DIM), which may be a component of the platform 3000 that receives and transmits signals to and/or from the device 110. This module may begin in a listening state. In the listening state, a network signal may be received from the device 110 or a transaction signal may be received from the User Interaction Module (UIM). In the case of a new transaction signal, the signal may indicate a Transaction ID number (TID), a device ID number corresponding to a particular device 110 (DID), a container type (for example, "bag" or "cup"), an array containing the types and/or amounts of products to be included in the beverage (defined above as the Product Array) and a value for the temperature to which the device 110 should heat water for the beverage.

The DIM may first retrieve information from the Product Inventory Table (PIT) 460 for the device 110 with an ID value equal to the DID and may confirm that sufficient stock levels may be available in the particular device 110. If there are insufficient stock levels, the DIM may cause a transaction cancellation message to be sent the UIM. If there are sufficient stock levels, the DIM may save some or all of the transaction signal data to memory for later recall when the steps of beverage preparation may be carried out. The DIM may confirm that the device 110 corresponding to the DID has completed some or all previous transactions prior to commencing a new transaction (e.g., by transmitting a signal to the device 110 containing a query as to the device's 110 current operating state).

In some embodiments, depicted in FIG. 50, the device 110 may begin the process of beverage preparation after completion of some or all of the steps described in the above two paragraphs. First, the DIM may create a new Instruction ID value (IID) unique from previous keys in the Device Instruction Table (DIT) 470 corresponding to the DID. The DIM may then send the relevant device 110 this IID and a container release instruction (e.g., "bag" or "cup"). The DIM may then create a new row in the DIT 470 that may include the IID, TID, container release instruction, the current time and date and values for completion status and completion time.

In the embodiment depicted in FIG. 50, when a signal confirming the completion status as true has been received from a particular device 110 (Complete Signal), the DIM may stop some or all timers for the particular device 110, update the DIT 470 row corresponding to the DID contained in the Complete Signal, and may set values for completion status and completion time. The DIM may also retrieve the instruction type that was entered in the same row corresponding to the DID in the Complete Signal (the Original Instruction), which may be, for example: (a), a container release instruction; (b), a product release instruction; or (c), a water release instruction.

In the embodiment depicted in FIG. 50, if the Original Instruction is (a) a container release instruction, the DIM may then create a new row in the DIT 470 with a new IID, the product release instruction (which is the Product Array), and values for time, completion status and completion time. The DIM may then send the product release instruction to the particular device 110 along with the newly-created IID.

In the embodiment depicted in FIG. 50, if the Original Instruction is (b) a product release instruction, the DIM may then create a new row in the DIT 470 with: a new IID, a water release instruction; a value for time; and values for completion status and completion time. The DIM may then send the water release instruction to the relevant device 110 along with the newly-created IID.

In the embodiment depicted in FIG. 50, if the Original Instruction is (c) a water release instruction, the DIM may confirm that all container, product and water release instructions have been marked as completed in the DIT 470 where these instructions have been saved in table rows that also contain the TID. If not confirmed, the DIM may cause an error to be logged in the database and may transmit a signal instructing the platform 3000 to send an error report to an administrator. If all container, product and water release instructions have been marked as completed, the DIM may send a transaction complete signal to the UIM and may return to the default state. The DIM may then clear its temporary memory of above-described transaction data.

In the embodiment depicted in FIG. 50, when an error signal has been received from a device 110, the DIM may record this error and/or send a notification to the administrator.

In the embodiment depicted in FIG. 50, when a product levels signal has been received from a particular device 110, the DIM may update the row in the PIT 460 corresponding to that particular device 110. The DIM may then check to see if product levels have fallen below a set threshold and, if they have, the DIM may cause a notification to be sent to the platform 3000 indicating that a particular beverage flavouring or other product is in insufficient supply. The platform may then send a notification to a supplier for the purpose of reordering product.

Logical Flow Diagram of the Mobile Application

Figure 51:
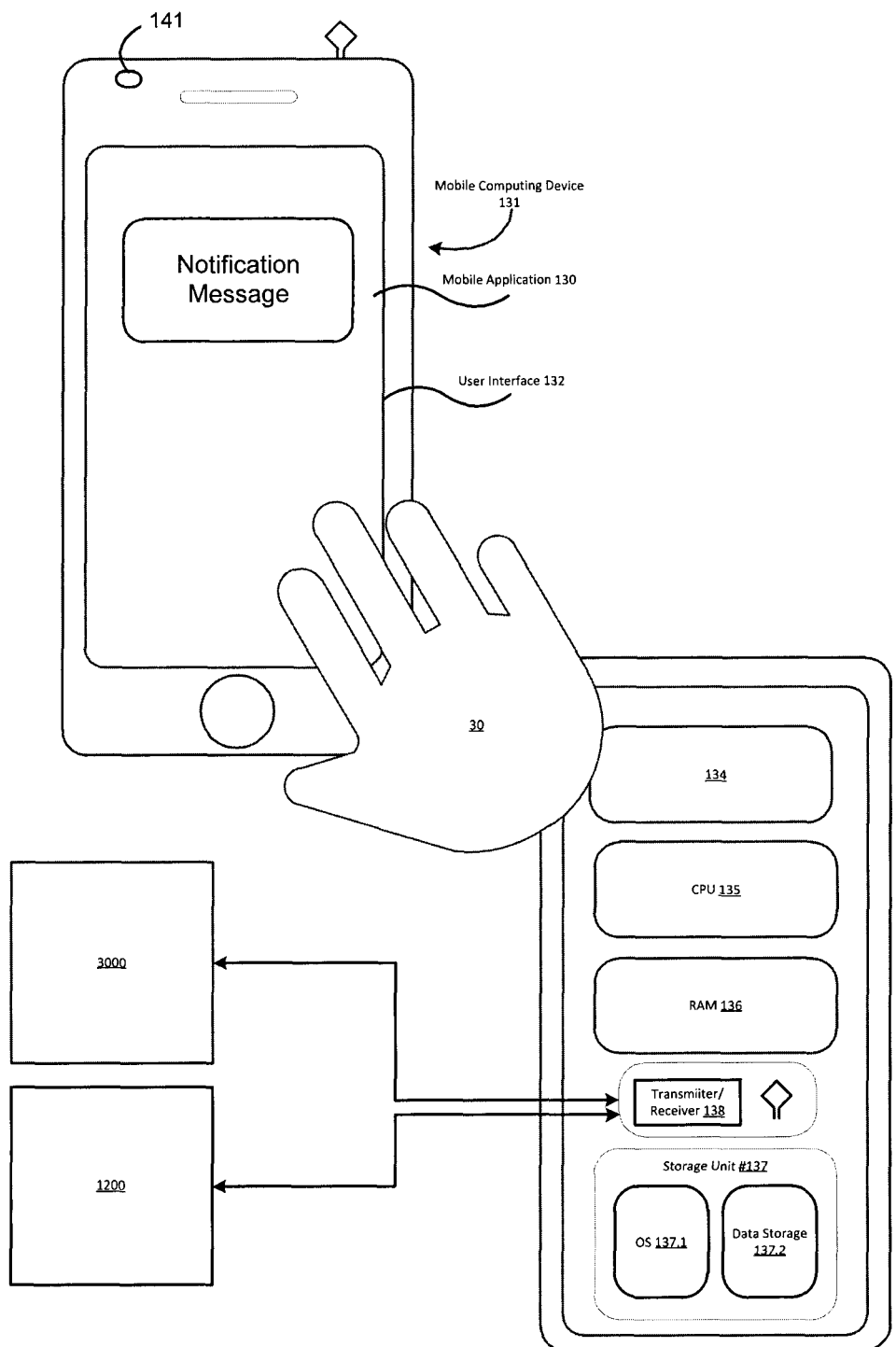
FIG. 51 provides a block diagram of the mobile application and a mobile device according to some embodiments.

FIG. 51 provides a logical flow diagram of the mobile application 130 according to some embodiments. As depicted, the mobile application 130 may run on a mobile computing device 131 that may include a CPU 135 connected to RAM 134, a storage unit 137 which may contain an Operating System (OS) 137.1 and which may store other data 137.2 which may include, but is not limited to, application data. The mobile computing device 131 may also contain a display module that may display the user interface 132, a camera or other image capturing module 141 and one or more network or radio transmitter/receiver modules 138. The CPU may process an OS and applications, and data may be stored in a storage unit and/or loaded into RAM as required. The mobile application 130 may be installed in the storage unit 134, may cause the OS to display information on the user interface 132, and may capture data input by users 133 via the user interface 132 (e.g., product selections). In some embodiments, the mobile application 130 may, via a mobile device's transmitter/receiver 138 and OS 137.1, cause data, such as product selections, to be communicated from the platform 3000 or kiosk 1200 to users 133. In some embodiments, the mobile application 130 may, via a mobile device's transmitter/receiver 138 and OS 137.1, cause data, such as product selections, to be communicated to the platform 3000 and/or kiosk 1200 from users 133 (e.g., via the mobile device's user interface module 132).

In some embodiments, the mobile application 130, after having been detected within a defined vicinity of a kiosk 1200, may receive a signal transmitted over a network electronically from the platform 3000 and/or kiosk 1020. This signal may cause a notification to be sent to the user 32; informing the user 32 that he or she is in the vicinity of a kiosk 1200.

Figure 52:
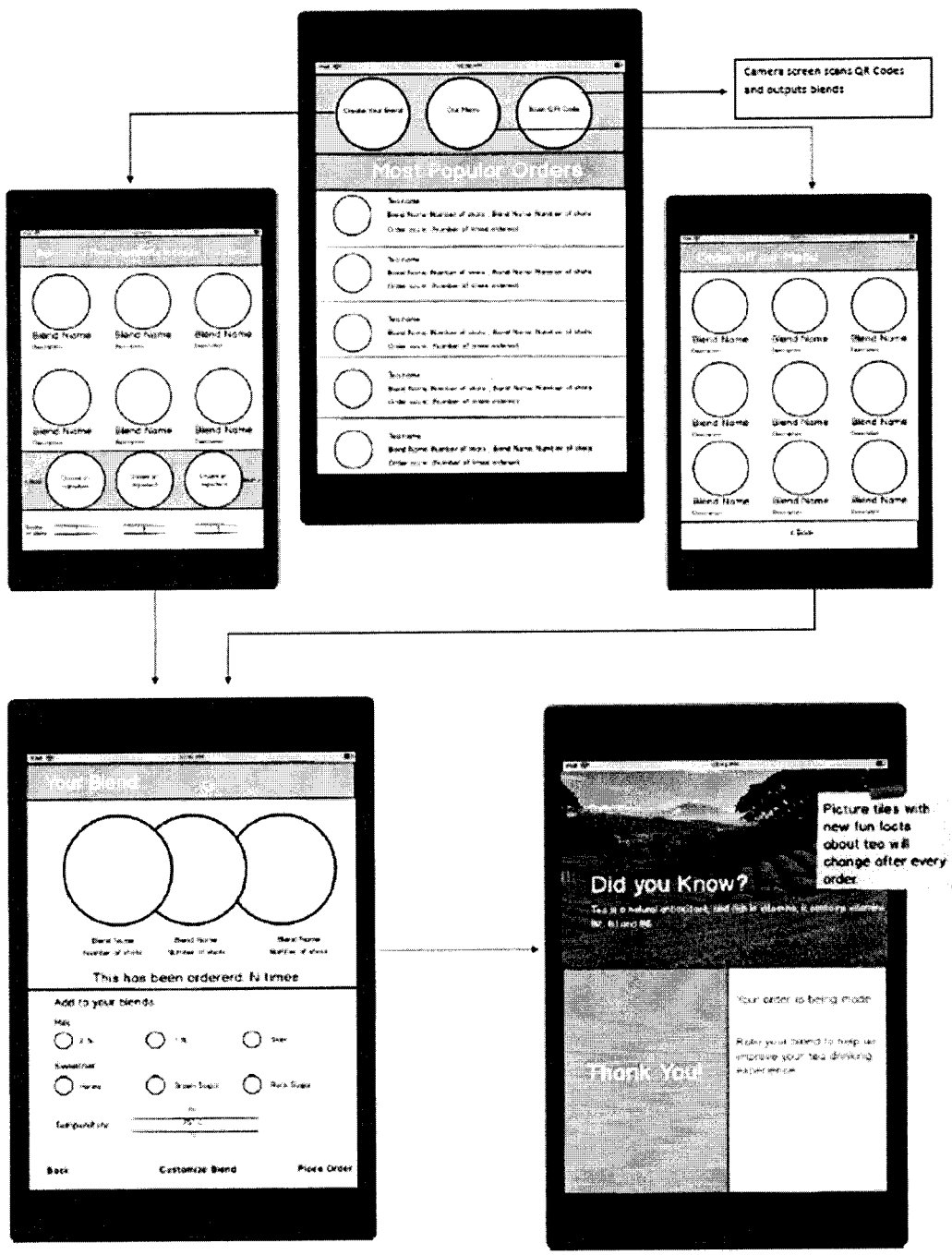
FIG. 52 provides example user interfaces of the mobile application according to some embodiments.

FIG. 52 may provide screens exemplary of some embodiments of the mobile application 130. As depicted, in some embodiments, the mobile application 130, through its user interface 132 may also be programmed to display selection and product data pertinent to a specific kiosk 1200. Such data may be transmitted electronically over a network from the platform's 3000 mobile application module. This may allow the mobile application 130 to alert a user to the specific products available at a particular kiosk 1200 and/or direct a user to the particular kiosk 1200 able to vend a specific product selection.

In some embodiments, the mobile application 130 may be configured to receive inventory data, pertaining to specific devices 110 from the platform 3000. This data may alter the user interface 132 of the mobile application 130 to display only those selections the device 110 has sufficient inventory to vend. The platform 3000 may also cause the mobile application 130 to present a particular user 32 with a selection of nearby devices 110 with sufficient inventory to vend a product selection indicated by that particular user 32.

In some embodiments, the mobile application 130 may be configured to send, receive, read, and/or display optical codes. These optical codes may be encoded by the platform 3000 to include, for example, specific product selections, ratios of product, preparation instructions, text, images, and users' 30-33 personal customizations (encoded data). Once an optical code containing this encoded data is created, the platform 3000 may cause the optical code containing the encoded data to be sent to a variety of recipients. Recipients may include, but are not limited to: users 30-33, kiosks 1200, devices 110, web-applications, social-media providers such as Facebook™ or Google+™ MMS messaging users, and/or e-mail recipients. Once a recipient has received an optical code encoded by the platform 3000, the optical code may be used to cause the data encoded therein to be displayed in an accessible format, by the user interface 132 of a mobile device 131, for example. Further, recipients of such codes may cause instructions and values encoded therein to be received by a device 110, for example via a kiosk's 1200 code scanner module 124. Once encoded data has been sent to the device 110, the device 110 may then vend a product selection based on the selections and specific instructions contained in that encoded data.

In some embodiments, the mobile application 130 may be programmed to employ a mobile payment system which may enable users 31 and 32 to make purchases directly from the kiosk 1200. In some embodiments, the mobile application may be configured to allow a user to scan a QR code, tap a user's device, or otherwise interface with a user's device to make purchases. The billing functionality, etc. may be handled on the backend with a user's stored payment information, such as those held on credit card or PayPal or Google Wallet, etc.

In some embodiments, a user may also pre-purchase credit, and transactions may also be automatically deducted from the balance and/or automatically reloaded in respect of various triggers.

In some embodiments, the main screen of the mobile application 130 may present users 32 with three main options: (1) creating a custom Blend, (2) choosing a Blend from the menu or (3) scanning a barcode, QR code (or similar one or two dimensional code). If the user chooses (3), the mobile application 130 may then use the mobile device's 131 camera 141 to scan a one or two dimensional code and place an order. If the user chooses (2), the mobile application 130 may cause the mobile application's user interface 132 to display preset beverage Blends from which the user may choose. If the user chooses (1), the user may then be prompted to choose a preset number of ingredients or flavourings in order to create a custom Blend. After a choice has been made, the user may then be shown a screen that displays the number of times such a Blend has been ordered as well as options to add to the Blend such as (though not limited to) types of additives (such as, but not limited to, milk, cream, other dairy products, whitener, sweeteners, etc.) as well as the temperature to which the beverage should be heated or cooled. From this screen the order may be finalized and placed by the user's selecting a particular Blend from those displayed.

Blending Logic Logical Flow Diagram

FIG. 42 provides a logical flow diagram of the blending logic performed by the platform 3000, including instructions sent to the device 110, and kiosk 1200, as well as notifications sent to users 30-33, according to some embodiments. In this embodiment, when a user submits flavouring selections and quantities (which need not be limited to two selections as in FIG. 42), the platform 3000 may query the product database 450 and/or the user database 400 in order to determine ideal temperatures and steeping times of the products selected (individually, and/or in combination with one another). The products may be dispensed in a manner similar to that described in FIG. 50 (above). After dispensing the product, the platform 3000 may calculate temperatures and steep times (described in detail below). These temperatures and times may then be implemented by the platform by sending the temperature to the device 110 and/or by sending a notification to the user 30-33 including ideal steep times and/or ideal water temperature. Allowing beverages to steep for too long a span of time, or adding water at excessively high temperatures, may diminish certain qualities of the product (e.g., flavour). Notifying users 30-33 of the ideal time to consume products, and/or the ideal method of preparing products, may enable users to better enjoy the products they order.

With respect to the calculation of steeping times and temperatures, in some embodiments, when a user selects products for a beverage Blend, the platform 3000 may determine an acceptable range of steeping temperatures and steeping times based on the products chosen. For example, the platform 3000 may access tables 470 in the product database 450 containing ideal steeping temperatures and times for each product and, based on the product mix (or Blend) a user has chosen, the platform 3000 may prompt the user with a range of temperatures surrounding a weighted average of the ideal steeping times and temperatures and the amounts of products chosen.

Alternatively, the platform 3000 may access a list of ranges of acceptable steeping temperatures and times for each product and provide the user with a range of steeping temperatures and times for the user's 30-33 beverage based on this list of ranges. In some embodiments, the range presented to the user may be the intersection of acceptable steeping temperatures and times for all products.

In some embodiments, the user 30-33 may also be presented with popular steeping temperatures and times based on data collected from the steeping temperatures and times used by other users 30-33 of the device 110 and stored in the user database 400. In some embodiments, the user 30-33 may be presented with popular steeping times and/or Blends as chosen by their social media contacts (e.g., Facebook™ Friends or Google+™ contacts) and stored in the user database 400.

In some embodiments, while performing the process described in the preceding paragraph, the platform 3000 may also access entries in the product database 450 that may represent the maximum and minimum temperature of water that may be added to each specific product.

Where a combination of products is selected, the platform 3000 may be programmed to determine whether water at the maximum or minimum temperature for any single product may have an adverse effect on another product, and, if so, the platform 3000 may be programmed to perform a specific action or set of actions that may include, but are not limited to, causing a notification to be displayed to the user 30-33, restricting the maximum or minimum temperature of water vended by the device 110, and/or causing the products chosen to be vended separately (and causing the device 110 to add water at the ideal temperature for each), and then mixing the two products together after a specific period of time. It may be desirable for the platform 3000 to be programmed to perform the specific action or set of actions described in this paragraph in order to avoid damaging products in a manner that decreases users' 30-33 enjoyment of their beverages.

Data Analytics Module

The platform 3000 may be configured to utilize information, such as, but not limited to, historical user selections, user input data, and/or user preferences to generate, prioritize, and/or update recommendations. The information may be utilized and recommendations developed through various methods, such as the application of various data mining techniques, statistical analysis, iterative analysis, machine learning, communication with external interfaces and/or databases, etc.

In some embodiments, the platform 3000 may be configured to collect feedback from users 30-33 about various products that have been vended. For example, the platform 3000 may cause the mobile application 130 to display a prompt via its user interface 242 so that a user 30-33 may provide feedback about a Blend or other product he or she has recently purchased. Data collected in this fashion may be stored in a user purchase history table 420 within the user database 400. The platform 3000 may also cause information collected in this fashion to be shared, and/or allow users 30-33 to cause that information to be shared, via various means, including, but not limited to, social media providers such as Facebook™ and/or Google+™.

In some embodiments, while performing certain processes—including, but not limited to, executing the blending logic, receiving input from users 30-33 as to product selection choices, and receiving user customizations—the platform 3000 may capture and store data related to users' choices and customizations in the user database 400. Data captured and stored in such a fashion may then be processed and combined for various purposes. For example, where devices within a close geographical area are shown, by collected data, to vend certain products with certain customizations more frequently than others, such data may be used to replenish more efficiently the inventories of devices in that geographical area. The platform 3000 may also include a data analytics module which may process such captured data in order to generate recommendations to users 30-33 based on various interpretations of that data. For example, a user 30-33 may be presented with product choices most popular among their Facebook™ friends.

FIG. 58A, FIG. 58B and FIG. 58C provide perspective, front and top views, respectively, of an alternative arrangement of hoppers 101. In this embodiment, hoppers 101 are arranged in a spiral consisting of hoppers that are progressively taller as the design spirals in toward the center of the device. A collecting apparatus (e.g., a moving ladle; not shown) may travel along a spiral chute (not shown) in order to collect product from hoppers 101 as hoppers 101 release product. Once the hoppers 101 have dispensed the full amount of product requested, the collecting apparatus may then release the collected product into a cup, bag or other such container. This collecting apparatus may be cleaned (e.g., washed and/or heated) after collecting and releasing product in order to minimize cross-contamination between products. Such a configuration may be useful for making product visible to the customer, and the design is also well configured to utilize a funnel or slide shape to collect the dispensed ingredients.

FIG. 59A, FIG. 59B and FIG. 59C provide perspective, front and top views, respectively, of a further alternative arrangement of hoppers 101. In this embodiment, product may be released by the hoppers 101 onto a product slide 215" that transports product to a bag, cup or other container. This slide, in some embodiments, may be cleaned (e.g., washed and/or heated) after transporting product in order to reduce cross-contamination between products, which may be undesirable to customers with food allergies who may wish to avoid the presence of one or more products in their beverages.

General

With respect to the preceding discussion, features of the systems, devices, and methods described herein may be used in various combinations, and may also be used for the system and non-transitory computer-readable storage medium in various combinations.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, embedded device, personal computer, laptop, or any other computing device capable of being configured to carry out the methods described herein.

Program code may be applied to input data to perform the functions described herein and to generate output information. The output information may be applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Throughout the preceding discussion, numerous references have been made regarding servers, services, interfaces, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data using receivers, transmit data using transmitters, and transform electronic data signals for various three dimensional enhancements using particularly configured processors, where the three dimensional enhancements are for subsequent display on three dimensional adapted display screens.

It should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, a tablet, a mobile computing device or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to some aspects of the present disclosure, one or more computer programs that when executed perform methods as described herein may not reside on a single computer or processor, but may be distributed in a modular fashion amongst a number of different computers or processors to implement various aspects.

It should also be understood that the computer server may be implemented as one or more servers in any possible server architecture or configuration including, for example, in a distributed server architecture, a server farm, or a cloud based computing environment.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Depending on the particular implementation and various associated factors such as the resources of the communications device, wireless network parameters, and other factors, different implementation architectures may be used for the present invention.

Wherever the system is described as receiving input from the user of the communications device, it is to be understood that the input may be received through activation of a physical key on the communications device, through interaction with a touch screen display of the communications device, through a voice command received at the communications device and processed by the system, through a user gesture observed and processed at the communications device, through physically moving the communications device in a predetermined gesture pattern including shaking the communications device, through receiving data from another local or remote communications device associated with the user, or through any other sensory interaction with the communications device or otherwise controlling the communications device.

The preceding discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Substituting the computing devices, servers, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

While illustrated in the block diagrams as groups of discrete components communicating with each other via distinct electrical data signal connections, the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching example embodiments.

It will be appreciated by those skilled in the art that other variations of the embodiments described herein may also be practiced without departing from the scope of the invention. Other modifications are therefore possible.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be understood by those skilled in the relevant arts, with respect to processes and any systems, devices, etc., described herein, a wide range of variations is possible, and even advantageous, in various circumstances, without departing from the scope of the invention, which is to be limited only by the claims.

The invention claimed is:

1. An apparatus for dispensing a granular food product into a receptacle for consumption, comprising:
    a plurality of hoppers for containing said granular food product, wherein each of the plurality of hoppers has an outlet proximate a bottom end thereof and a dispensing rotor rotatable to push a granular food product through said outlet, the dispensing rotor including a metering plate having one or more dispensing holes that define the outlet of the corresponding hopper;
    the corresponding dispensing rotors mounted proximate said bottom end of each of the plurality of hoppers, said rotor rotatable to push said granular food product through said outlet of each of the plurality of hoppers;
    a control subsystem operable to receive a signal indicative of a user selection representative of a customized blend of granular food product indicating a desired quantity of said granular food product and to dispense the desired quantity of said granular food product through said outlet by transmitting control signals that cause rotation of at least one corresponding rotor of the plurality of hoppers by a specific amount to push the desired quantity of the granular food product through the one or more dispensing holes, the specific amount of rotation established on demand based on the customized blend of the granular food product; and
    a chute positioned below said outlet to direct dispensed granular food product into said receptacle.

2. The apparatus of claim 1, wherein the metering plate includes an aperture through which a shaft extends to couple a motor to the dispensing rotor, and wherein spinning of the shaft and said dispensing rotor causes said granular food product to be pushed outward from a center of the metering plate towards the one or more dispensing holes, the dispensing rotor including an arm having with a convex leading surface that is swept away from a direction of rotation of the arm to reduce damage to the dispensed granular food product.

3. The apparatus of claim 2, wherein said rotor has an arm extending in a spiral configuration; and wherein the spinning of the shaft causes the dispensed granular food product to be pushed outwards from a center of the spiral configuration toward the one or more dispensing holes, the one or more dispensing holes disposed proximate an outer periphery of the metering plate.

4. The apparatus of claim 3, wherein said rotor is configured to be rotated clockwise or counter-clockwise, and wherein said rotor is configured to push said granular food product in either direction with a convex leading surface.

5. The apparatus of claim 2, further comprising an agitator fixed to said rotor by mounting to the shaft for mixing said granular food product in said hopper to aid in preventing clumping or jamming.

6. The apparatus of claim 1, wherein said hoppers are operable to contain a plurality of different food products and said control subsystem is operable to receive a signal indicative of a desired blend of specific amounts of ones of said food products, and to dispense said food products according to said desired blend by rotating corresponding ones of said rotors by specific amounts.

7. The apparatus of claim 6, wherein said control subsystem is operable to receive said signal by wireless transmission.

8. The apparatus of claim 7, wherein said control subsystem is operable to receive said signal by near-field communication.

9. The apparatus of claim 7, wherein said control subsystem is operable to send and receive payment signals over a computer network.

10. The apparatus of claim 1, wherein said granular food product comprises loose tea.

11. A method of dispensing a blend of a plurality of granular food products into a receptacle for consumption, based on a user selection representative of a customized blend of the plurality of granular food products, comprising:
    receiving a wirelessly transmitted signal identifying a desired recipe comprising respective quantities of said plurality of granular food products comprising the customized blend of the plurality of granular food products
    sending dispensing signals to a plurality of hoppers, each of the plurality of hoppers for containing a respective one of said plurality of granular food products, and having an outlet proximate a bottom end thereof and a dispensing rotor rotatable to push one of the plurality of granular food product through said outlet, the dispensing rotor including a metering plate having one or more dispensing holes that define the outlet of the corresponding hopper said dispensing signals causing at least one of said hoppers to dispense said granular food products in said respective quantities by causing rotation of at least one corresponding rotor of the plurality of hoppers by a specific amount to push only the desired quantity of the granular food product through the one or more dispensing holes, the specific amount of rotation established on demand based on the customized blend of the granular food product; and directing said dispensed granular food products into said receptacle for consumption.

12. The apparatus of claim 11, wherein said method comprises pushing said granular food product with a rotor having a convex leading surface.

13. The method of claim 11, comprising receiving said wirelessly transmitted signal over a computer network.

14. The method of claim 11, comprising receiving said wirelessly transmitted signal by near-field communication.

15. The method of claim 14, wherein said signal is received by near-field communication from a tag on a drinking receptacle.

16. The method of claim 11, comprising sending a message representative of said desired recipe to a database.

17. The method of claim 15, wherein said sending a message comprises sending a message to a server over a computer network.

18. The method of claim 11, comprising receiving a user input indicative of an ingredient preference of a user and presenting a recommendation based on said user input.

19. The method of claim 16, wherein said user input is received by wireless transmission.

20. The apparatus of claim 1, further comprising a blocking plate positioned above the metering plate and the rotor, the blocking plate substantially ring-shaped and having a plurality of lobes that extend radially inwardly, the plurality of lobes in concert selectively covering the one or more dispensing holes to prevent the granular food product from falling through the one or more dispensing holes when the granular food product is not being pushed by the rotor.

* * * * *